United States Patent [19]
Peters, Jr.

[11] 4,151,387
[45] Apr. 24, 1979

[54] METAL BASE COOKWARE INDUCTION HEATING APPARATUS HAVING IMPROVED POWER CONTROL CIRCUIT FOR INSURING SAFE OPERATION

[75] Inventor: Philip H. Peters, Jr., Greenwich, N.Y.

[73] Assignee: Environment/One Corporation, Schenectady, N.Y.

[21] Appl. No.: 520,117

[22] Filed: Nov. 1, 1974

Related U.S. Application Data

[62] Division of Ser. No. 261,227, Jun. 9, 1972, Pat. No. 3,887,781, which is a division of Ser. No. 131,648, Apr. 6, 1971, Pat. No. 3,710,062.

[51] Int. Cl.$^2$ .............................................. H05B 5/04
[52] U.S. Cl. .......................... 219/10.49 R; 219/10.77; 363/96
[58] Field of Search ............................ 321/18, 43–45; 363/96; 219/10.49, 10.77

[56] References Cited

U.S. PATENT DOCUMENTS

| 3,355,654 | 11/1967 | Risberg | 321/44 |
| 3,566,243 | 2/1971 | Landis | 321/18 X |

FOREIGN PATENT DOCUMENTS 1019901  2/1966  United Kingdom.

*Primary Examiner*—Bruce A. Reynolds
*Attorney, Agent, or Firm*—Charles W. Helzer

[57] ABSTRACT

A metal based cookware induction heating apparatus having an improved power supply and control circuit comprised of a chopper inverter including a gate controlled power thyristor coupled to and supplying an induction heating coil with periodic energization currents. A full wave rectifier supplies rectified, unfiltered, unidirectional high voltage excitation potential to the chopper inverter which converts the excitation potential to a comparatively high frequency of the order of 20 kilohertz for supply to the induction heating coil. A gating circuit is provided for driving the chopper inverter directly from the rectified high voltage excitation potential supplied by the rectifier.

4 Claims, 41 Drawing Figures

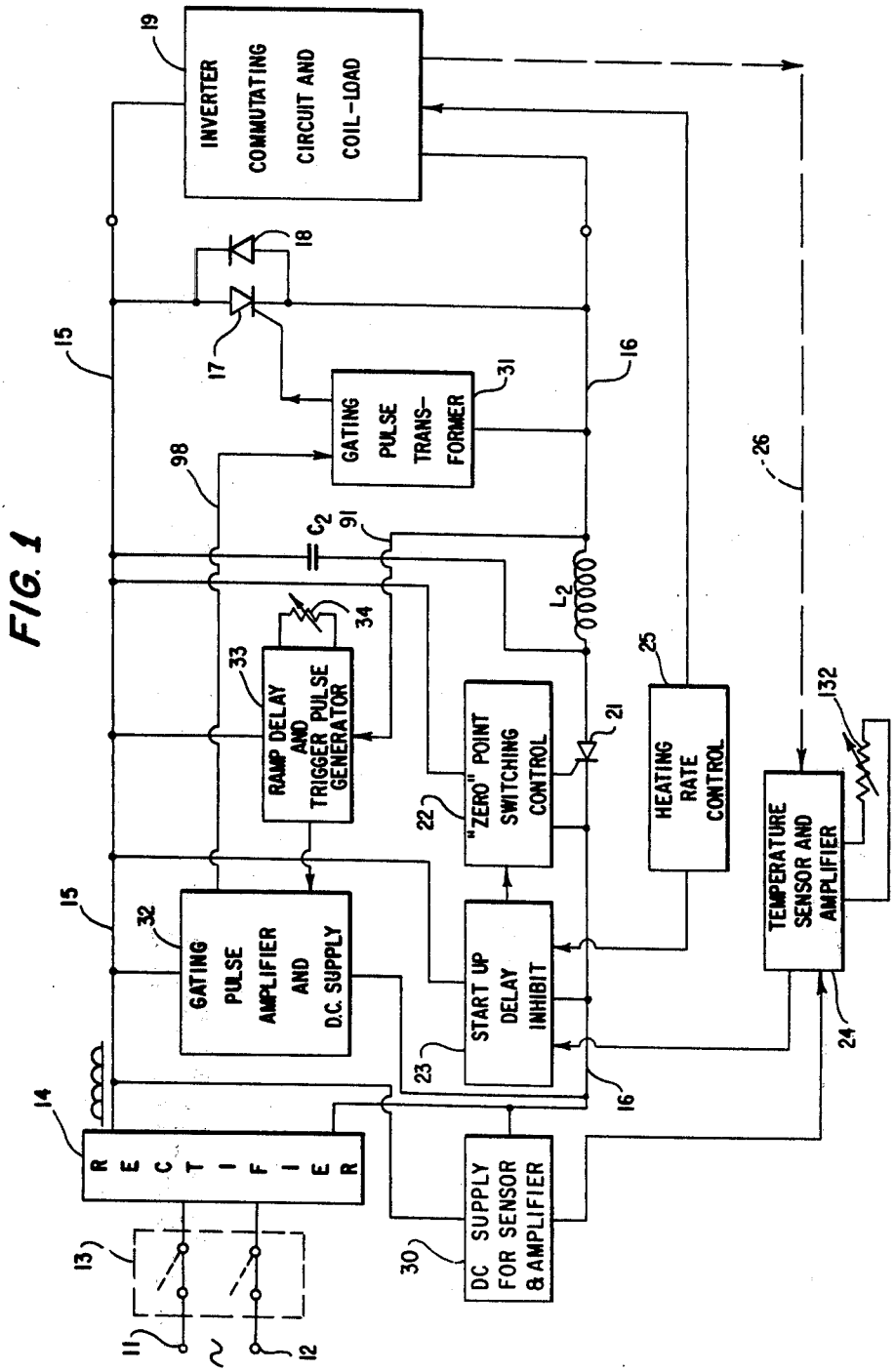

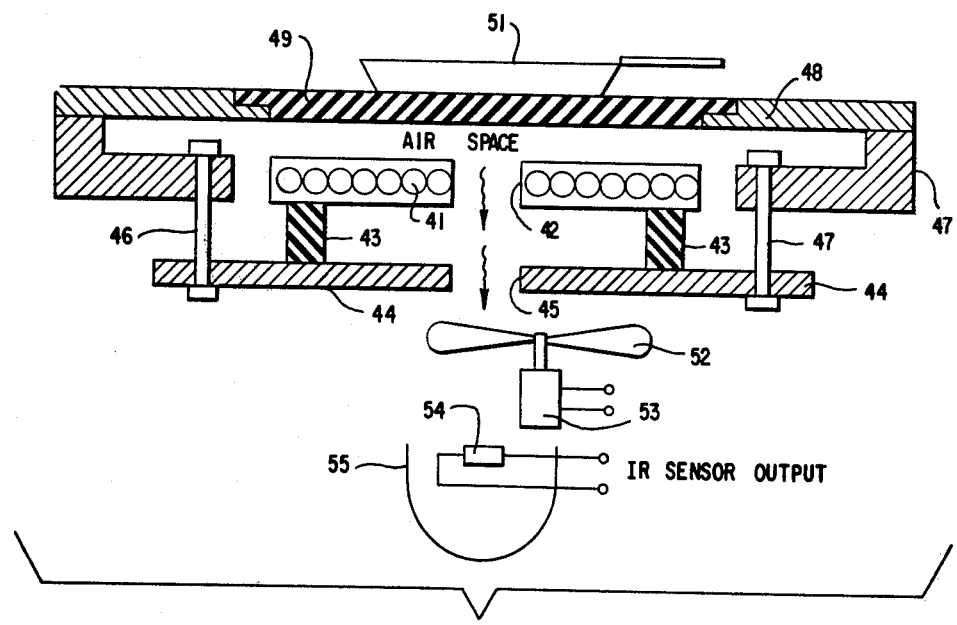
FIG. 3
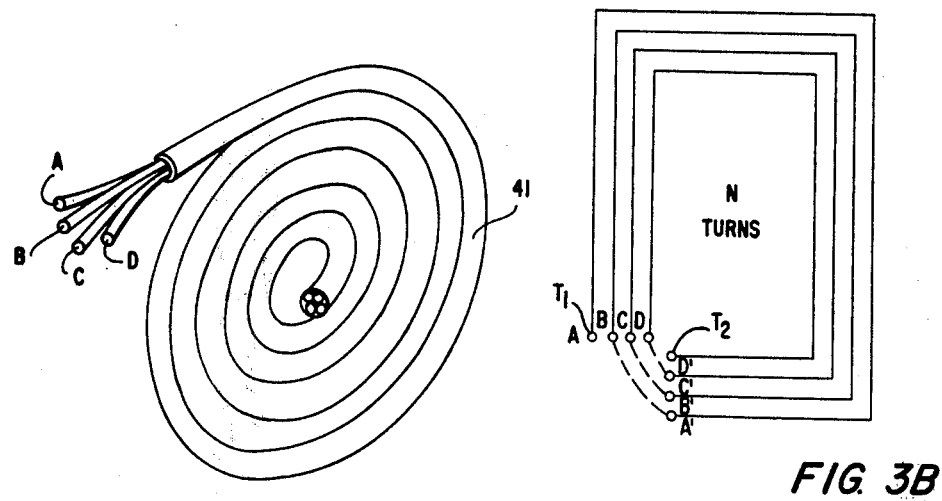
FIG. 3A
FIG. 3B

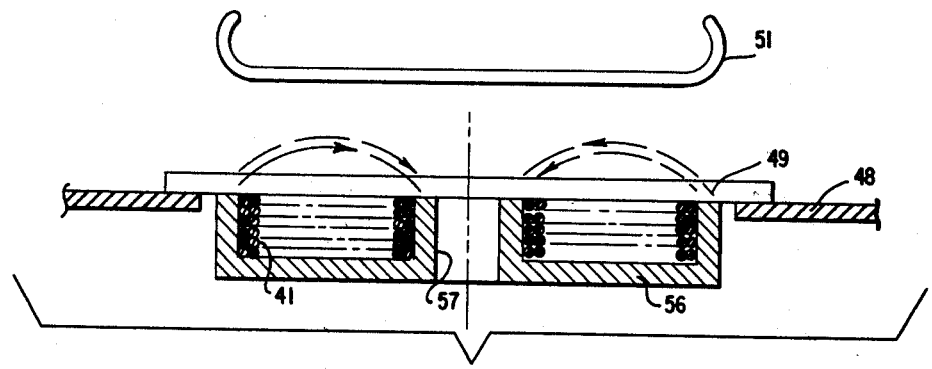
FIG. 3D
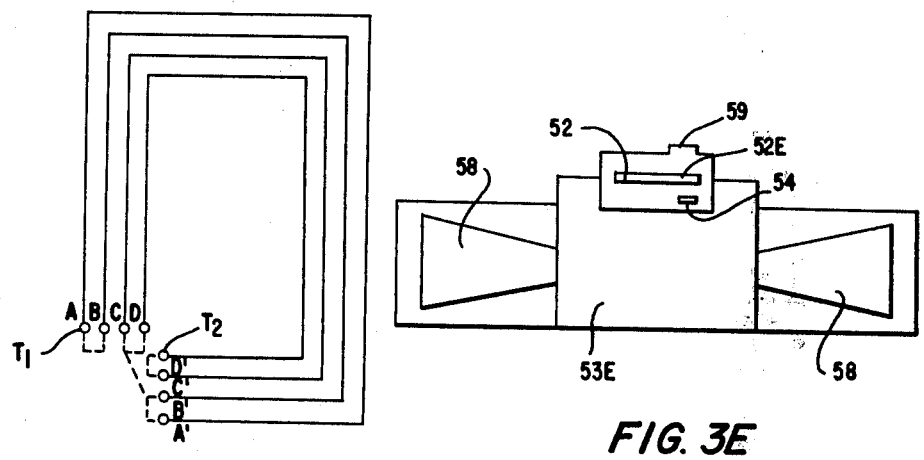
FIG. 3C
FIG. 3E

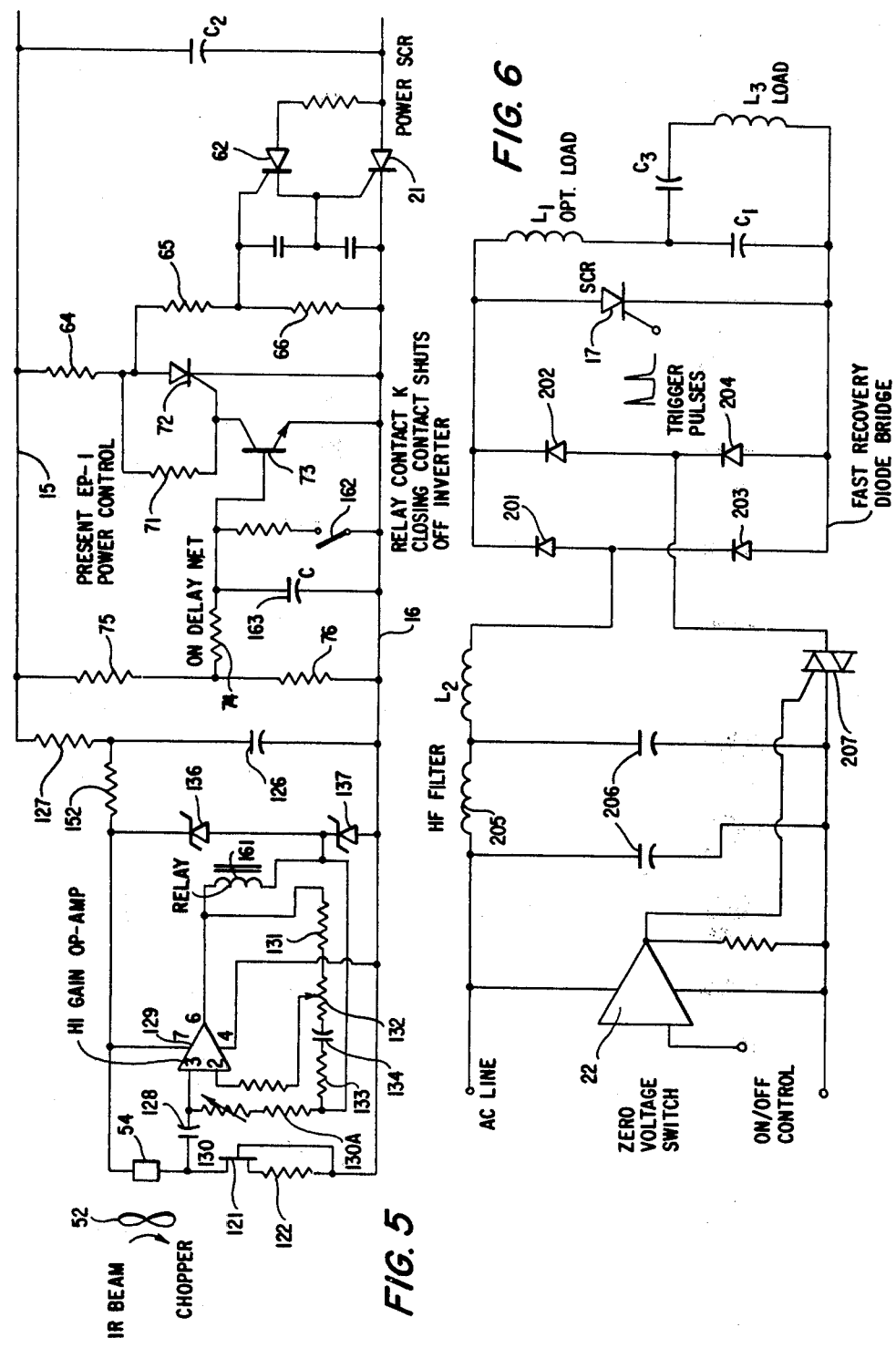

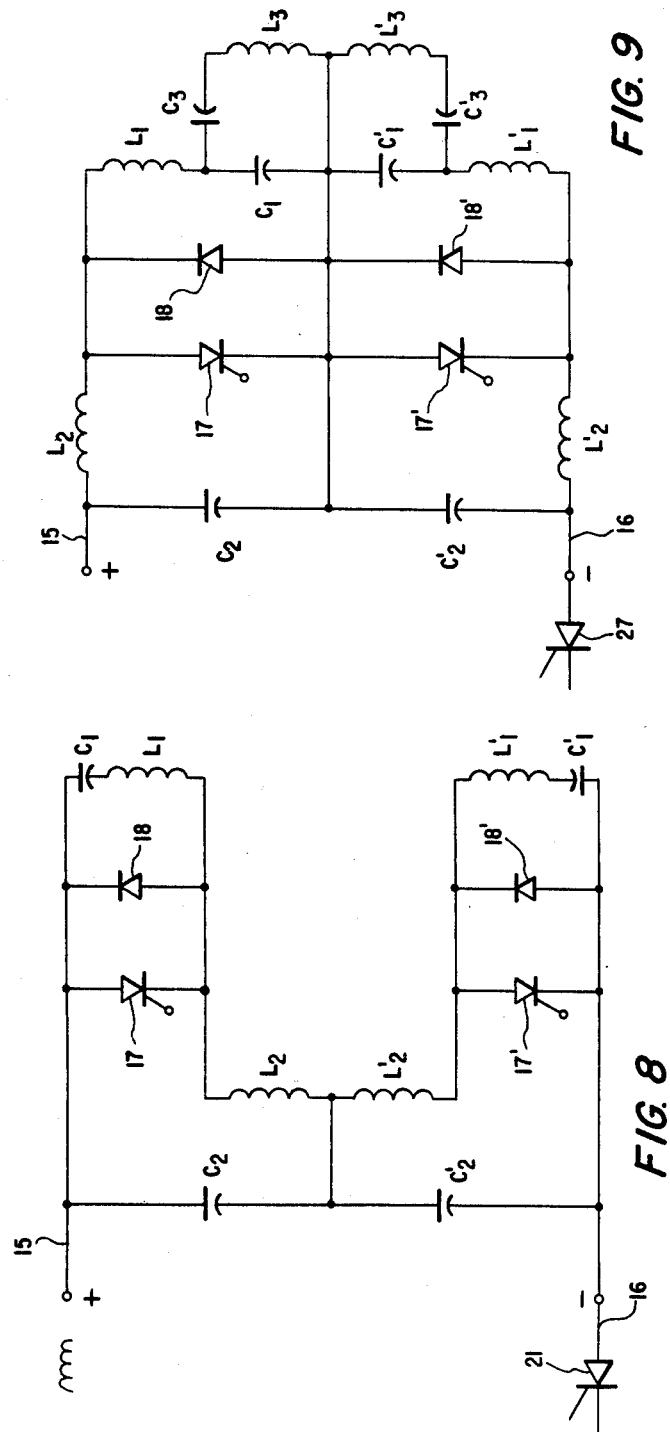
FIG. 9
FIG. 8
FIG. 8A

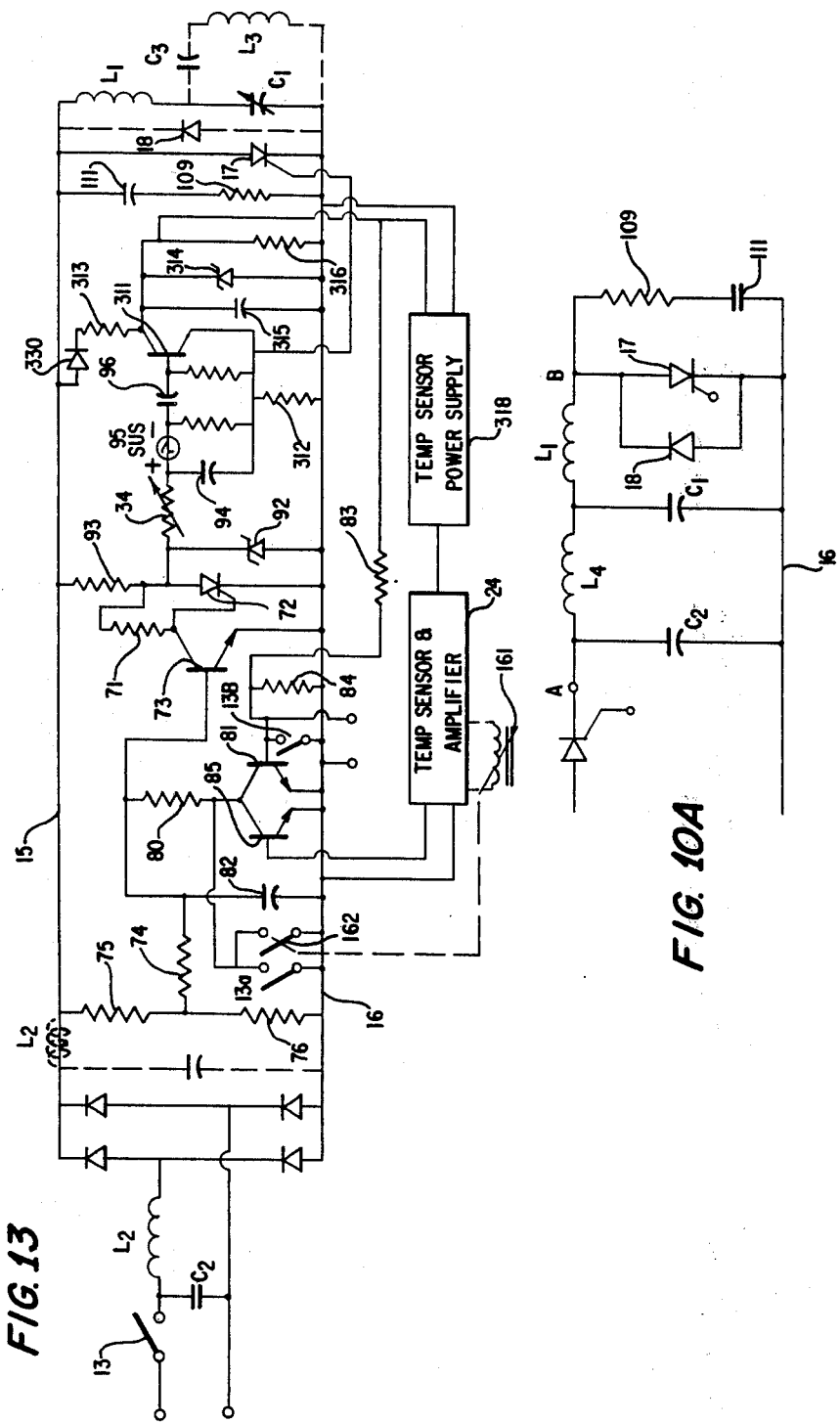

METAL BASE COOKWARE INDUCTION HEATING APPARATUS HAVING IMPROVED POWER CONTROL CIRCUIT FOR INSURING SAFE OPERATION

This is a division of prior pending application Ser. No. 261,227 now U.S. Pat. No. 3,887,781 filed June 9, 1972 which in turn is a Divisional application of prior application Ser. No. 131,648 filed Apr. 6, 1971, now U.S. Pat. No. 3,710,062, issued Jan. 9, 1973.

BACKGROUND OF INVENTION

1. Field Of Invention

This invention relates primarily to a new and improved induction heating apparatus designed for use with metal-based cookware.

More particularly, the invention relates to a new and improved induction heating apparatus employing novel chopper inverter power supply circuits having improved operating characteristics and novel control gating circuit arrangements using new and improved infrared heat sensing and coil arrangements for directly sensing and controlling the temperature of metal-based cookware or other objects being heated with an induction heating coil. The improved induction heating apparatus provides rapid, safe, clean and efficient heating which can be accurately controlled in a manner which minimizes the production and loss of waste heat, and accomplishes this with compact equipment of relatively low cost and not too complex design.

2. Prior Art Situation

Heretofore electrically operated home cooking appliances have employed resistance heating almost universally to convert electric into heat energy for home cooking purposes. While there are exceptions, such as are exemplified by the micro-wave heating ovens, for the most part, known electrical heating appliances use resistance heating. With such appliances the heat generated is proportional to $I^2R$ where I is the current supplied to the resistance heating element and R is the resistance of the heating element. By switching or otherwise controlling the values of R and/or controlling I, the heat generated by a resistance heating unit can be controlled comparatively easily dependant upon the degree of control desired. However, with all resistance heating units the heat generated is controlled by controlling in some manner the electrical energy supplied to the unit. By prior calibration, the amount of heat generated by the resistance heating unit, and hence the resulting temperature of the object being heated are somewhat and only roughly related.

Consider, for example, the well known helically coiled, flat top electric stove heating units of the "Cal-rod" type. These units are controlled by calibrated switches on the stove which at a given setting produce a measurable quantity of $I^2R$ generated heat that then is thermally coupled to the object being heated such as a pan. A great deal of the generated heat is wasted and contributes to thermal pollution of the environment in which the stove is located. If the stove is located in an air conditioned kitchen, not only does the waste heat contribute to inefficiency, but also the additional cooling load imposed on the air conditioner by the waste heat contributes to further inefficiency. Over a considerable operating period such as the summer months of June through August, the accumulated inefficiencies can contribute to a significant wasteage in power and increased utility bills not to mention the added discomfort in the kitchen during the cooking periods and increased loading on the utility system during periods when predictably power shortages are most likely to occur.

In addition to the inefficiencies mentioned above, presently available electric $I^2R$ cooking units provide no reliable control over the temperature of the pan or other objects being heated. This lack of reliable control is due to the differences in the transfer of heat to pans fabricated from different metals such as aluminum, copper, iron or alloys of metal, and the difficulty of relating the efficiency of thermal coupling to the several different types of cookware and calibrated settings of the control knob for adjusting heat generation by the resistance heating units. Hence, at best the calibrated settings at the control knobs are only an educated guess at what is the actual temperature of the pan or other object being heated. To overcome the above discussed and other deficiencies inherent in electrical resistance heating apparatus, the present invention was devised.

SUMMARY OF INVENTION

It is therefore a primary object of the invention to provide a new and improved induction heating apparatus for use with metal-base cookware and other similar objects to be heated, which is compact, relatively low cost and simple in design and provides safe, clean and highly efficient heating.

Another object of the invention is to provide an induction heating apparatus of the above type which is capable of directly sensing and controlling the temperature of the cookware or other object being heated.

A further object of the invention is to provide an improved chopper-inverter power supply circuit for use primarily in induction heating equipment and which is reliable and safe in operation over a wide range of loading.

Still another object of the invention is the provision of a novel gating control circuit for inverter power supply circuits which is capable of providing reliable gating-on pulses of sufficient strength and time duration to assure complete turn-on and control over the operation of large power rated inverters.

A still further object of the invention is the provision of improved induction heating coil designs and temperature sensing arrangements for use in induction heating apparatus having the characterisitics noted above.

In practicing the invention, an improved power supply and control circuit arrangement for induction heating apparatus is provided and includes an improved chopper-inverter power supply circuit under the control of a gate controlled power thyristor such as an SCR that is coupled to and supplies an induction heating load with periodic energization currents. Full wave rectifier means are provided for supplying a rectified, unfiltered direct current high voltage excitation potential to the chopper inverter circuit which is gated on periodically by an improved gating circuit means. One improved gating circuit means includes a timing circuit supplied from the voltage across the SCR which operates a voltage responsive switch such as a SUS or PUT that in turn gates on momentarily a constant current, a high voltage switching transistor connected in series circuit relationship with the primary winding of a pulse transformer across a filtered dc voltage supply obtained from the high voltage rectifier. The switching transistor amplifies the input from the timing circuit; and the amplified signal appearing at the secondary terminals of the pulse transformer is fed to the control gate of the large power rated thyristor comprising a part of the chopper inverter power supply circuit.

The improved chopper-inverter power supply circuit includes power supply terminal means for connection to a source of electric energy for energizing the chopper inverter. A filter inductor having an inductance $L_2$ and a bidirectional conducting gate controlled semi-conductor thyristor such as an SCR and a parallel diode are connected in series circuit relationship across the power supply terminal means with the filter inductor being interposed between the thyristor switching device and the supply terminal means. A commutating inductor having an inductance $L_1$ and a commutating capacitor having a capacitance $C_1$ are connected in series circuit relationship across the thyristor switching device and are tuned to series resonance at a desired commutating frequency that provides a combined thyristor conduction and commutating period $t_1$ during each cycle of operation. Means for deriving output power are coupled across at least one of the commutating components and gating circuit means are coupled to the control gate of the thyristor switching device for rendering the device conductive at a controlled frequency of operation that provides an operating period T for the chopper inverter including a quiescent charging period $t_2$ in each cycle of operation where $T = t_1 + t_2$ such that the value $\omega_2 t_2$ equals substantially $\pi/2$ radians and where $\omega_2 \simeq 1/\sqrt{L_2 C_1}$ whereby the reapplied forward voltage across the semiconductor switching device following each conduction interval is substantially independent of load. For improved operation, a smoothing inductor $L_3$ and a smoothing capacitor $C_3$ are connected in series circuit relationship across the commutating capacitor of the chopper inverter circuit and serve to shape the output current supplied by the chopper inverter to substantially a sinusoidal waveshape waveshape having little or no radio frequency interference emission effects. With such an arrangement, the smoothing inductor may comprise an inductive heating coil, and the load is coupled to and derives output power from the circuit across the smoothing inductor. Further, a greater level of power is coupled to the load for given levels of peak voltage, and current on the SCR than is available when power is taken inductively from the commutating inductor.

To further reduce radio frequency interference emission effects (RFI) a soft starting zero point energization switching means may be connected in the circuit intermediate the output from the rectifier and the chopper inverter power supply circuit. Zero point sensing and turn-on circuit means are coupled to and control the soft start zero point switching means for switching the zero point switching means on only at or near the beginning of each half cycle of the rectified unfiltered unidirectional excitation potential appearing at the output of the high voltage rectifier means. Inhibit control means for inhibiting operation of the zero point sensing and turn-on circuit means are provided and are controlled by a temperature sensing means for sensing the temperature of metal-based cookware or other objects being heated by the inductive heating coil. The temperature sensing means derives on-off control signals in response to the temperature dropping below or raising above a preset level and supplies the on-off control signals to the inhibit control means for thereby controlling output power and hence heat generated in the metal base cookware or other objects by the inductive heating coil.

An improved temperature set and control circuit is provided which includes an infra-red heat sensor device arranged to view the bottom of the metal based cookware or other objects being heated directly. The infra-red heat sensor is connected in series circuit relationship with a constant current source across a source of low voltage direct current excitation potential and means are provided for periodically interrupting the view of the infra-red heat sensor device to produce an output alternating current signal component whose amplitude is indicative of the temperature of the metal based cookware or other objects being heated. An alternating current amplifier is supplied from the output of the infra-red heat sensor device and includes an adjustable temperature set impedance for controlling the gain of the alternating current amplifier whereby the setting of the temperature set impedance serves to establish the temperature level at which the output from the alternating current amplifier attains an operative level of magnitude. The output from the alternating current amplifier then in turn controls an output on-off control amplifier in the form of either a Schmitt type of trigger or a reed relay which inturn is coupled to and controls the inhibit control means of the soft start zero point switching device which controls energization of the chopper inverter gating circuit means and the chopper inverter power supply circuit.

The temperature sensing and control arrangement preferably comprises a planar helically-shaped inductive coil having a central opening disposed under an insulating heat transparent supporting member or other similar arrangement such as an insulating support member having a heat transparent window upon which the metal-based cookware is supported. The infra-red heat detecting device is supported within a suitable heat reflector and views directly the bottom of the metal-base cookware through the cental opening of the induction heating coil and the heat transparent supporting member for directly controlling the temperature of the cooking vessel. A light chopping device is disposed intermediate the heat transparent supporting member and the infra-red heat detector device for periodically interrupting the view of the infra-red heat detector to thereby produce the alternating current signal component and also preferably includes fan means for producing a flow of cooling air through the ambient atmosphere surrounding the heat sensing arrangement. Preferably also, a pan-shaped ferrite core member having a central opening is disposed around the inductive heating coil below the surface of the heat transparent supporting member for concentrating the lines of magnetic flux up into the bottom of the metal based cookware for further improving magnetic coupling to the inductively heated cooking vessel. Further improvement of magnetic coupling to the metal-based cookware can be obtained by appropriate design of the helically coiled, planar induction heating coil.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIG. 1 is a functional block diagram of an improved power supply circuit and control for use with an induction heating apparatus constructed in accordance with the invention;

FIG. 3–3E illustrate different forms of induction heating coil fabrication design, and a preferred manner of mounting the induction heating coils with respect to a heat transparent insulating support for metal-based cookware to be inductively heated by the heating coil and also with relation to a heat sensing device, chopper device, fan cooling arrangement, and ferrite core support for improved magnetic coupling to the pan or other metal-based cookware being inductively heated;

FIG. 5 is a partial circuit diagram of an alternative form of construction for the temperature sensing circuit arrangement usable with the system of FIG. 4;

FIG. 6 is a schematic circuit diagram of an improved power supply circuit according to the invention which employs alternating current excitation;

FIG. 8 is a partial circuit diagram of an improved chopper inverter of larger power rating for exciting two induction heating coils stacked pancake fashion in the manner shown in FIG. 8A;

FIG. 9 is an alternative form of larger power rated chopper inverter similar to that of FIG. 8 but including the additional smoothing inductor and capacitor for reducing RFI effect;

FIG. 10A is a modification of the power supply shown in FIG. 10;

DETAILED DESCRIPTION OF PREFERRED EMBODIMENTS

Figure 2B:
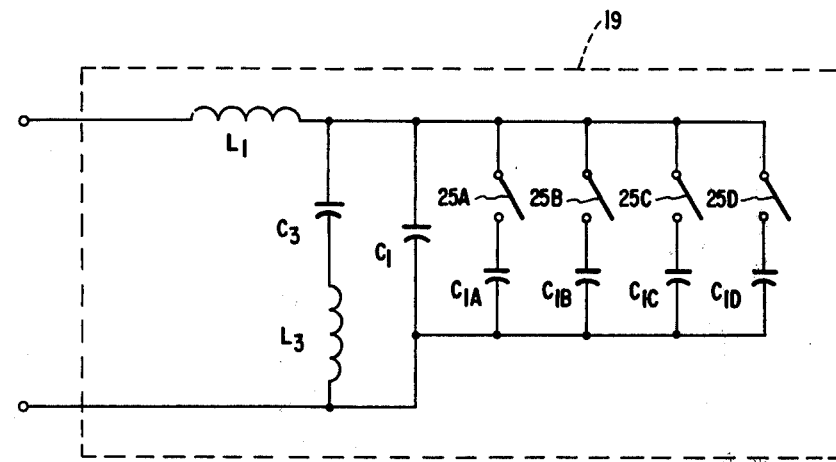
FIGS. 2, 2A and 2B illustrate different alternative forms of commutating circuit components arrangement usable with the chopper inverter power supply illustrated schematically in FIG. 1.

FIG. 1 is a functional block diagram of an overall chopper inverter power supply and gating control circuit for use with induction heating apparatus constructed in accordance with the invention. The circuit of FIG. 1 is intended for use primarily in exciting an induction heating coil for heating metal-based cookware and will be so described in the following disclosure. However, the circuit of FIG. 1 and the several modifications thereof disclosed hereinafter also may be used with commercial induction heating apparatus as illustrated in connecton with FIGS. 13 and 14. Hence, the invention is in no way restricted in application to use only for heating metal-based cookware in home appliances. Additionally, it might be noted that the several blocks or elements comprising the overall block diagram of FIG. 1 will be described in greater detail hereinafter in connection with other figures of the drawings such as FIG. 4, and hence the immediate following description will be of a general nature only to illustrate the broad construction and principles of operation of the system.

The circuit of FIG. 1 is intended to be energized from a conventional commercial or residential 115 volt, 15–30 amp, 60 cycle/sec alternating current power supply connected to power supply terminal means 11 and 12 through a conventional fused plug or other outlet connection. It is preferred that a conventional circuit breaker 13 having a fast response time be included in the overall system for protection purposes although it may not always be required. The power supply terminal means 11 and 12 are connected to a full wave rectifier 14 of conventional construction which full wave rectifies the alternating current supply potential and supplies its output across a pair of high voltage direct current power supply busses or terminals 15 and 16. The output from the full wave rectifier 14 is unfiltered, and hence the potential appearing across the direct current power supply terminals 15 and 16 while unidirectional is in the form of a series of halfwave sinusoidal-shaped rectified high voltage pulses that drop substantially to zero value intermediate each halfwave pulse and have a frequency on the order of 120 cycles/sec or approximately double that of the alternating current supply connected to the supply terminals means 11 and 12.

The full wave rectifier 14 supplies the excitation potential for a chopper-inverter circuit comprises by a filter inductance $L_2$, a filter capacitor $C_2$, a bidirectional conducting, gate controlled, semiconductor thyristor switching device formed by a power rated SCR 17 and reversely poled parallel connected, feedback diode 18. The SCR 17 and feedback diode 18 are connected across, and serve to excite at a relatively high frequency of the order of 20–30 kc/sec the chopper inverter circuit commutating components 19 to be described more fully hereinafter in connection with FIGS. 2–2B. A conventional R-C snubbing network for reducing dv/dt effects on the SCR 17 and not shown in FIGS. 1 and 2-2B, also may be connected across the SCR 17 and feedback diode 18. Energization of the chopper-inverter takes place through filter capacitor $C_2$ and filter inductor $L_2$. $L_2$ preferably is connected in the direct current power supply terminal buss or line 16, assuming line 16 to be the negative terminal, but alternatively, could be connected in the positive supply terminal 15 in the manner shown in dotted outline form. In the preferred location of $L_2$ the anode terminal of the SCR 17 is connected directly to the positive terminal of rectifier 14. It is the anode terminal from which heat is removed from the device, and a thermal path of high conductivity is required to a heat sink. This path must also be electrically isolating. These constraints dictate a junction of high electrical capacitance to the heat sink. With the anode connected directly to the positive buss 15, the maximum voltage from anode to heat sink is no greater than the peak supply voltage. Conversely with $L_2$ in the positive leg, the anode-to-sink voltage is the full peak voltage across the SCR, a value several times the peak line voltage. Also, the SCR voltage has both a steep rise and fall rate giving rise to capacitively coupled spikes of voltage on the heat sink. If the sink is attached to a chassis grounded to the power line, the capacitive spikes constitute an unwanted source of RFI on the line. In the preferred location of $L_2$, the SCR anode and diode cathode are connected to the positive buss to minimize such capacitive affects, and to minimize the voltage levels attained across the insulation between these devices and the heat sink.

Energization of the high frequency chopper-inverter power supply circuit takes place only during intervals while a soft starting zero point energization switching means in the form of a zero point switching SCR 21, is conducting. The zero point switching SCR 21 is rendered conductive by a zero point sensing and turn-on control circuit 22 that in turn is controlled by a start-up delay inhibit circuit 23. The start-up delay inhibit circuit 23 in its turn is under the control of a temperature sensor and amplifier circuit 24 and a heating rate control circuit 25. The heating rate control circuit 25 operates to adjust the level at which power is produced by the chopper-inverter power supply circuit that supplies the high frequency pulses for exciting the heating coil that in turn then inductively heats the metal-based cookware or other object to be heated. The temperature sensor and amplifier circuit 24 directly senses the temperature of the metal-based cookware or other object being heated by the inductive heating coil as indicated by the dotted-line thermal coupling connection 26, and thereafter develops an on-off control signal which controls operation of the start-up delay inhibit circuit 23. Power to operate the temperature sensor and amplifier circuit 24 is obtained directly from the full wave output of rectifier 14 via power supply 30 especially designed to the high gain requirements of the sensor and amplifier circuit 24.

The soft start-zero point switching SCR 21 does not itself directly control gating-on of the chopper-inverter thyristor switching device 17, but only serves to enable operation of the chopper inverter by controlling application of the high voltage, unidirectional excitation potential from full wave rectifier 14 across the chopper inverter. The purpose of the soft start zero point switching control 22 is to assure that the energization potential is supplied across the chopper inverter only at or near the beginning of the rectified, unfiltered, sinusoidally-shaped halfwave, high voltage pulses appearing at the output of the full wave rectifier 14. In this manner, surge charging of the commutating components with initial high voltage that would produce certain undesirable consequences, is avoided. One of the undesirable consequences avoided by the use of the zero point switching SCR 21, is possible misfiring of the chopper inverter switching SCR 17 due to the lack of a sufficient gating signal at a desired turn-on point. Another requirement is met by use of the zero point controlled SCR 21; namely, that the rate at which applied voltage increases shall be limited to that value which assures that the energy stored in circuit 19 will always be sufficient to commutate the SCR/diode pair 17 and 18 under all conditions of loading. This requires that the commutating current be several fold greater than the current $I_2$ flowing through $L_2$ at the moment of commutation. A too rapid application of a supply voltage can result in a charging current $I_2$ larger than the available commutating current $I_1$ and consequent permanent short circuit, forcing interruption of line power by breaker 13. By appropriate design of the gating circuit to provide proper delays in conjunction with the soft start zero point switching control SCR 21, proper gating-on of the chopper-inverter switching SCR 17 is assured at all times including initial start-up of the circuit.

Gating-on of the chopper-inverter switching SCR 17 is achieved through the medium of a gating pulse transformer 31 whose secondary winding is connected to the control gate of the chopper inverter switching SCR 17, and whose primary winding is supplied from a gating pulse amplifier and DC supply circuit 32. The gating pulse amplifier and DC supply circuit 32 in turn is supplied from and controlled by a ramp delay and trigger pulse generator circuit 33 for generating turn-on gating pulses for supply to SCR 17 and may have a variable repetition rate within a predetermined range to be described hereinafter as determined by the setting of a variable power controlling resistor 34. The ramp delay and trigger pulse generator 33 is connected by conductor 91 across the $L_2$ filter inductor so its energizing potential is that across the SCR/diode pair 17, 18 and this potential is established only after the zero point switching control SCR 21 has been rendered conductive and supplies enabling potentials across the chopper inverter. The built-in ramp charging delay of circuit 33, and the nature of the gating-pulses supplied from amplifier 32 to SCR 17 as described hereinafter, then assures the production of a gating-on pulse which is of sufficient magnitude to assure turn-on of SCR 17 under all conceiveable operating conditions, and irrespective of loading on the induction heating coil supplied.

For the purpose of the following description, it will be assumed that the heating coil load 19 supplied by the circuit of FIG. 1 is in the form of a pancake-shaped spiral inductive heating coil employed to heat a metal-base pan or other cookware physically positioned in inductive coupled relation to the coil. The magnetic lines of flux produced by the pancake coil are tightly coupled to and generate heat within the metal-based pan due to the build up and collapse of the magnetic lines of flux at a relatively high chopping rate or frequency on the order of 20 kilocycles/sec. More heat is produced per unit current at higher frequencies than at lower frequencies in an inductively heated load such as a metal-based cook pan due to the higher surface resistivity of the metal at the higher frequency. The pancake-shaped spiral configuration of the induction heating coil provides very close magnetic coupling between the coil and a metal-based pan bottom placed in close proximity to the plane of the coil. However, the radial magnetic field of such a coil is self cancelling at relatively short distances from the coil so that electromagnetic radiation levels are kept low to thereby minimize electro-magnetic interference (EMI) and radio frequency interference (RFI) effects. If desired, heating coils may be connected in series or parallel, to provide power output for multiple loads.

Upon initial start up of the circuit an on-off control switch similar to the circuit breaker 13 is closed to supply alternating current excitation potential to the full wave rectfier 14. The relatively high voltage, full wave rectified, unidirectional potential appearing at the output of rectifier 14 is then supplied across terminals 15 and 16 to the gating pulse amplifier and DC supply circuit 32 and the start-up delay inhibit control circuit 23 directly as well as across the filter capacitor $C_2$ whenever SCR 21 is made conducting. However, at initial start-up, the zero point switching SCR 21 will be maintained off due to the delay-inhibit circuit 23 until power is called for. At this point, if not previously, the heating rate control 25 is adjusted to a desired heating rate. As will be explained hereinafter, the heating rate control 25 serves to adjust the amount of output power in each output pulse produced by the chopper inverter, and serves in much the same manner as a flame control adjustment provided on certain gas stoves to allow adjustment of the size of the heating flame in addition to maintaining temperature around a set point. The desired temperature setting made by setting the gain of the temperature sensor and amplifier 24 in response to an appropriate manual, mechanical, electrical or other input. The temperature sensor and amplifier 24 thereafter directly senses the temperature of the metal base pan being heated by the inductive heating coil and operates the inverter in an on-off manner through the start-up delay inhibit circuit 23 and zero point switching control 22 to maintain the temperature of the pan at or near the set point determined by variable resistor 132. If desired, an interconnection of some form either electrical, mechanical, optical, elctro mechanical, etc may be provided between heating rate control 25, power setting resistor 34 and/or temperature set resistor 132 so that all three or any two of these controls can be made to operate together.

Assuming that after initial start-up as described above, power is called for. The temperature sensor and amplifier 24 output signal will then be such as to enable the start-up delay inhibit circuit to in turn enable the zero point switching control 22 to turn on zero point switching SCR 21 at or near the beginning the next succeeding halfwave of the rectified, unfiltered, high voltage output excitation potential appearing across supply terminals 15 and 16. Upon zero point switching SCR 21 being turned-on, the inverter circuit commutating capacitor will begin to charge and the voltage developed across filter inductor $L_2$, initially zero measured from buss 15 will go negative at the point of connection of conductor 91. This in turn enables ramp delay and trigger pulse generator 33 to initiate operation and produce a trigger pulse of precise but low voltage amplitude at some point in time subsequent to turn-on of SCR 21 and determined by the setting of variable resistor 34. The low voltage trigger pulse is then amplified in the gating pulse amplifier 32 and supplied through gating pulse transformer 31 to the control gate of the chopper-inverter switching SCR 17 to cause it to turn-on and be commutated off automatically at a relatively high commutating frequency higher than the chopper-inverter operating frequency. For so long as power is called for by the temperature sensor circuit 24, the chopper-inverter will produce output pulses at an operating frequency of the order of 18-30 kilocycles per second as determined by the repetition rate of the gating pulses supplied to the gate of SCR 17 which in turn is determined by the setting of the variable resistor 34 and other parameters of the chopper-inverter circuit as discussed hereinafter. Upon reaching the set point temperature the temperature sensor and amplifier 24 will cause the start-up delay inhibit circuit 23 to inhibit further operation of the zero point switching control 22 so that the zero point switching SCR 21 is maintained off until such time that additional power is called for due to a drop in temperature of the pan being heated below the temperature value set by the control.

Figure 2:
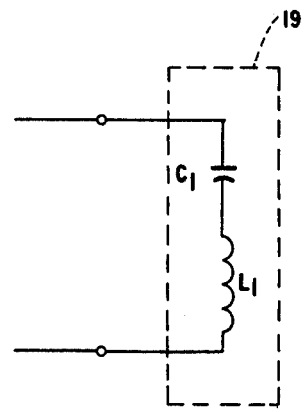
Figure 2A:
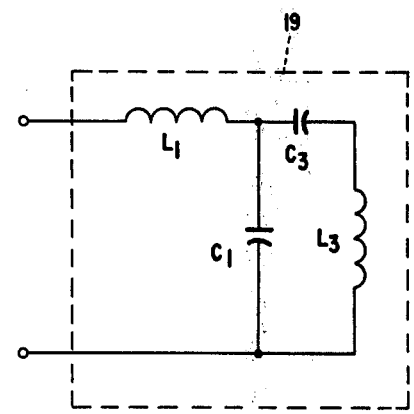

FIG. 2 illustrates one of the preferred constructions for the commutating circuit 19 while FIGS. 2A and 2B show alternative arrangements which will be discussed more fully hereinafter. In the FIG. 2 embodiment, a commutating coil $L_1$ also serves as the induction heating coil and hence constitutes the load for the power chopper-inverter. With such an arrangement, $L_1$ would be fabricated in the form of a pancake-shaped, spirally wound, planar coil and a metal based pan would be disposed over the coil $L_1$ when it is desired to load the circuit and heat the pan.

Figure 7:
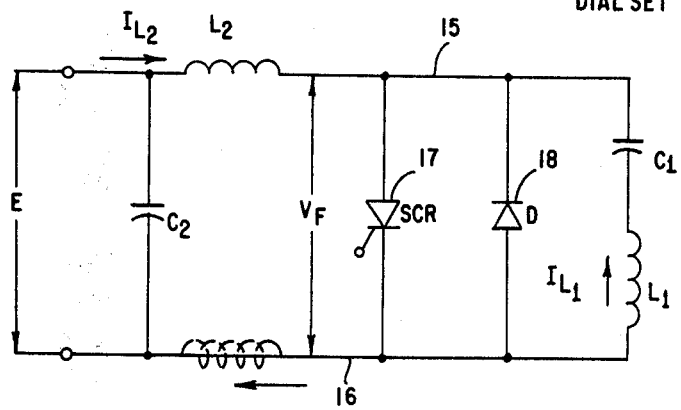
FIGS. 7–7H illustrate a series of waveforms typifying voltage and current relationships across several of the components of the power supply together with the frequency and reactance characteristics of an improved chopper-inverter power supply according to the invention.

FIG. 7 of the drawings illustrates all of the components of the new and improved chopper inverter power circuit showing the single $L_1$ $C_1$ commutating circuit arrangement of FIG. 2 connected in circuit relationship with the chopper SCR 17 and feedback diode 18 and with filter inductor $L_2$ and filter capacitor $C_2$. FIGS. 7A-7G of the drawings illustrate certain operating characteristics of the improved chopper-inverter circuit shown in FIG. 7. With the circuit arrangement of FIG. 7, it will be noticed that the filter inductor $L_2$ and filter capacitor $C_2$ are disposed intermediate the chopper SCR feedback diode 18 and the input power supply terminals having the input, fullwave-rectified unfiltered, high voltage supply E of the order of 120-170 peak volts applied to it. By reason of this arrangement, the filter inductor $L_2$ and capacitor $C_2$ need be designed to handle only the relatively small r-f current $I_{L2}$ drawn mainly from $C_2$ during each operating cycle or period T of the chopper-inverter, and is not required to handle the larger amplitude r-f load current $I_{L1}$ flowing in the commutating coil $L_1$ which in this case also serves as the induction heating load coil. This feature not only allows the use of smaller and less expensive $L_2$ and $C_2$ filter components for use with a power circuit of a given power rating, but also provides considerable operating advanges in reduced heating of the $L_2$ and $C_2$ filter components. The filter inductor must also carry the average current drawn from the source represented by $E_s$. If E is a DC source, the average current will have a fixed level proportional to the degree of circuit loading. If E is a full wave rectified source the average current will vary with the supply voltage and have a peak value again proportional to loading. The smaller r-f current is superimposed on the average level of current taken from the supply.

The chopper inverter circuit shown in FIG. 7 operates as a single SCR, series-capacitor commutated chopper-inverter in a manner well known to those skilled in the art. For a more detailed description of the construction and operation of series-capacitor commutated chopper-inverters, reference is made to the textbook entitled "Principles Of Inverter Circuits" G. D. Bedford and R. G. Hoft published by John Wiley and Sons Inc. of New York, New York-1964-Library of Congress card catalogue number 64-20078. Briefly, however, the operation of the circuit shown in FIG. 7 can be described as follows. The input supply potential E appearing across terminals 15 and 16 at any point during one of the full wave rectified half cycles will be of a polarity such that terminal 15 is positive with respect to terminal 16. It is assumed that the circuit previously has been enabled by the turn-on of zero point switching SCR 21 of FIG. 1, the commutating capacitor $C_1$ is charged, that the circuit is otherwise conditioned for operation, and that the temperature sensing control has called for the production of output power.

Upon the application of a gating-on pulse to the control gate of the SCR 17, the charge stored on capacitor $C_1$ will be oscillated through the now conducting SCR 17 and through inductor $L_1$ to reversely charge capacitor $C_1$ and turn-off SCR 17. $C_1$ and $L_1$ are designed to resonate at a predetermined commutating frequency so that upon turn-off of SCR 17 the reverse polarity change on capacitor $C_1$ and the collapsing lines of flux in $L_1$ causes a reverse current flow back through feedback diode 18 to return $C_1$ to substantially its original charged condition minus any losses due to loading on $L_1$. During this reverse current flow SCR 17 will be reversed biased and will be maintained off. Upon completion of the reverse current flow, feedback diode 18 will revert to its blocking condition thereby completing one oscillation or pulsed operation of the chopper inverter. Upon the application of another gating-on pulse to the SCR 17, the cycle is repeated. The frequency of application of the gating-on pulses determines the frequency of operation of the chopper-inverter and is always some frequency lower than the commutating frequency.

By varying the frequency of the gating-on pulses, the operating frequency and hence the average output power of the circuit can be controlled as explained hereinafter in connection with FIGS. 7-7G. Power is withdrawn from the circuit by loading the $L_1$ induction heating coil and the only power drawn from the alternating current supply terminals, is that required to make up for losses incurred due to loading of the $L_1$ induction heating coil during each operating period or oscillation of the chopper-inverter. If the $L_1$ heating coil is unloaded (on pan present) only minimal losses are incurred and excess power is fed back to the power supply via the feedback diode 18.

From the above brief description it will be appreciated that the chopper-inverter operates to generate large amplitude, sinusoidal pulses of current periodically spaced which flow in the commutating inductor $L_1$ at repetition rates which may extend to as high as 18-30 kilocycles/sec. The electro-magnetic field produced as a consequence of these high frequency, pulses of current is tightly coupled to a metal based pan or other object arranged in close proximity to $L_1$ to thereby inductively produce currents in the pan to cause it to be heated. During operation of the circuit only the r-f component of current $I_{L2}$ flowing in the filter inductor $L_2$ need be handled by the filter capacitor $C_2$. The average current componet of $I_{L2}$ is the current supplied to supply power to the load and compensate for losses in the circuit during each oscillation of the chopper inverter. This $I_{L2}$ rf component is small compared to the current $L_{L1}$ flowing in the load commutating inductive heating coil $L_1$ typically by a factor of one to ten. This feature of the inverter circuit in addition to the technique of gating SCR 17 on at a frequency lying within a predetermined critical frequency range of operation as described hereinafter provides a greatly improved operating mode for the series capacitor commutated chopper-inverter whereby the circuit can be operated substantially independently of loading.

Figure 7A:
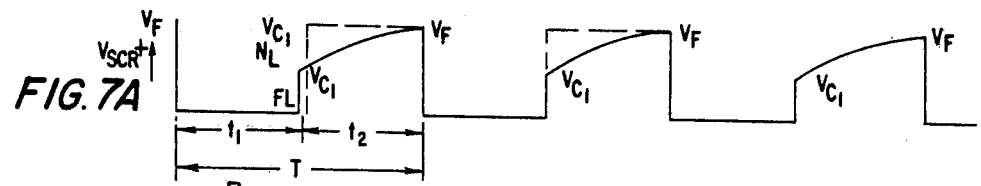
Figure 7B:
Figure 7C:
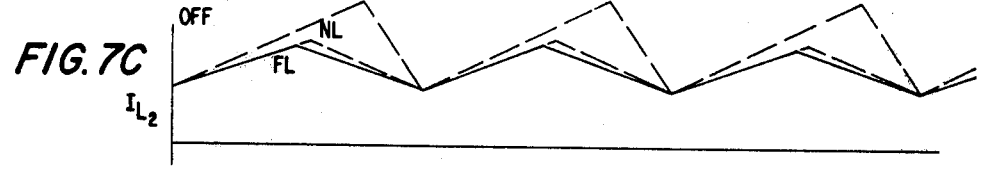

FIGS. 7A-7G illustrate several of the waveforms of the voltages and currents produced in the chopper inverter during each operating cycle. In FIG. 7B it will be seen that the combined SCR conduction and commutating period $t_1$ is comprised of an interval of time during which current $I_{L1}$ is flowing in the SCR 17 in the positive direction indicated by the arrow adjacent $L_1$ during the period $t_{1S}$ shown in FIG. 7B, and flows in the reverse direction back through feedback diode 18 during the period $t_{1D}$. The total $t_1$ period is determined by the commutating frequency of the commutating components $L_1$ and $C_1$ which in turn is determined by the values of $L_1$ and $C_1$. FIG. 7C illustrates a waveform of the current $I_{L2}$ flowing in filter inductor $L_2$ and drawn from the power supply. The filter inductor $L_2$ tends to smooth the current drawn from the power supply so that it extends over a full operating period T of the circuit where $T = t_1 + t_2 = 1/f$ and f is the operating frequency of the chopper inverter circuit.

Figure 7D:
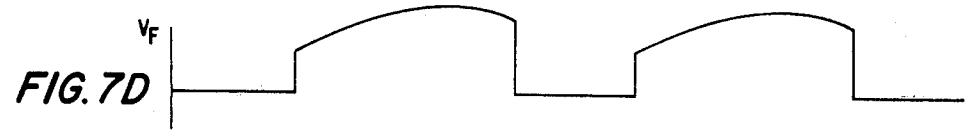
Figure 7E:
Figure 7F:
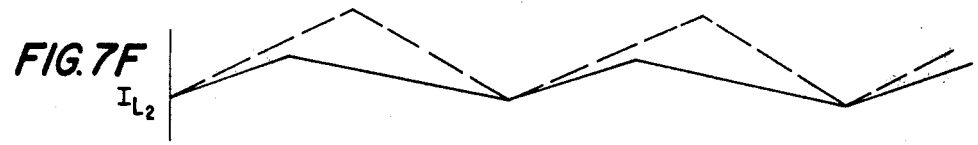

In FIG. 7A of the drawings it will be seen that a full operating period T of the chopper-inverter circuit is composed of the combined SCR conducting and commutating period $t_1$ plus a second variable timing or charging period $t_2$ determined by the ramp delay and gating pulse generator employed in the gating circuit that supplies gating-on pulses to SCR 17. By varying this second timing or charging period $t_2$ over some predetermined restricted range of values, the average output power from the circuit can be varied to thereby vary the amount of heat generated in the pan or other object being inductively heated. The rms heating value of the current $I_{L1}$ varies as $I_p \sqrt{t_1/2T}$ where $I_p$ is the peak value of the sinusoidal pulse. FIGS. 7D-7F of the drawings illustrate the nature of the various voltage and current waveforms for a more extended operating period T under which condition less average power will be generated by the circuit and hence less heat generated in the inductively heated object. This is due to the fact that at the lower operating frequency depicted in FIGS. 7D-7F there will be considerably less ampere-seconds of power current flowing in the heating coil $L_1$ than flow at the higher operating frequency depicted in FIGS. 7B-7D.

It will be further noted from a comparison of FIGS. 7A and 7B to FIGS. 7D and 7E that the interval $t_1$ which is determined by the parameters of the commutating components $C_1$ and $L_1$ remains fixed irrespective of the duration of the overall operating period T. Thus, it is the timing or charging period $t_2$ between the turn-off time of feedback diode 18 and the next successive turn-on of the SCR 17 that is varied to vary the average output power from the circuit by this technique. FIG. 7A shows the sharp rise in voltage across the SCR and diode pair due to the potenital on capacitor $C_1$ at the end of the commutating period $t_1$ illustrated as $V_{C1}$ in solid line for a full load condition following the turn-off of the feedback diode 18. If there is no load on the circuit $V_{C1}$ rises substantially to the dotted line value very close to the value $V_F$. The value $V_F$ represents the reapplied forward voltage appearing across the SCR 17 at the time of turn-on of the SCR. In prior known series capacitor commutated inverter circuits the value of $V_F$ is substantially dependent on the degree to which the circuit is resistively loaded. Generally it is necessary to provide a minimum level of loading to prevent $V_F$ from rising to several times the supply voltage E. In this circuit the value of $V_F$ can be made to be essentially independent of loading, theoretically including the case of no resistive loss, either in the inverter components or external loading. This is a very desirable operating characteristic and is obtained by properly relating the delay interval $t_2$ to the value of the filter inductor $L_2$ and the commutating capacitor $C_1$.

It has been determined through study and experimentation that if the value of the delay interval $t_2$ that serves as a quiescent charging period for a timing capacitor during each operating cycle T of the chopper-inverter, is maintained such that $\omega_2 t_2$ is substantially near $\pi/2$ radians or greater, where $\omega_2$ equals $1/\sqrt{L_2 C_1}$ for $L_2 >> L_1$, the reapplied forward voltage $V_F$ appearing across the SCR 17 following each conduction interval will be maintained substantially independent of load. The importance of this characteristic in an induction heating unit of the type visualized cannot be over emphasized. Consider for example a condition normally encountered in the kitchen where a pan (representing a full load condition) disposed over the inductive heating coil driven by the circuit, is suddenly removed without first having reduced the supply voltage E in some manner. Under such conditions the inverter will have become unloaded in a fraction of a second. In a circuit whose no load $V_F$ is large compared to the full load $V_F$, such a sudden change in loading can result in the generation of large surge voltages across the inductor. Since power switching semiconductor devices such as the SCR are designed and constructed to handle peak power surges within only limited voltage and current ratings, the occurrence of such peak voltages induced by sudden changes in loading could result in burn-out of the switching device. Burn out can also occur even if the load is removed slowly and if the reapplied forward voltage rises well above the value for which the device is rated. However, by proper design of the circuit as described above, and proper relation of the operating frequency to within the range of values prescribed, the reapplied forward voltage $V_F$ developed across the switching SCR can be easily maintained substantially within predesigned levels (for example within 10%). As a result it is possible to obtain the greatest output power using a given SCR switching device of known rating without fear of burn-out by peak over voltages produced during radical changes in loading.

The above described desirable operating characteristic is exemplified for any given supply voltage E by the following expression relating the value of the reapplied forward voltage $V_F$ to supply voltage E:

$$\left[ \frac{V_F}{E} = \frac{\frac{t_1}{\sqrt{L_2 C_1}} \cdot \sin \omega_2 t_2 + 1 - \cos \omega_2 t_2}{1 - e^{\frac{-R t_1}{2L_1}} \cos \omega_1 t_1 \cos \omega_2 t_2} \right] ; t_1 = \sqrt{L_1 C_1} \quad (1)$$

The term R appearing in the exponential factor in the denominator of expression (1) represents the effective resistance introduced in series with the induction heating coil due to loading by the metal-base pan. The greater the heat produced the higher is the value of R. It will be seen from expression (1) that if the term $\omega_2 t_2$ is maintained at or near a value $\pi/2$, the exponential term in the denominator which includes the loading resistance R disappears since it contains the factor $\cos \omega_2 t_2$ which at $\pi/2$ is equal to zero and the entire expression can be reduced to show that:

$$\frac{V_F}{E} = 1 + \frac{\pi}{2} \frac{t_1}{t_2}$$

which is independent of loading.

The power induced in the metal-base cookware or other load being heated by the inductive heating coil can be calculated with no restriction on $\omega_2 t_2$ in accordance with the following expression for an instantaneous value of load coil current $i_1$:

$$P = R \left[ \frac{1}{t_1} \int_0^{t_1} i_1^2 \, dt \right] \cdot \frac{t_1}{T} \quad (2)$$

neglecting the small level of power delivered to the load during the quiescent period $t_2$.

$$P = \frac{R}{T} \cdot V_F^2 \cdot \frac{C_1}{L_1} \int_0^{t_1} e^{\frac{-Rt}{L_1}} \sin^2 \omega_1 t \, dt \quad (3)$$

$$P = \frac{R}{T} \cdot \frac{V_F^2 C_1}{L_1} \cdot \frac{L_1}{R} \left[ 1 - e^{\frac{-Rt_1}{L_1}} \right] \frac{2\omega_1^2}{4\omega_1^2} \quad (4)$$

assuming $\omega_1 t_1 = 2\pi_1$ and $\frac{R}{L_1} << 2\omega_1$ $$P = \frac{C_1 V_F^2}{2T} \left[ 1 - e^{\frac{-Rt_1}{L_1}} \right] \quad (5)$$

As an example suppose that the pan reflects a resistence of 1 ohm into the circuit and that $V_F = 400$ volts, $C_1 = 1$ mfd, $L_1 = 22$ uh, and T+50 us. With these parameters an output power is generated equal to 1200 watts. This is very close to the levels observed experimentally.

From a consideration of equation (5) it will be seen that by varying period T, the output power developed by the circuit can be varied. The value for $V_F$ in terms of E in equation (1) is substituted in Equation (5) to find power independently of the dependent variable $V_F$ and in terms of the repetition time T where $t_2$ is ($Ft_1$).

In order to avoid the need for solving equations (1) and (5) simultaneously, it is possible to show that in the region near $\omega_2 t_2 = \pi/2 V_{F/E}$ varies as an inverse function of T assuming $t_1$ is constant. This has been demonstrated to be true by actual measurement of on opeating inverter having a circuit like that of FIG. 7, and that $V_{F/E}$ varies closely as $k/T^2$. Substituting this empirical relationship in equation (5), equation (5) takes the form:

$$P = \frac{kE^2 C_1}{2T^3} \left[ 1 - e^{\frac{-Rt_1}{L_1}} \right] \quad (6)$$

From a consideration of equation (6) and assuming that the frequency, f, of operation of the chopper inverter can be varied between say 30 kilocycles per second and 20 kilocycles per second by changing $t_2$ which changes $t = 1/f$, it will be seen that for a 1.5 to 1 variation in frequency over the range from 30 to 20 kilocycles/sec a variation in power output of the order of 3.4 to 1 can be obtained. Additionally, from examination of equation (6) it will be seen that the power output can be changed by changing $C_1$. If $t_2$ is kept constant, T will vary as $t_1$. Also, $t_1$ varies as $\sqrt{C_1}$. The resultant effect of a change in $C_1$ with $t_2$ constant is that the power produced increases almost linearly with $C_1$. Power output from the circuit can be varied over an extremely wide range through the use of a suitable capacitor switching scheme in a similar manner to that described more fully hereinafter in connection with FIG. 2B of the drawings. Also, it is possible to separately control power by holding T constant and varying $C_1$ alone, and if desired, one can separately adjust $C_1$ to some fixed value which thereafter is maintained constant and again control power output by varying T with $t_2$ at the new adjusted value of $C_1$.

The improved chopper inverter circuit as described above has certain undesirable operating characteristics which can be overcome with the modification of the circuit illustrated in FIG. 2A and 2B of the drawings. Because the current through the commutating coil $L_1$ consists of a series of intermittent sinusoidal pulses and the voltage across this coil rises and falls steeply at the beginning and end of each sinusoidal pulse at an 18–30 kilocycle/sec rate, considerable electromagnetic radiation of harmonics lying within the radio frequency spectrum can occur to thereby produce what has become known as radio frequency interference emission (RFI) of the near field variety. To reduce the local RFI of the circuit, an RF smoothing circuit is coupled across one of the commutating components and is comprised by a smoothing inductor $L_3$ and a smoothing capacitor $C_3$ connected in series circuit relationship across the commutating capacitor $C_1$. The combined impedance of the smoothing inductor $L_3$, the smoothing capacitor $C_3$, and the commutating capacitor $C_1$ should be capacitive in nature and series resonant with the commutating inductor $L_1$ at the desired commutating frequency so as to establish the commutating period $t_1$ in accordance with the relationships heretofor discussed. With such an arrangement, the smoothing inductor $L_3$ will be designed in the manner hereinafter discussed with relation to FIG. 3–3E to act as the heating coil over which the pan or other metal-based cookware is disposed for heating. Where provided, the $L_3$ smoothing inductor and $C_3$ smoothing capacitor serve to shape the output load current flowing through smoothing inductor $L_3$ to substantially a sinusoidal wave shape having little or no radio frequency interference emission effects. Then by disposing the remaining components particularly inductor $L_1$ within a shielded housing or chassis, the entire chopper inverter can be made to have little or no RFI emission effects on nearby radio and other electronic equipment.

In addition to shaping the current flowing through the $L_3$ heating coil to a substantially sinusoidal wave shape to thereby reduce RFI effects, the smoothing inductor $L_3$ and capacitor $C_3$ provide additional, very important operating advantages. Due to the improved sinusoidal wave shape of the current flowing in $L_3$ substantially continuous coupling to a pan load with consequent improvement in heating of the pan, is achieved. Also, improved impedance matching or transformation between the $L_3$ heating coil and the pan load is provided to maximize coupling of power to the pan within the constraints dictated by the physical construction of the $L_3$ heating coil and pan support. The essentially constant $V_F$ characteristic of the basic series capacitor commutated chopper inverter of FIG. 2 is carried through and is reflected in substantially constant voltage and current in the $L_3$ heating coil which are independent of loading. Further, loading of the $L_3$ heating coil due to the presence of a pan, results in a phase shift between the voltage and current from a substantially quadrature phase relation under no load conditions resulting in little or no loss of power where no pan is present) to one having a component of current that is in-phase with the voltage. The magnitude of this in-phase component determines the power delivered to the pan by $L_3$. This phase-shift control of output power is achieved while maintaining substantially constant voltage and current magnitude. This constancy of voltage and current across $L_3$ from no-load to full load conditions assures no destructively high potentials when the pan is removed. This important characteristic is made possible because of the ability of the circuit to return excess energy back to the power supply by means of the feedback in a manner to be explained more fully hereinafter in connection with FIG. 7B. The combinations of all these advatageous features in a single circuit contributes to the generation of maximum output power and overall efficiency. within the safe concurrent ratings of the circuit components, the chopper SCR and feedback diode.

FIG. 2B of the drawings illustrates still another form of construction for the commutating circuit components including the series connected smoothing inductor $L_3$ and smoothing capacitor $C_3$ connected across the commutating capacitor $C_1$. In FIG. 2B, the commutating capacitor $C_1$ is comprised by a plurality of parallel connected commutating capacitors $C_1$, $C_{1A}$, $C_{1B}$, etc which may be selectively connected in parallel circuit relationship by selective actuation of selector switches 25A, 25B, etc. In this manner the total commutating capacitance can be selected so as to alter the power output P developed by the chopper-inverter circuit linearly in proportion to the value of the commutating capacitor in the manner defined by equation (6) above. It is desirable that such switching of the commutating capacitors take place only during quiescent intervals of the power circuit (non-conducting period of SCR 17 and diode 18) so as to avoid arcing between the contacts of the switches employed to switch the capacitors. The manner in which this is accomplished will be described more fully hereinafter in connection with FIG. 4 of the drawings which illustrates a preferred form of constructing the invention.

FIGS. 7C and 7F illustrate the effect of full load and no load conditions respectively for different values of T (ie operating frequency) and also for different values of commutating capacitance switched into the chopper-inverter power circuit in the manner described above. In FIGS. 7C and 7F, the solid line curves are intended to illustrate the waveshape of the current $I_{L2}$ drawn from the power supply during each operating period T of the chopper-inverter circuit for a given relatively low value of commutating capacitance $C_1$. If in accordance with the circuit of FIG. 2B an increased value of commutating capacitance is employed by switching in additional capacitors $C_{1A}$, $C_{1B}$, etc. then the period $t_1$ representative of the SCR 17 condition and commutating period will be increased proportionally due to the change in commutating frequency of the circuit. This change will increase the conducting interval $t_{1S}$ of the SCR and accordingly draw a proportionally larger current from the power supply in the manner indicated by the dotted line $I_{L2}$ curves shown in FIG. 7C. It will be appreciated from a consideration of the dotted line curve of FIG. 7C that a proportionally greater amount of ampere-seconds are withdrawn in a given operating period T so as to in effect increase the rate of power production of the chopper-inverter circuit at a given operating frequency. Thus, by employing a circuit such as shown in FIG. 2B that allows capacitor switching to provide for an increased rate of power production at any given operating frequency together with variable frequency control of the average output power, quite a wide range of control over the output power of the chopper-inverter is made available.

FIG. 7F also shows the $I_{L2}$ and lower average $I_{DC}$ currents that flow under no-load conditions, It will be observed in FIG. 7F that under no-load conditions the average DC level of the current flowing in $L_2$ is considerably lower than the levels shown in FIG. 7C curves, and is of a magnitude determined by the losses in the circuit. The peak to peak magntude of the chopper frequency current actually increases in going to the no-load condition; however, the negative going half cycles of the chopper frequency currents equal substantially the positive half cycles except for losses encountered in the circuit and the rms average value of power consumed (represented by $I_{DCNL}$ in FIG. 7F) is quite low thus contributing to improved overall efficiency. During the negative half cycles with represents the intervals of feedback diode conduction, current is being supplied back into the power source and not expended except for losses which generally are quite low for the order of ten percent (10%) at most. Hence, it will be appreciated that the chopper-inverter circuit automatically assumes this low power consumption condition upon removal of load even with a full power-on setting and can be kept in a full-on, no load standby condition for extended intervals without any extensive wastage in power. This is in contrast to a resistance heating element which continues to waste large amounts of power if a pan is removed from it.

Figure 7G:
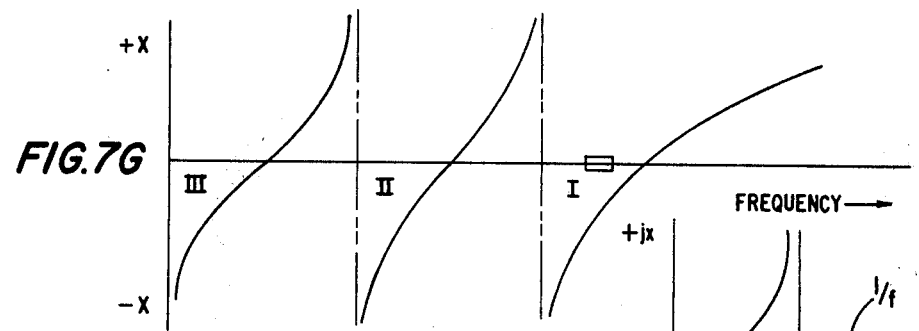
Figure 7H:
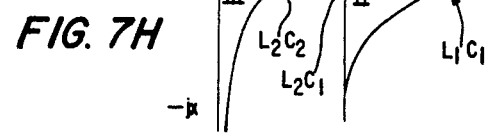

FIG. 7G of the drawings illustrate a series of the reactance vs frequency resonance diagrams for chopper-inverter commutating circuits of the type shown in FIGS. 2A and 2B. This diagram depicts series and parallel resonance points as indicated in FIG. 7G of the interconnected L-C circuit components as seen from the terminals of the SCR and diode. Chopper inverter operation can be sustained only in frequency regions I, II, III where the reactance is capacitive. The areas III and II of the diagram define low frequency operating mode regions determined primarily by the value of $L_2$. The chopper-inverter is operated in mode I to affect coupling from $L_3$ to the pan load in the manner hereinbefore described. Operation at frequencies in mode regions III and II is to be avoided not only because the transfer of power via $L_3$ becomes usually low but because high circulating current are established which can be destructive to circuit elements or otherwise trip circuit breakers or other protective devices associated with the circuit. The operating frequency of the chopper-inverter should be restricted to the range of values defined within the mode I region where the $L_3C_3$ smoothing circuit arrangement such as is shown in FIGS. 2A and 2B is employed. In circuits employing only the $L_1C_1$ commutating components using $L_1$ as the heating coil with no $L_3C_3$ smoothing circuit, the mode diagram appears as shown in FIG. 7H. With such circuits, operation is within region II.

FIG. 3 is a combined functional schematic diagram and partial cross sectional view of a preferred construction of the induction heating coil and temperature sensing arrangement for a flat top range using induction heating as a home appliance cooking unit fabricated in accordance with the teachings of the present invention. The schematic arrangement shown in FIG. 3 illustrates the manner in which a spirally wound, planar induction heating coil 41 is physically mounted with respect to and supported under an insulating support member 49 that is transparent to both magnetic lines of flux and infra red heat rays and forms a suitable cooking surface. The manner in which the induction heating coil 41 is wound will be described more fully hereinafter in connection with FIGS. 3A–3C, but for purposes of the instant discussion will be assumed to have a central aperture opening 42 and may be potted in a suitable insulating potting compound or otherwise rigidified so that it forms a relatively rigid planar member. The inductive heating coil 41 could comprise either the $L_1$ coil of FIG. 2 or the $L_3$ coils of FIGS. 2A and 2B and is supported upon a plurality of spaced-apart insulating supporting blocks 43. Blocks 43 in turn are supported upon a flat, highly conductive, planar metal member 44 having a central aperture opening 45 aligned with the central opening 42 in the inductive heating coil 41. The conductive metal support member 44 in turn is secured by a plurality of spaced apart metal pins 46 that suspend from conductive mounting ring 47 of aluminum or similar metal of high conductivity secured around the periphery of an opening in a counter top 48 and having a plurality of spaced-apart holes or opening to allow for the passage of cooling air. The inductive heating coil 41 is disposed under the opening in the counter top 48. A heat and magnetic flux transparent insulating meamber 49 is seated within the opening on a suitable indented ridge or L-shaped lip formed in the counter top 48, and is fabricated from a pyroceramic or some other material which is transparent to infra-red heat rays as well as to lines of magnetic flux and is sufficiently rigid to support a pan or other metal base cookware 51. The entire arrangement is such that cooling air is allowed to flow between the spaced apart openings in 47 and between 43 pins 44 so as to maintain the inductive heating coil 41 relatively cool during operation. The counter 48 may be of sheet relatively cool during operation. The counter top 48 may be of sheet metal, wood, ceramic tile or any other conventional counter top material However, it is preferred that the opening in the counter top 48 be surrounded with a flux concentrating ring section 47 and that planar supporting member 44 be of aluminum so as to tend to concentrate the lines of magnetic flux from the induction heating coil into the metal based pan 51 or other cookware. As an alternative, the pyroceram member may constitute only a small infra-red transparent window area imbedded in a suitable pan supporting member 49 secured in the counter top 48 with the window area being centered over the aligned apertures 42 and 45.

Disposed immediately below the aligned centeral openings 42 and 25, is an infra-red light chopping device 52 driven by a small motor 53 of conventional construction. The light chopping device 52 is positioned so as to interrupt the view of an infra-red radiation sensor device 54 supported below the aligned central openings 42 and 45. If desired, a reflector 55 tends to concentrate infra-red rays emitted from the bottom of the inductively heated metal base cookware 51 onto the infra-red sensor 54 positioned to view directly the bottom of the pan 51 through the infra-red ray transparent supporting member 49 and the aligned openings 42 and 45. The light chopper device 52 periodically interrupts the view of the infra-red sensor so as to develop an alternating current component in the output signal produced by the infra-red sensor. The amplitude of this alternating current signal component will be representative of the temperature of the bottom of the inductively heated metal based cookware 51 and will be substantially independent of changes due to changes in ambient temperature of the air surrounding the sensor as well as long term changes in the temperature of the sensor itself. It will be appreciated that the presence of the metal base pan 51 is required in order to produce heat from the electro magnetic induction field produced by the induction heating coil 41. Since the heating coil 41 has little or no resistance, it runs cool thereby contibuting to the overall efficiency of the apparatus. Likewise the pan supporting member 49 remains cool and whatever heating of members 49 does take place, is due to transfer by convection and conduction from the bottom of the inductively heated pan 51. Preferably, the member 49 is fabricated with an irregular surface to provide multipoint support for pan 51 which tends to minimize transfer of heat back from the pan to the supporting member and the coil due to conduction and convection. Since the pyro-ceram member 49 is an insulator, very little or no heat is transferred to this member and substantially all of the heat produces useful work in maintaining the cookware 51 at a desired temperature. Since the temperature sensor directly senses the temperature of the cookware 51, a very fine degree of control over the actual cooking temperature of the pan is exercised.

FIG. 3A of the drawings illustrates one preferred form of fabricating the induction heating coil 41 in a manner to increase coupling to a metal-base pan or other cookware. In FIG. 3A a plurality of strands A,B,C and D of insulated conductor wires are interwoven together to form a composite insulated cable which is helically wound in a planar coil having a central aperture opening. Each of the strands A, V, etc in turn may be formed from individual insulated conductors and in fact may comprise commercially available Litz wire of a suitable conductor rating such as number 6 or number 8 conductor. FIG. 3B of the drawings illustrates the manner of interconnecting the individual Litz wire stands A, B, C and D in a serial manner to form input and output terminals $T_1$ and $T_2$. From an examination of FIG. 3B, it will be seen that the inner terminal point A' of Litz wire stand A is connected back to input point B of the Litz wire strand B, B' to C, C' to D and A and D' comprise the input and output terminals $T_1$ and $T_2$. FIG. 3C of the drawings illustrates an alternative manner of fabricating the inductive heating coil by cross connecting the several strands A, B, etc to form two sets of parallel connected strands and appropriately interconnecting respective inner and outer terminal points on the parallel connected strands to form the coil. Thus, the A and B ends of strands A and B are connected together and the C and D ends of strands C and D are connected together with the C and D end of the C and D strands being connected back to the A' and B' ends of the A and C strands. With this arrangement, the A and B ends of the A and B strands and the C' and D' ends of the C and D strands comprise the input and output terminals $T_1$ and $T_2$ for the induction heating coil. By thus fabricating the induction heating coil, different degrees of magnetic coupling to the metal based cookware 51 can be accomplished and some measure of control can be exercised over the resulting inductance value as well as the interwinding capacitance of the inductive heating coil structure.

FIG. 3D of the drawings illustrates an alternative construction to that shown in FIG. 3 wherein a pan-shaped ferrite core member 56 having a central aperture opening 57 is provided, and the inductive heating coil 41 is disposed within and supported by the pan-shaped ferrite core member 56 beneath the surface of the infra-red heat transparent member 49 that supports the metal-based cookware 51. The ferrite core member 56 may be formed from a high temperature Ni-Zn ferrite composition having a permeability of over 100° to 500° F. and would be supported by any suitable means for securing core member 56 to counter top 48 with a small air gap being provided between the core member and the counter-top if the counter-top is steel. The entire arrangement would be arrayed with the central aperture openings disposed over an infra-red sensor and chopper device in a manner similar to that shown in FIG. 3. The arrangement of FIG. 3D would operate similarly to that of FIG. 3 but would provide reduced air path length (lower reluctance), reduces stray flux on the underside of the coil to a negligible level, and provides improved magnetic coupling to the metal based pan 51 during operation. Hence, a greater level of heating power can be developed for the same levels of circulating current. Additionally, because of the more tightly coupled flux paths, it would be possible to mount the unit in a metal counter top and space the edges of the metal top closer to the ferrite support member without generating heat in the countertop. Further, the ferrite core provides considerable shielding of the flux from other metallic objects such as supporting members allowing these to be more closely spaced and fabricated of any desired material. It also reduces local RFI from the chopper-inverter of FIG. 2 to a tolerable level where no $L_3C_3$ smoothing circuit is employed. This provides for some savings in space in addition to improved efficiency in operation although the cost of the ferrite core member will add to and increase the overall weight and cost of the induction heating apparatus somewhat. It might be further noted that the ferrite core 56 would be used only with respect to the $L_1$ or $L_3$ heating coils where there is no DC component present to saturate the core. Hence, the likelihood of producing unwanted peak currents due to core saturation which might burn-out the chopper SCR, is greatly reduced.

FIG. 3E of the drawings illustrates an alternative combined fan-infra-red heat chopper device which can be used in place of the single infra-red heat ray chopper 52 shown in FIG. 3. In the FIG. 3E arrangement a single motor 53E drives not only the chopper blades 52E but also drives fan blades 58 for causing a positive flow of cooling air around the induction heating coil and through the spaces beneath the pan supporting member 49. With the arrangement of FIG. 3E, an opening 59 in the housing of fan motor 53E is provided for allowing infra-red radiation from the bottom of the inductively heating pan 51 to pass through and be chopped by the light chopper blades 52E and impinge upon the infra-red heat sensor 54 disposed within the housing. The chopper blades 52E and the fan blades 58 are driven from a common shaft rotated by the motor 53E at the same speed. For example a chopping rate of the order of 54 cycles per second is easily obtained and utilized. With this arrangement, positive cooling of not only the induction heating coil and the spaces around the coil is provided but also improved temperature stability of the environment in which the infra-red heat temperature sensor and its associated semiconductor amplifier components are located, is obtained.

Figure 4:
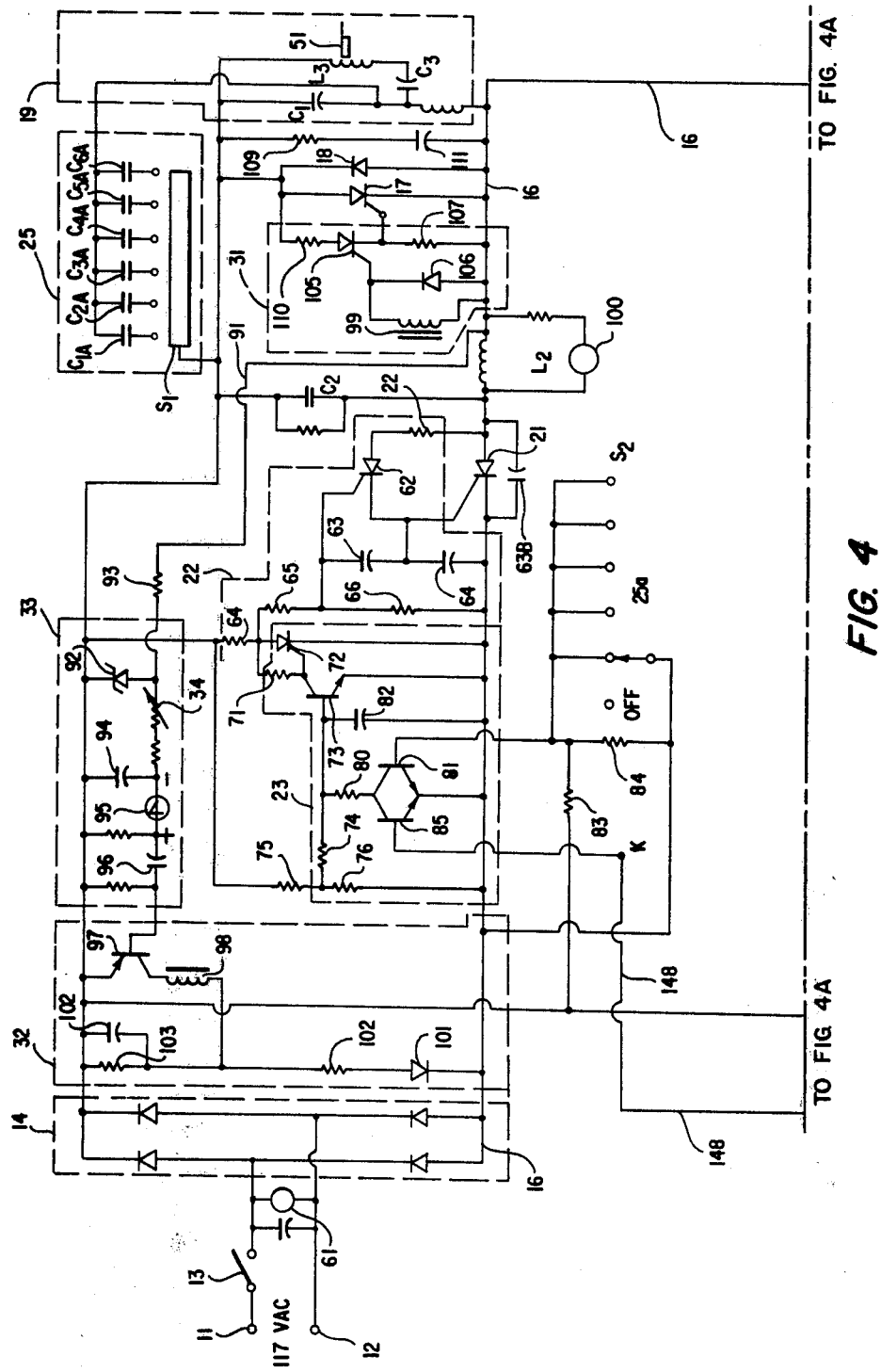
FIGS. 4 and 4A are detailed circuit diagram of the improved power supply and control circuit for induction heating apparatus shown schematically in FIG. 1.

FIG. 4 is a detailed schematic circuit diagram of an improved metal base cookware induction heating apparatus having an improved chopper inverter power supply and gating control circuit using an infra-red temperature sensor. In FIG. 4 the induction heating coil $L_3$ for heating the metal-based pan 51 may be fabricated in the manner shown in FIGS. 3-3E, or any other known suitable manner, and is driven by a chopper inverter of the type shown and described in relation to FIG. 2B of the drawings. In FIG. 4, the several subcircuits that comprise the overall induction heating apparatus are arranged within dotted outline blocks that correspond to the blocks identified in the overall system block diagram shown in FIG. 1 of the drawings. In the following description each of the several subcircuit blocks will be described in detail along with its relation to the control over the operation of the chopper-inverter power supply circuit comprised by commutating components 19, inductive heating coil $L_3$ and the chopper SCR 17 and feedback diode 18.

As shown in FIG. 4, a fullwave rectifier 14 of a conventional bridge circuit construction is comprised of four power diodes, connected to form two series front-to-back sets of two diodes each with each of the two series sets connected in parallel. Alternating current from a conventional commercial or residential 115 volt, 60 cycle 15-30 amp supply is connected to the full wave rectifier through suitable fusing and on-off circuit breaker switches such as 13. An indicator light 61 may be connected across the supply terminals to the full wave rectifier 14 for indicating when the circuit is turned on. The output from the full wave rectifier 14 appearing across supply terminals 15 and 16 is in the form of a undirectional, unfiltered full wave rectified voltage consisting of a series of sinusoidally-shaped, half cycle voltage pulses that drop to zero voltage once each half cycle and have the general waveshape indicated above supply terminal bus 15.

As described above with relation to FIG. 1, the full wave rectifed, high voltage excitation potential appearing across terminals 15 and 16 is not applied to the chopper inverter circuit until such time that zero point switching SCR 21 is turned-on by means of the zero point switching control 22 and start-up delay inhibit screen 23. Because the zero point switching SCR 21 must be capable of handling the substantial $I_{L2}$ current which is considerably above signal device levels, it must be a power rated device. Such power rated devices generally require a substantial turn-on gate signal, and for this purpose a turn-on switching SCR 62 is provided. SCR 62 is a smaller SCR than the power switching SCR 21 and provides a turn on gate current in the order of 50 milliamperes derived from the voltage across SCR 21 just before SCR 21 is turned on by gating SCR 62. SCR 62 requires only 200-500 microamperes of gating current and hence the sensitivity of the zero point switching circuit 22 is greatly increased so that it will turn on SCR 21 under command at or just beyond the zero voltage point of the next half cycle of the unfiltered, full wave rectified high voltage supply potential following the command to turn-on.

It will be recognized that SCR 21 controls the charging of capacitor $C_2$ in response to the presence or absence of signal at its gate. The gate signal is in phase with the supply voltage E, and applied from time $t_o$ onward or not at all.

Since SCR 21 is turned on near zero voltage at start-up, capacitor $C_2$ is charged in phase with the half sinusoidal voltage wave. Thus, when the line voltage is applied there is no high surge current passed through the bridge rectifier to charge $C_2$ as would flow were SCR 21 connected directly across the rectifier when the breaker 13 is closed. In the latter case a small series resistor of say $\frac{1}{2}$ ohm is often employed on either the AC or DC side of the rectifier to limit the charging current of about 150 amperes, which is a typical maximum rating for the diodes in the bridge. While such a series resistor will limit the current it also will dissipate a considerable amount of power at full load when a current of say 12 amperes is flowing into the inverter; in this case about 72 watts. A power loss of this magnitude can markedly reduce the normally high efficiency of the chopper-inverter and require extra cooling to remove the excess heat. Thus a goodly amount of heat which should be used to heat a metal base pan becomes unavailable and must be removed from the unit. By charging the capacitor $C_2$ (which is normally of the electrolytic variety) starting at a low voltage which then increases first along a nearly straight line determined by the change in slope of the capacitor $C_2$ voltage and then follows along the half wave supply voltage. The charging current is always much lower than the maximum load current so that the bridge rectifier is not subjected to high surge currents. Since no series resistor is required, no power loss is encountered. Also capacitor $C_2$ is only charged when SCR 21 is conducting. Thus when the inverter is in a standby condition with SCR 21 not conducting, there is no voltage on capacitor $C_2$ and it is not subject to a continual voltage stress. As a result, the life of the capacitor $C_2$ in actual service where the inverter is cycled on and off to hold typical cooking temperatures, is extended considerably over the life to be expected if the capacitor were to be connected to the rectifier output and kept continuously on line.

A pair of series connected capacitors 63 and 63A are connected across the gate of SCR 62 to supply terminal 16, and have their midpoint connected ot the interconnection of the cathode of SCR 62 and control gate of SCR 21. The capacitors 63 and 63A are provided to prevent firing of the SCR 62 (and hence SCR 21) upon initial plug-in and start-up of the circuit. Capacitor 63B shunts SCR 21 to prevent dv/dt firing of this device upon initial plug-in and start up. Capacitors 63 and 63A and the control gate of SCR 62 are connected to a tap point on a resistor voltage divider comprised by resistors 64, 65 and 66 connected in series circuit relationship across the high voltage power supply terminals 15 and 16. By reason of this connection, it will be appreciated that normally, if no inhibiting action were taken, as the voltage across power supply terminals 15 and 16 builds up from the zero point during each sinusoidally-shaped, voltage half cycle, the control gate of low voltage switching SCR 62 will be driven sufficiently positive by the bias developed across resistors 64-66 to cause it and hence SCR 21 to turn-on.

When the SCR 21 is conducting the rectifier 14 output terminals, capacitor $C_2$ and the chopper-inverter are connected in parallel with each other, the voltage across the capacitor departs from a half sinusoidal form in proportion to the degree of resistive loading due to the inverter. Under heavy shunt loading capacitor voltage $VC_2$ and supply voltage E follow essentially the same sinusoidal wave shape except near the zero point and the supply current $I_{21}$ through the SCR 21 is essentially sinusoidal.

With light loading the capacitor voltage $VC_2$ decays more slowly than the half sinusoidal supply voltage and follows an exponential curve determined by the input resistance of the inverter. Since the loading is light in this case, there is a considerable length of time around the zero point where the voltage E is less than the capacitor voltage and the anode voltage on SCR 21 is negative so that it cannot conduct. Thus SCR 21 consequently turns off at time ta and back on at time tb assuming gate signal is continuously supplied beyond the zero point $t_o$. In the off interval the gate signal follows the half sinusoidal wave to zero to permit a choice of turning on the SCR on the next half cycle or not. Thus zero point control is preserved even though the voltage on $C_2$ and supplied to the inverter never drops to zero. The corresponding current flow through SCR 21 is shown in FIG. 7E and consists of a half sinusoid truncated to form leading and trailing edges at times tb and ta where the SCR 21 turns on and turns off as determined by the potential on $C_2$. The rise time at tb is much slower than that which is typical of a phase controlled SCR since an adequate and continuous signal for turn-on is already applied to the gate of the SCR nearer the zero point that tb so that current begins to flow as soon as $E-VC_2$ becomes positive at a rate determined by the difference in slope of the voltage curve. Rise times of perhaps only 5 amps in 0.1 ms are typical corresponding to a 10 kilocycle wave. Any inductance in the supply system tends to slow down this rate of rise still further. This current wave is not found to generate a significant level of EMI compared to that characterisitic of ordinary SCR phase shift control. Also as the magnitude of the current drawn increases with inverter loading, the current wave approaches a sinusoidal shape and the EMI level is even less than it is at no load.

In order to inhibit firing of the low voltage switching SCR 62 both at the time the system is energized by closing breaker 13 and at other times when the inverter is turned off and then on in response to manual or temperature control, an inhibiting SCR 72 is provided as part of the start-up delay inhibit circuit 23 and is connected between the juncutre of voltage divider resistors 64 and 65 and terminal 16. It will be appreciated that while the inhibiting SCR 72 is conducting, the juncture of 64 and 65 will be clamped to the potential of terminal 16 and will prevent firing or turn-on of switching SCR 62. The inhibit SCR 72 has its control gate connected directly through a gate resistor 71 to its anode so that as soon as voltage appears across SCR 72 it will be turned on. The delay inherent in the RC network coupling to the control gate of low voltage switching SCR 62, inhibits the gating voltage to SCR 62 from a turn-on value before SCR 72 turns on. The action is comparable to having a normally closed relay contact across the gate to cathode of SCR 21 at start up. As a consequence, inhibiting SCR 72 normally will inhibit or prevent firing of the low voltage switching SCR 62 in the absence of any other control and therefore at plug-in and/or closure of breaker 13 the chopper inverter will not be energized. The circuit holds off gating signal to SCR 62 reliably for the case of an intermittent application of power from the power line which can arise when an operator attempts to operate the breaker on and off rapidly or inserts the line cord into an outlet in a slow, deliberate fashion. No arcing will occur at the plug regardless of the manner in which it is inserted. This is an important feature in avoiding operator hazards and possible harm to the chopper-inverter components.

The control gate of inhibit SCR 72 also is connected to the collector electrode of a first NPN clamping transistor 73 having its emitter connected directly to terminal 16. The base of first clamping transistor 73 is connected through a charging resistor 74 to the juncture of a pair of voltage dividing resistors 75 and 76 which in turn are connected in series circuit relationship across the high voltage power supply terminals 15 and 16. A large capacitance, low voltage, capacitor 82 is connected between the gate of 73 and terminal 16. By reason of this connection positive voltage supplied from the juncture of resistors 65 and 66 through 74 builds up slowly across capacitor 82 until it causes the first clamping transistor 73 to be turned-on and to clamp the gate of the inhibiting SCR 72 to the potential of terminal bus 16 thereby preventing SCR 72 from being turned-on during subsequent half cycles beyond the half cycle during which the gate voltage on SCR 72 is clamped below the turn-on level. Thus, it is seen that there are in essence contradicting inhibits in the form of the first clamping transistor 73 and the inhibiting SCR 72 which counteract each other, and, if no further control is imposed, and after a brief delay of about 1 second set by resistors 64, 65, 66 and capacitor 82, zero point switching SCRs 62 and 21 would be allowed to turn on just beyond the zero point in voltage as the rectifier voltage builds up between positive terminal bus 15 and negative terminal bus 16. However, additional controls are imposed on the operation of the clamping transistor 73 through the medium of the temperature sensing control circuit 24 and of the heating rate control 25–25a, and any other control such as an over current sensor, an over temperature sensor or other protective control device which may be provided as described hereinafter.

From the foregoing discussion, it will be appreciated that the zero-point switching control contains no means of storing energy for turning on SCRs 62 and 21 at precisely the zeros in supply voltage and instead, the supply voltage must rise sufficiently to derive a gate signal. This is no disadvantage since the potential from anode to cathode of SCR 21 becomes positive at a time which is always later than the zero point time because of the residual potential which subtracts from the SCR 21 voltage and is stored on capacitors of the chopper inverter circuit beyond SCR 21. Thus, gating signal will be applied to SCR 21 ahead of the time when its anode voltage will become such as to allow it to become conducting. It should be further noted that because of charge storage in the chopper-inverter capacitive components, a continuous gating signal is required at the gate of SCR 21 through each half cycle of on-time in order to accomodate the wide range of delay in the time when the anode voltage of SCR 21 becomes positive, and allows SCR 21 to conduct.

It will be recalled from the description of FIG. 2B that the heating rate control 25 actually comprises a switching arrangement for switching a set of capacitors in or out to change the commutating capacitance $C_1$ in discrete steps. In FIG. 4, it will be seen that the switching arrangement in actuality comprises two switches $S_1$ and $S_2$ and these are ganged together in mechanical fashion. One of the switches S1 is a progressively shorting switch which stepwise connects the several commutating capacitors $C_{1A} \ldots C_{NA}$ in parallel circuit relationship with $C_1$ as the progressively shorting movable switch contact of $S_1$ is caused to move from left to right as viewed in FIG. 4, where $C_1$ is the smallest capacitance which can be obtained in the switching sequence. The progressively shorting switch may have a rotary armature which can be rotated continuously around without having to retrace its movements to thereby connected all additional capacitors in parallel with $C_1$ until all have been so connected; and, upon rotating the switch to the next position to remove all additional capacitors, leaving only the minimum capacitance $C_1$ in the circuit. However, for convenience in illustrating the nature of the switching operation performed, a continuous elongated shorting bar S1 has been illustrated in FIG. 4.

In addition to the progressively shorting switch S1, the heating rate control switching arrangement is further comprised of a non-shorting switch $S_2$ shown at 25a. The non-shorting switch contacts of $S_2$ serve the function of inhibiting turn-on of the zero point switching SCR 21 during intervals when the progressively shorting movable contact of switch $S_1$ is being moved between capacitor terminal points to switch in or switch out an additional commutating capacitor. In this manner, it is assured that power will be maintained off of the chopper-inverter power supply circuit while selectively switching in or out of circuit relationship additional commutating capacitors $C_{1A}$, $C_{2A}$, etc for changing the rate of power production by the circuit. Otherwise, if the chopper-inverter were operating while preforming such switching action, considerable arcing would be produced across the switch contacts of the progressively shorting switch $S_1$.

Removal of current flow before switching also permits the use of a small-sized switch which is manually controllable with a minimum of effort. Also a contact of a given size can handle a current many times its siwtching rating since the contact is not required to interrupt the flow of current passing through it. Finally, the use of a progressively shorting switch simulataneously increases the current carrying capacity of the switch and the capacitor bank as the current to be carried increases with the added capacitance. Thus, each additional capacitor will carry its share of the total current. Evidently it is desirable to add or subtract capacitance in equal increments, assuming all contacts of $S_1$ are of the same size. This condition also results in changing output power in equal increments as would usually be desired. Hence in preferred forms of the FIG. 4 circuit all of the capacitors $C_{1A}$, $C_{2A}$, etc are of equal value.

For the above stated purpose of inhibiting operation of the zero point switching SCR 21 during switching of the commutating capacitors $C_{1A}$, etc, the fixed contacts of the non-shorting switch $S_2$ are all connected in parallel to the base electrode of a second NPN clamping transistor 81. The emitter of transistor 81 is connected to terminal 16 and its collector is connected in series with a current limiting resistor 80 across capacitor 82. The moveable contact of the non-shorting switch $S_2$ is connected directly to the negative terminal bus 16 and to one end of a voltage dividing resistor network comprised by the resistors 83 and 84 connected in series circuit relationship across the power supply terminals 15 and 16. The juncture of the voltage dividing resistors 83 and 84 is connected in common with the fixed contacts of the non-shorting switch $S_2$ to the base of the second clamping transistor 81.

As a result of the above described arrangement, the movable contact of the non-shorting switch $S_2$ serves to clamp the base of second clamping transistor 81 to the negative power supply terminal 16 once the switch has been moved to a particular setting. However during intervals while the movable contacts of switches $S_1$ and $S_2$ which are ganged and move together, are being moved to connect in or disconnect one of the plurality of commutating capacitors $C_{1A}$, $C_{2A}$, etc the movable contact of non-shorting switch $S_2$ (which moves synchronously with the movement of progressivley shorting switch contact $S_1$) will be open circuited. During such switch movement intervals, open circuiting of switch contacts $S_2$ results in the application of a positive turn-on bias being applied to the base of second clamping transistor 81 from resistors 83 and 84 causing this transistor to turn-on. Turn-on of second clamping transistor 81 results in rapidly discharging capacitor 82 through resistor 80 and in clamping the base of the first clamping transistor 73 to the negative terminal 16 voltage thereby allowing the inhibiting SCR 72 to be turned on and preventing turn-on of the zero point switching SCRs 62 and 21. Upon completion of the switching movement to connect-in or switch-out one of the additional commutating capacitors $C_{1A}$, etc, the movable contact of the non-shorting switch $S_2$ will be closed on one of its fixed contacts to thereby again short out the voltage dividier resistors 83, 84 and clamp the base of the second clamping transistor 81 to buss 16 to thereby cause 81 to turn-off and no longer affect control over the operation of the circuit. Following the moment when $S_2$ reaches a detent position, capacitor 82 begins to charge to a potential which turns on transistor 73 which in turn prevents SCR 72 from turning on in the next half cycle after its gate is sufficiently clamped to terminal 16. Then SCR 21 turns on at or beyond the next zero point and power is reapplied to the chopper-inverter. Thus, the start-up delay action is used during switching intervals to assure that the switch is in a detent position before power is reapplied. SCR 21 is held off while there is any motion of the ganged armatures of $S_1$ and $S_2$.

In addition to the second clamping transistor 81, a third clamping transistor 85 is connected across the base-emitter of the first clamping transistor 73 for additionally inhibiting turn-on of transistor 73. The third clamping transistor 85 is an NPN transistor having its base connected to the output from the temperature sensor circuit 24, and hence its turn-on and turn-off is controlled in accordance with the sensed temperature of the metal base pan or other object being heated. The third clamping transistor 85 operates to control ultimate turn-on or turn-off of the zero point switching SCR 21 in a manner similar to that described above for the second clamping transistor 81. The construction and manner of operation of the temperature sensor circuit 24 which supplies positive going turn-on and negative going turn-off control signals to the base of the third clamping transistor 85 will be described more fully hereinafter.

Assuming now that the circuit has been conditioned as described in the preceding manner, and that power is called for with the zero point switching SCR 21 turned-on at or near the zero point of a full wave rectified unfiltered high voltage increase in potential appearing across terminals 15 and 16. Upon turn-on of SCR 21, a negative voltage will appear between the point of connection of conductor 91 and terminal 15 which is applied through a dropping resistor 93 across zener diode 92 having a rating in the order to about 12 voltage DC compared to the higher voltage 115–150 peak supply volts E appearing across terminals 15 and 16. A SUS trigger circuit is excited by the low voltage DC excitation potential and is comprised by a timing-charging circuit including a variable resistor 34 and a charging capacitor 94 connected across zener diode 92 to the positive terminal 15. A threshold switch in the form of a silicon unilateral switch (SUS) or its transistor-zener equivalent has one of its terminals connected to the juncture of variable resistor 34 and charging capacitor 94. The anode terminal of SUS 95 is connected to a series-capacitor AC coupling network 96 to the base of a PNP switching power transistor 97. The switching power transistor 97 also provides power amplification and is of the type having a relatively flat current vs voltage conducting characterisitc such that relatively constant current flows through the device when turned-on despite widely varying changes in emitter-collector voltage applied across it. The PNP switching transistor 97 has its emitter connected directly to the power supply terminal 15 and its collector connected to the primary winding 98 of a gating transformer $T_1$ comprising a part of the gating transformer circuit 31 shown in FIG. 1. The series connected switching transistor 97 and primary winding 98 are connected to a low DC voltage excitation circuit comprised of a diode rectifier 101 and series connected resistors 102 and 103 with the resistor 103 having a filter capacitor 104 connected across it. The low voltage circuit thus comprised is connected across the power supply terminals 15 and 16 for deriving a low voltage direct current energization emitter-collector potential for switching transistor 97.

To complete the gating circuit, the gating transformer $T_1$ has a secondary winding 99 that is inductively coupled to primary winding 98 and connected so as to invert the negatively going pulses generated in primary winding 98 and apply positive-going gating pulses to the control gate of a high voltage low power switching SCR 105. In addition ot the phase reversal obtained with the transformer $T_1$, transformer $T_1$ serves to isolate voltage levels of the power amplifier and the chopper inverter. A shunting diode 106 prevents the negative-going flyback voltage of secondary winding 98 from being applied to the control gate of SCR 105. The high voltage switching SCR 105 is connected in series circuit relationship with resistors 107 and 110 between anode and cathode of the power switching SCR 17 of the chopper-inverter. The cathode of SCR 105 is directly connected to the control gate of chopper SCR 17 and to resistor 107 which serves as a gate load resistor. The purpose of SCR 105 is to achieve positive and continuous turn-on of high current SCR 17 in response to the sharp trigger pulse supplied from winding 99. SCR 105 must have voltage, dv/dt, and turn-off times like those of SCR 17 but need only be capable of handling a much smaller level of current for the relatively short turn-on time of SCR 17. SCR 105 acts in a manner similar to SCR 62 in increasing the gate sensitivity of the power SCR across which it is connected. It is possible to omit SCR 105 in cases where the pulse from $T_1$ is adequate to gate-on SCR 17.

With the above described gating circuit arrangement, upon turn-on of SCR 21, a negative voltage appears at the inverter end of the filter inductor $L_2$ which is supplied across zener diode 92 via resistor 93. This voltage stablized by zener diode 92 also is applied across the charging capacitor 94 through the variable resistor 34 to cause the capacitor to start charging in a negative direction towards the threshold voltage of SUS 95. The RC charging rate at which charging of capacitor 94 occurs is determined by the setting of the variable resistor 34. Accordingly, the time interval required to charge capacitor 94 to a threshold voltage level sufficient to turn on SUS 95 is controllable by the setting of variable resistor 34. This time interval is the quiescent charging interval $t_2$ associated with the operation of the chopper-inverter discussed previously in connection with FIGS. 2 and 7. Hence, resistor 34 determines the operating frequency of the chopper-inverter over the restricted range noted in the above description of FIGS. 2 and 7. However, it should be noted at this point in the description, that for some applications resistor 34 would be initially adjusted to a fixed value of resistance providing a set $t_2$ period, and power from the chopper-inverter is controlled by some other scheme such as switching the value of capacitor $C_1$. This is particularly true for circuits which employ the $L_3C_3$ smoothing arrangement as in FIG. 4.

The discharge of capacitor 94 through SUS 95 and RC network 96 produces a sharp rising, negative going pulse of voltage on the base of power amplifier transistor 97 which turns the transistor on for the duration of the pulse and produces a much larger and amplified gating-on pulse across the primary winding og the pulse transformer $T_1$. This gating-on pulse is transformed to the secondary winding of transformer $T_1$ and turns on the voltage switching SCR 105 which in its turn causes the large power rated chopper SCR 17 to be turned-on and initiate a conduction interval in the chopper inverter circuit. The circuit is completed by a large value discharge resistor 108 connected across capacitor $C_2$ which assures rapid and complete discharge of capacitors $C_1$, $C_2$, $C_3$ and $C_{111}$ when SCR 21 is turned off. It is important that these capacitors be discharged to obtain conduction of SCR 21 as near to the zero-point as possible when turn-on gating signal is again applied to SCR 21. It is also desirable that a conventional dv/dt snubber circuit comprised by a series connected resistor 109 and capacitor 111 are connected across the large power rated chopper SCR 17 and feedback diode 18 for avoiding undesired dv/dt firing of the SCR 17 following turn-off of the feedback diode 18 in a manner well known to those skilled in the art. A convenient and useful means for indicating when the chopper-inverter is operating is provided by neon lamp #100 connected in series with a dropping resistor across inductor $L_2$. The lamp turns on only when an r-f potential is developed across this inductor. The DC resistance of the inductor is very low and therefore the lamp does not respond to a DC current passing through the inductor. The brightness of the lamp remains fairly uniform because the r-f component of $IL_2$ does not change greatly for values of loading ranging from no load to full load.

The important characteristic to note in connection with the above described gating circuit, is that it derives the gating pulse energy supplied to the control gate of power switching SCR 17 from DC storage capacitor 102 which is charged directly across the high voltage power supply terminals 15 and 16. The start up delay and inhibit circuit assures that the capacitor becomes fully charged before SCR 21 is turned on and the supply voltage to the chopper-inverter appears across $C_2$. As a result, pulses of equal magnitude are provided at the gate of SCR 105 at all times including the zero point of the full wave rectified AC potential across 15 and 16 in the voltage time region of the rectified AC line voltage sometimes referred as the valley of the ripple. Other known gating circuit arrangements are unsatisfactory for providing gating pulses of sufficient strength and of minimum charging delay time $t_2$ to assure turn-on of SCR 17 and inverter chopping at a rate which remains essentially constant for any value of the rectified AC potential between 15 and 16. In this circuit the SUS 95 provides pulses of equal magnitude and with constant delay down to a voltage as low as 12 volts. These pulses are not of sufficient amplitude or strength to operate a high power SCR, however, and must be amplified. The amplifier must have DC voltage applied to its collector prior to the appearance of the first pulse, a feature inherent in the action of the start-up delay and inhibit circuit. It is the function of $C_2$ to prevent the value of the supply voltage from falling below 12 volts in the valley of the ripple under conditions of greatest inverter loading. It is to be noted that the DC supplies for the power amplifier and for the temperature sensor are powered directly from the main bridge rectifier and not from a separate supply requiring a transformer operating at line frequency.

Figure 4A:
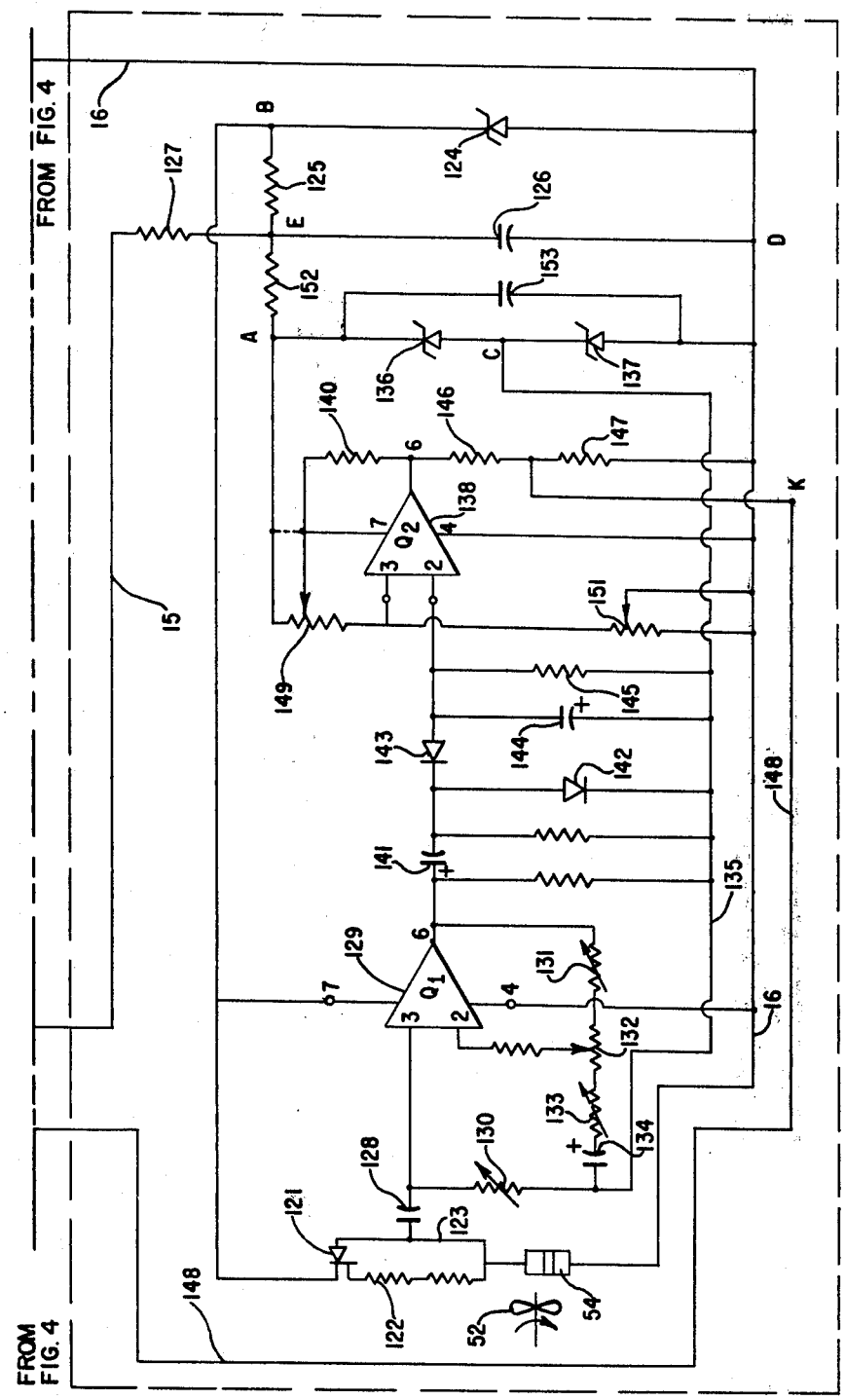

As stated earlier, turn-on and turn-off control over conduction of the zero point switching SCR 21, is exercised by the temperature sensor and amplifier subcircuit 24. The physical nature of the temperature sensor and its arrangement relative to the induction heating coil and metal base cookware load for directly sensing the temperature of the bottom of the cookware during operation, was described with relation to FIGS. 3–3E. The sensed temperature signal amplification and processing to derive an output, amplified, on-off control, signal for application to the base of the third clamping transistor 85 is shown in FIG. 4A of the drawings. In FIG. 4A the infra-red heat emperature sensor device 54 and chopper 52 are illustrated separately from the pan load 51, although it is to be understood that the sensor 54 would be arranged to view the boof the pan load 51 directly through the blades of the chopper 52 in the manner described with relation to FIGS. 3–3E. The infra-red (IR) sensor device 54 may comprise any form of IR sensor such as a photo-sensitive resistor, a photoconductor, a photo cell or a photo transistor, but preferably comprises a commercially available lead sulfide or lead selenide photoconductor. It has been found that while the peaks in the response of such cells lie in the range of 2 to 4 microns, they are usable in detecting infra-red energy at much longer wavelengths extending to 8.5 microns even when operating at room temperature.

The lead sulfide cell 54 is connected in series circuit relationship with a constant current source comprised by a field effect transistor 121 (hereinafter referred to as FET 121) having its source and drain electrodes connected in series circuit relationship with an adjustable feedback resistor 122, and a feedback connection comprised by conductor 123 connected from the adjustable feedback resistor 122 back to the gate electrode of FET 121. The series connected FET constant current source and heat sensor are connected in series circuit relationship across a first low voltage direct current source of energization potential comprised by a zener diode rectifier 124 and voltage dropping resistor 125 connected in series circuit relationship across a filter capacitor 126. The capacitor 126 in turn is connected in series circuit relationship with a voltage dropping resistor 127 across the high voltage, power supply terminals 15 and 16. With this arrangement, a relatively stable, low voltage, direct current energization potential is obtained across the zener diode 124 and supplied through constant current FET source 121 across the lead sulfide cell heat sensor 54. As stated earlier rotation of the chopper blades 52 causes an alternating current component to be developed across the lead sulfide cell 54 whose amplitude will vary in accordance with variations in temperature of the pan load being heated by the inductive heating coil apparatus and observed by the cell 54 through the rotating chopping blade 52.

The alternating current component signal derived across the cell 54 is AC coupled through an AC coupling capacitor 128 to the number 3 non-inverting input terminal of an integrated circuit operational amplifier 129 of conventional construction. Alternating current amplifier 129 is a commercially available, integrated circuit operational amplifier of the type manufacutered and sold by a number of semiconductor manufacturers such as Fairchild Semiconductor, Motorola, Texas Instruments, etc, and comprises a plurality of stages of interconnected semiconductor active devices and coupling networks. Such a device can by appropriate excitation and interconnection of its output terminals, serve as either an inverting or non-inverting DC or AC operational amplifier. Amplifier 129 is connected to external circuit elements so that it serves as an alternating current amplifier and receives its excitation potential from the same low voltage, direct current stable source provided by zener diode 124 as does the heat sensor 54 and constant current FET 121. The input and output terminals of these known commercially available integrated circuits are numbered as shown in FIG. 4A wherein it can be seen that a stabilized low voltage DC excitation potential of the order of 24 volts is applied across the terminals 7 and 4. Terminal 3 is a non-inverting input terminal, terminal 2 is the inverting input terminal and terminal 6 is the output terminal.

The alternating current signal component developed across the infra-red heat sensor due to the action of the chopper blades 52 is AC coupled to the non-inverting input terminal of amplifier 129 via coupling capacitor 128 and an input impedance comprised by an adjustable bias resistor 130 connected between input terminal 3 and a low voltage DC bias supply terminal 135. The output terminal 6 of amplifier 129 is coupled back through an external, gain-adjusting feedback network comprised by a set of three variable resistors 131, 132 and 133 connected in series circuit relationship with a direct current blocking capacitor 134 back to the bias supply terminal 135. The variable resistor 131 is adjusted to set the high temperature limit, variable resistor 123 sets the low temperature limit, and the middle variable resistor 132 has its variable tap-point connected to the inverse input terminal number 2 through a current balancing resistor 132A so that the AC gain of amplifier 129 can be varied inversely in proportion to the setting of the middle variable resistor 132. The inverse relationship established by this connection results in a rapid increase in gain per unit change in the position of the mid-tap of variable resistor 132 when the mid-tap is rotated to high gain level settings under conditions where the temperature of the metal base cookware or other object being heated, is at a low temperature value, and the AC signal derived by chopper action from heat sensor 54 per unit decrease in temperature, decreases quite rapidly. The overall effect of the arrangement is to compensate for non-linearity in the heat sensor response, and to avoid crowding the high temperature control into one end of the variable resistor movement and hence linearizes the dial used to calibrate variable resistor 132. This operation also avoids the need for a variable resistor with a specially tailored taper in its resistance characteristic versus dial position; and a conventional low cost potentiometer with linear taper may be employed to set temperature. As an alternative, the middle variable resistor 132 can be set at a fixed relatively low value of feedback to provide the highest level of gain that is required to control the system at its lowest temperature, and the gain varied by directly adjusting the value of the input resistor 130 as will be described more fully hereinafter in connection with FIG. 4B. As is known to those skilled in the art, variation of the input resistor 130 would vary the gain of AC amplifier 129 in direct proportion to the change in resistance of input resistor 130. In this case the non-linear output of the sensor would result in a wide spread over the dial scale of selected set point temperature to which the pan or other object is heated in the range of relatively low temperature values of the order of 140°–250° F. and a crowding of the scale at higher temperatures. Either mode of temperature control can be employed separately since each has its advantages within restricted temperature ranges. If desired, and one is willing to pay the additional cost, both means of control can be combined in a single circuit and the combined advantages of both means can be realized to provide a relatively fine control over a wide range of temperature values. Also, a nearly linear scale of set temperature versus dial setting can be achieved by gauging linear resistors 130 and 132 on a single control shaft.

Another feature of importance to note at this point in the description, is that the bias potential applied to terminals 2 and 3 of amplifier 129 is not directly referred to a mid tap point between point B and terminal 16 in the usual manner, but instead it referred to a supply terminal 135 which is connected back to a center tap point C intermediate a pair of zener diodes 136 and 137. The zener diodes 136 and 137 are connected in series circuit relationship with a voltage dropping resistor 152 across the capacitor 126 and function as a stabilized, second low voltage direct current power source for a second integrated circuit operational amplifier 138 with single-ended output connected to operate as a voltage threshold switch with adjustable hysteresis. The purpose of providing a second, stabilized, low voltage direct current power source for the threshold switch separately from that employed for the heat sensor 54 and alternating current amplifier 129, is to obtain maximum decoupling between these two circuits for operational reasons to be discussed hereinafter and to decouple the input terminals 2 and 3 of amplifier 129 from its supply voltage to prevent self-oscillation of amplifier 129 due to feedback through the low internal impedence of zener 124.

The amplified alternating current signal appearing at the number 6 output terminal of amplifier 129 is supplied across a series-capacitor RC coupling network 141 to a high impedance, voltage doubling rectifying network comprised by a pair of diode rectifiers 142 and 143. The output from the voltage doubling diode rectifiers 142 and 143 appears across a smoothing capacitor 144 and resistor 145 as a negative d-c potential referred to terminal 135 and is applied to the number 3 inverting-input terminal of the second integrated circuit operational amplifier 138.

Amplifier 138 may be similar to amplifier 129 in construction; however, its external accessible terminals are specially interconnected in a circuit 140 which operates as an on-off, bistable voltage switch which is triggered from one of its stable states of operation to the other upon the signal input level applied at high-impedance input terminal 2 attaining a predetermined magnitude or dropping below another predetermined magnitude smaller than the first predetermined magnitude. Thus, it will be seen that the bistable circuit 140 operates as a threshold detector with hysteresis or "dead-band" for establishing an operative threshold level with respect to the amplitude of the AC output signal from amplifier 129, and hence with respect to the temperature sensed by the terperature sensor 54. The output from the bistable circuit appears at terminal 6 of amplifier 138 and is referred to terminal 16 through series connected load resistors 146, 147 and 150. A positive step in DC voltage referenced to terminal 16 appears across resistor 147 when the AC signal is sufficiently large to cause a change in state of the threshold detector 140. This DC voltage is present as long as the switch remains in this off state and returns to a lower value when the switch reverts to its on state. A conductor 148 carries this switching potential at the junction of resistors 146 and 147 to the base of the third clamping transistor 85. In an unconventional manner an external regenerative feedback from positive supply terminal 7 is made to the non-inverting input terminal 3 of amplifier 138 through an adjustable resistor 149 which in conjunction with adjustable resistor 151 serves to establish the threshold level referred to terminal 135 at which the bistable circuit will switch from one operating state to the other. Additionally, the variable tap point setting of resistor 149 serves to adjust the amount of hysteresis effect in the switching levels at which the bistable circuit reverts from one of its stable states back to the other. Resistor 150 may be connected either between terminals 6 and 7 or between terminals 6 and A. In the former connection the change in current drawn from supply AD when amplifier 138 is turned on is smaller and the effect of this switching on voltage BD is less requiring less decoupling between voltage AD and BD per unit of gain in amplifier 129.

During operation of the circuit, under conditions where heat is called for by the metal-base cookware load (i.e. temperature of object viewed by sensor 54 is low the voltage at input terminal 2 of amplifier 138 will rise above (become more positive than) a preset negative value, and the bistable circuit 140 will be switched on to its operating state of low output voltage of the order of 0 volts at output terminal 6. This low output voltage will be coupled back through conductor 148 to cause the third NPN clamping transistor 85 to be turned-off. As discussed earlier, turn-off of the third clamping transisotr 85 allows the first clamping transistor 73 to be turned-on at the beginning of the next half cycle of the full wave rectified, unfiltered, high voltage DC potential appearing across supply terminals 15 and 16. This results in clamping the gate of the inhibit transistor 72 to the potential of terminal 16, and allows the zero point switching thyristors 62 and 21 to be turned-on at or near the zero point of the same half wave voltage pulse thereby enabling operation of the chopper-inverter circuit in the manner described earlier.

Low voltage, direct current excitation potentials are supplied to the bistable circuit 140 from the second low voltage rectifying network comprised by the zener diodes 136 and 137 connected in series circuit relationship with voltage dropping resistor 152 across filter capacitor 126 and including a second filter capacitor 153 connected across the zener diodes 136 and 137. Capacitor 134 is connected in the feedback circuit of amplifier 129 to allow the negative feedback for DC from terminal 6 to terminal 2 to be almost 100% so that the gain of the amplifier for DC is close to unity, although the AC gain may be over 1000 to one. As a result, the amplifier is not sensitive to small drifts in supply voltages or device temperature so that zero-set problems are avoided. Capacitor 134 is tied through conductor 135 to the reference potential midtap point C of the zener diodes 136 and 137. This connection provides what is referred to as a common mode rejection feature and avoids the need for a filter capacitor across the zener diode 124. Delay time at start up involved in charging capacitor C134 is much less than it would be were C134 connected to terminal 16. As a result, amplifier 129 is ready to accept an input signal in a shorter time after start up. Only one zener diode 124 is required between the points B and D since the midtap point C serves as a common reference buss for AC amplifier 129, the detector circuit containing diodes 142 and 143, and the bistable circuit 140. Because of this arrangement the reference ground of input terminals 2 and 3 of AC amplifier 129 both are referred to midtap point C so that a change in voltage B due to a large change in the average voltage of bus 15 when the inverter is turned on and off does not cause a significant change in the voltage of midtap point C and so that the change in supply voltage does not show up at the input of AC amplifier 129 to cause a degenerate switching of circuit 140, resulting in on/off cycling of the system in turning on the chopper inverter.

The above briefly described common mode rejection feature is important since abrupt changes in supply voltage at the point E must not prevent switching of the bistable threshold switch circuit 140 in either direcxtion from one of its stable states to the other in response to a sensed actual change in temperature. During turn-off of the inverter under conditions where the temperature of the inductively heated metal-bas cookware load has risen to or above the set temperature point, the point E will have risen to its highest level in voltage due to the inverter load having been removed. Both voltage at A and B will have risen slightly due to imperfect regulation of the zener diodes. This results in pulling up the potential of input terminal 3 of amplifier 138 and regeneratively holds bistable threshold switch 140 off to provide a positive output voltage at the output terminal 6 of amplifier 138. The positive output voltage at terminal 6 is fed back across conductor 148 to switch-on the third clamping NPN transistor 85 thereby clamping-off the first clamping transistor 73 and allowing the inhibit SCR 72 to be turned-on to thereby inhibit application of further gating-on potentials to the zero point switching SCRs 21 and 62. However, mid point C of the power supply also rises perhaps a few millivolts due to imperfect zener regulation and allows the inverting input terminal 2 of bistable circuit 140 to rise. This tends to cause output terminal 6 of amplifier 138 to fall towards the negative buss in a degenerative fashion. However, the regenerative action at input terminal 3 dominates, and bistable threshold switch 140 remains stably in its off state. During turn-on of the chopper inverter, the voltage at point E will drop and the changes in voltage at points A and C again counteract each other in the manner noted above. However, during turn-on of the threshold switch 140, the regenerative action in the turn-on direction dominates to drive the potential of terminal 6 negatively toward that of terminal 16 as previously described. Thus, it will be appreciated that the effect of a reduction in supply voltage at point E is to reduce the hysteresis gap of the bistable threshold switch 140 and to drive it into its on state. It is important to note that changes in voltage at point E due to the chopper inverter being turned on and off should not be allowed to come through the AC amplifier 129 and the diode detector in such a way as to appear erroneously as momentary changes in the sensed temperature at the input terminal 2 of amplifier 138 and to prevent stable latching of the bistable switch 140 in one state or the other. For example, a decrease in the potential of midtap C can occur abruptly and introduce a negative-going transient signal in the input terminals 2 and 3 of amplifier 129 which results in a negative pulse at terminal 6. This pulse is coupled through the diode detector to terminal 3 of amplifier 138 to prevent switching of circuit 140 to the on state and turn-on of the inverter.

During operation of the overall heating and control system shown in FIG. 4 the condition will be considered where the inductively heated metal-base cookware load 51 is cool and calls for the application of induction heating waves from the heating coil $L_3$ in the manner described previously. An increase in cookware temperature will result in an increase in the change in resistivity of the infra-red heat sensor 54 as the chopper 52 covers and then uncovers the view from the sensor to the cookware. If the chopper shown in FIG. 3E has a two bladed rotor driven by a common drive shaft with a typical AC powered cooling fan, it will develop an alternating current signal component typically of the order of 50 to 60 cycles per second. Of course, slower chopping rates of a few cycles per second may also be employed where a separate motor of slow speed is used. The alternating current signal component produced by chopping the infra-red beam incident upon the sensor will have an amplitude in accordance with the sensed temperature of the inductively heated metal-base cookware which it views. Changes in temperature due to changes in ambient conditions affecting the sensor will appear as long term changes that are screened out by the AC coupling capacitor 128. Assuming a cool pan, the amplitude of the signal derived across heat sensor 54 will be relatively low so that the rectified, negative polarity voltage built up across capacitor 144 at the number 2 input terminal of bistable threshold switch 140 will not be sufficient to maintain bistable switch 140 switched to its power-off condition. Consequently, the threshold switch will be in its power-on condition where the output terminal 6 is maintained at a negative or low potential value that is fed back across conductor 148 and causes the third NPN clamping transistor to be turned on to thereby clamp the gate of the inhibiting transistor 72 and results in the application of gating on pulses to the control gates of the zero point switch SCR 21 and 62 in the manner previously described. Hence, enabling power will be supplied to the chopper inverter and result in the production of current pulses at the chopping frequency being supplied through the $L_3$ induction heating coil to heat the pan load 51.

The threshold level at which the voltage at the input terminal 2 of bistable switch 140 switches this circuit from its power-on condition to its power-off condition, is set by the circuit parameters of bistable switch 140. By varying the gain of the AC amplifier 129 with variable resistor 132, for example, the resulting temperature level at which the chopped signal from the temperature sensor 54 becomes sufficient to attain the threshold switching level of bistable switch 140 (or drop below it) can be varied in accordance with the desired temperature setting for the pan load 51. A similar control is exercised by variation of the input resistor 130.

After the pan has been sufficiently heated to attain the set temperature, the negative polarity voltage built up across capacitor 144 by the voltage doubling rectifiers 142 and 143 will exceed the threshold level of bistable circuit 140. Upon this occurrence bistable circuit 140 switches to its power-off condition where the output terminal 6 goes positive in voltage causing a positive-going enabling potential to be supplied back across conductor 148 to turn-on the third clamping transistor 85 to thereby clamp the first clamping transistor 73 off and allowing the inhibiting SCR 72 to inhibit further operation of zero point switching SCRs 21 and 62. The on-off switching action control exercised by the temperature sensing and control circuit latches stably in both the on-to-off and the off-to-on transitions in spite of the fact that the low voltage direct current energization supply circuits for the temperature sensor are directly connected across the output power supply terminals from the high voltage, full wave power rectifier. Construction of the circuit in this manner avoids the necessity of a step down transformer with its consequent increase in cost, weight and complexity for the circuit. Accordingly, considerable construction and operational advantages are obtained with the temperature sensing circuit arrangement of FIG. 4.

Figure 4B:
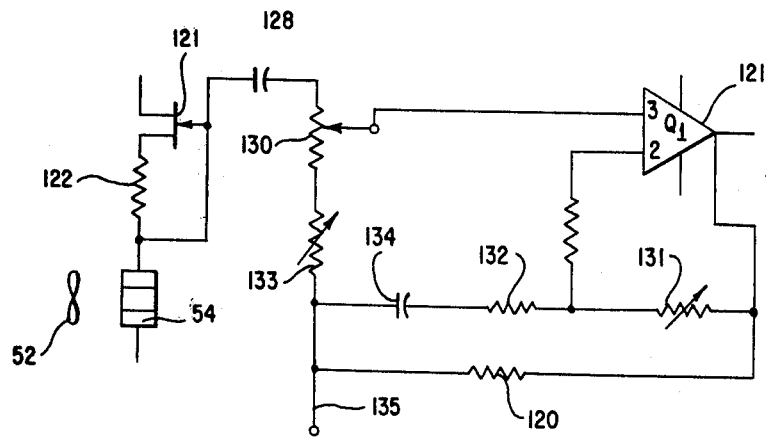
FIG. 4B is a schematic circuit diagram of a modified form of the temperature control circuit shown in FIG. 4A.

FIG. 4B is a partial schematic circuit diagram of an alternative connection for the AC amplifier 129 feedback path to provide a somewhat different temperature - gain characteristic than that obtained with the circuit shown in FIG. 4A. In FIG. 4B the non-inverting input terminal 3 of AC amplifier 129 is directly connected to the movable tap point of a variable resistor 130 that serves as a temperature controlling resistor. Variable resistor 130 is connected in series circuit relationship with coupling capacitor 128 and an adjustable resistor 133 that serves as a high temperature limit setting resistor and is referred to the DC reference bus 135 that corresponds to the reference bus 135 of FIG. 4A. The number 6 output terminal of AC amplifier 129 is connected through a feedback network comprised of a low temperature limit setting adjustable resistor 131, a fixed resistor 132 and a DC blocking capacitor 134 connected in series circuit relationship. This network is connected between the number 6 output terminal and the DC reference bus 135 and a small fixed limiting resistor interconnects the number 2 inverting input terminal of AC amplifier 120 to juncture of resistors 131 and 132. With this arrangement, once the low temperature limit setting resistor 131 and high temperature limit setting resistor 133 have been adjusted, the gain of AC amplifier 129 due to its feedback impedance remains fixed. Adjustments in overall gain thereafter are controlled only by the temperature controlling resistor 130, and varies directly with the dial setting of the variable resistor 130.

Figure 4C:
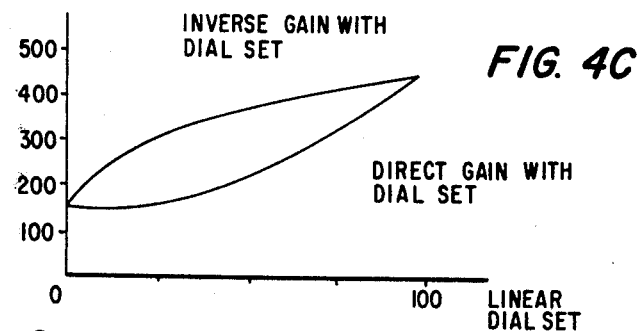
FIG. 4C is a temperature vs. dial position characteristic curve of the temperature control circuits of FIGS. 4A and 4B.

FIG. 4C of the drawing illustrates the operating characteristic curves for both versions of the temperature sensing circuits shown in FIGS. 4A and 4B. Referring to FIG. 4C, the linear movement of the adjustable control knob that sets the value of resistance 130 is plotted as the linear dial set and is varied from zero to 100% movement, and resulting output gain of the AC amplifier 129 for various temperature levels from 100°–500° F. is plotted as the lower curve labelled "Direct Gain With Dial Set". A similar gain vs temperature curve for the circuit of FIG. 4A is labeled "Inverse Gain With Dial Set". From a consideration of FIG. 4C, it can be seen that the direct variation in gain of AC amp 129 provided by variable resistor 130 of the circuit shown in FIG. 4B, spreads the lower temperature range of from 150°–275° F. over about 50% of the movement of the controlling resistor 130. The upper temperature portion of the range above 275° is compressed into the remaining amount of available movement in the control knob. This characteristic curve substantially matches the dynamic characteristic curve of the infra-red heat sensor 54 rather than compensate it in the manner of the FIG. 4A circuit; however, it is attractive for an inductive cookware heat control because it provides a wide dial spread in the 150° to 275° F. range where cooking of gourmet foods, soups, sauces and the like is mainly accomplished. In contrast, the inverse control curve of the FIG. 4A circuit provides a relatively fast change in gain at the lower temperatures with the low temperature range compressed and the high temperature range expanded. This inverse gain characteristic curve tends to compensate for the infra-red heat sensor 54 dynamic characteristic so as to tend to linearize the overall response. Depending upon which type of charactersitic is desired, either control circuit can be employed. Further, if one were willing to pay the additional cost to include a high quality variable resistor for the fixed resistor 132 in FIG. 4B, either type of control characteristic could be obtained depending upon which portion of the temperature range very fine control over the cooking operation is desired.

In addition to the inhibit controls over the turn-on of SCRs 21 and 62 provided by the temperature sensor and capacitor switching arrangements described in the preceeding sections, other inhibit controls may be provided by simply adding additional clamping transistors such as 85 and 81. Such additional inhibit transistors could be made responsive to any control or circuit protection sensing scheme desired. For example, an overcurrent drawn by excessive loading by the cookware could be sensed by suitable low resistance sensing resistors connected in series with the devices, and the sensed current signal used to operate an additional inhibit clamping transistor to remove inverter power within one half cycle of the line frequency. Similarly, over voltage, over heating, etc. would be protected against and additional control features provided at relatively little added cost.

FIG. 5 of the drawings illustrates an alternative and simplified form of temperature sensor and control circuit for use with the power circuit arrangement of FIG. 4A in place of the temperature sensing and amplifying circuit described above. In FIG. 5, components and subcircuits which are identical to those used in the FIG. 4A circuit have been given the same reference numeral so that one can visualize readily how the temperature sensor and control of FIG. 5 fits into and coacts with the overall induction heating apparatus of FIG. 4. For this reason, the complete power circuit components to the right and above the portion of the circuit shown in FIG. 5 have been omitted. In FIG. 5, the open AC output of amplifier 129 is supplied to the actuating winding 161 of a reed relay having armature contacts 162. The reed relay serves as a bistable threshold switch without hysteresis that begins to close and open contacts 162 at the frequency of the IR chopper wheel when the AC output attains the actuating level of the relay armature. Relay contacts 162 are connected in series circuit relationship with a discharge resistor 160 across a capacitor 82 that in turn is connected through charging resistor 74 to the midtap point of a pair of voltage dividing resistors 75 and 76 connected across the high voltage power supply terminals 15 and 16. The juncture of the capacitor 82 and discharge resistor 160 is connected to the base of the first NPN clamping transistor 73.

With the above arrangement, under conditions where the contacts 162 are maintained opened, a charge will be built up on capacitor 82 through the charging network 75, 76 and 74 which will maintain the first clamping transistor 73 turned-on, hence keeping inhibiting SCR 72 turned-off and allowing the application of gating-on potentials to the control gates of the zero point switching SCRs 21 and 62. Under conditions where the set temperature determined by the setting of gain adjusting resistor 132 (and/or 130) has been attained by the inductively heated cookware, the actuating signal supplied to relay winding 161 from the output of AC amplifier 129 will be of a magnitude sufficient to close switch contacts 162. This results in rapidly discharging capacitor 82 and turning-off the first clamping transistor 73. Thereafter, the inhibit SCR 72 will be rendered conductive by the positive gate potential applied to its gate through the resistor 71 so as to inhibit further firing of the zero point switching SCRs 21 and 62.

When the level of the chopped AC amplified signal reaches the activating level of relay 161, the relay will oscillate on and off, opening and closing the switching contact 162. In such case each closure of the switch contact discharges the capacitor 82. One closure is sufficient to turn-off the chopper inverter. Contact 162 closure is at a rapid rate in comparison to the charging time constant of the capacitor 82 so that the capacitor remains almost fully discharged as long as the relay is oscillating between its on and off condition. Depending on the frequency at which the IR beam is chopped, the relay opens and closes the switch contacts 162 once each half cycle. This rate might typically be of the order of 30 cycles per second if the beam is chopped at 15 cycles per second. During each half cycle of the temperature indicating AC exciting signal derived from AC amplifier 129 and supplied to the relay winding 161, the contact 162 will close if the applied voltage level is sufficiently high, and open again before the end of the half cycle. However, if the amplified voltage applied to winding 161 falls slightly below the closure level, contact 162 will not be activated on the next succeeding half cycle of the AC temperature indicating signal. Synchronism of the chopping action of the reed relay with the alternating current supply line voltage is not required although a synchronous type of operation is feasible. The operation is of the go/no-go type and there is very little hysteresis and no residual DC bias on the relay winding 161 to create a hysteresis condition so that a sharp threshold level is achieved to provide on-off control of the switching action of contacts 162.

There are several operational advantages to the circuit of FIG. 5 over the temperature sensing and control circuit shown in FIG. 4. In the FIG. 5 circuit, the dual diode voltage doubling rectifier is eliminated along with the filter intermediate the outpt of the AC amplifier and the bistable switch. As a consequence, the time constant of the filter required to smooth the voltage doubling rectifier output is eliminated. The go/no-go behavior causes the turn on and off of the inverter to occur over a very narrow range on the temperature set dial leading to positive sharp, and rapid response to operator adjustment. Also, delays in start-up due to transient charging of the detector circuit are eliminated. The second operational amplifier 138 connected as a bistable switch with its associated resistors and potentiometers and the second power supply needed to provide isolation of the bistable circuit from the AC amplifier also are not required. Thus, a considerable savings in component and simplicity of circuit design is possible.

It is desirable that the switch contacts 162 provide a low impedance so as to achieve rapid discharge of the capacitor 82 and prevent a small bias from developing across capacitor 82 that otherwise might turn-on the inverter on a half cycle basis and cause malfunction of the chopper-inverter SCR. Another feature of the arrangement is that relay 161-162 serves to transfer control from the mean DC voltage level of the operational amplifier to that of the negative bus 16, and is of considerable help in preserving internal stability. Since power to drive the relay comes directly from the output of the operational amplifier and has high common mode rejection against power supply variations. The circuit can be operated from the positive buss 15, if desired, because of the isolation afforded by relay 161-162. There is an operational disadvantage to the circuit of FIG. 5 which is that the relay must vibrate at the rate at which the IR beam to the sensor is being chopped when it is holding the power inverter off. However, reed relays are commercially available which may be operated several million times, particularly if the contacts are required to carry only small currents. These commercially available reed relays normally are expected to have a 1,000 hour operating life at a chopper rate of 60 cycles per second and with current ratings such higher than those anticipated with the circuit of FIG. 5. Thus, 1,000 hours of off-time represents perhaps several thousand hours of cooking time so that the disadvantage largely is overcome. It has been shown that the small noise created by the relay can be easily muffled and made inaudible. Finally, it is assumed that the impedance of the relay winding 161 and the power required to operate the relay are compatible with the gain and power levels attainable from the amplifier 129.

FIG. 6 is a schematic circuit diagram of an alternative form of the chopper inverter and input power control which requires no rectification of the line voltage in advance of the zero point switching control. As a result, the AC line current can be maintained more sinusoidal in wave form rather than have a delay period imposed on it as determined by the turn-on time of the zero point switch with subsequent fast rise to catch up with the line voltage after each zero point. With the arrangement of FIG. 6, any near field electromagnetic interference (EMI) or heating of capacitor $C_2$ due to such rapid rise can be eliminated without requiring a rectifier and filter arrangement thus providing some savings in cost. A small high frequency power line filter shown as 205 and 206 is provided to eliminate high frequency components from passing out along the AC supply line. However, filter 205, 206 is for high frequency only and it does not have to conduct a DC component so that the inductor can be wound on ferrite cores and the filter can be relatively small and inexpensive. The inverter circuit also presents a nearly unit power factor to the power line to which it is connected at all load levels. The circuit requires four fast recover power rectifier diodes 201-204 connected in a front to back bridge to provide a unidirectional voltage to the main chopper SCR 17. A key feature of the cicuit is that the diodes act both as paths for the reverse current for the chopper inverter commutating L-C combination as well as rectifying the line voltage fed to the chopper SCR 17. Hence, some savings in cost and complexity is realized by eliminating the otherwise required fast recovery feedback diode. Turn-on and turn-off of power supplied to the chopper inverter is achieved through a bidirectional conducting device such as a triac 207 under the control of a zero voltage switch 22 and triac 23 which sustains a signal at the gate of triac 207 throughout each conducting half cycle. Zero voltage switch 22 may be similar in construction to the zero voltage switching arrangement shown in FIGS. 1 and 4, or alternatively may constitute a commercially available, zero crossing switch control of conventional construction depending on the manner in which trigger signal is applied to the SCR 17 at startup. The gating pulses supplied to the chopper SCR 17 may be obtained from a gating circuit similar to that shown with respect to FIG. 4. In other respects, the chopper-inverter operates in a manner similar to that described with relation to FIGS. 1-4 and need not be again described in detail.

FIGS. 8, 8A and 9 of the drawings illustrate modified versions of the chopper-inverter circuit for use where increased power output, is required. The circuits shown in FIGS. 8 and 9 are designed for use where it is desired to essentially double the power and hence double the heating capability of the circuit. Accordingly, the circuits of FIGS. 8 and 9 would be designed for use with 220 volt alternating current power supplies capable of supplying 15-30 amperes at 60 cycles. Referring to FIG. 8, it will be seen that essentially two chopper-inverter circuits such as are shown in FIGS. 2 and 7 of the drawings, are connected in front to back series circuit relationship across the output of a fullwave rectifier (not shown) which is designed to operate at the higher voltage of the power source. With this circuit arrangement, the components of the two circuits have been given the same reference numerals with the reference numerals of one of the circuits being primed in order to identify each separate circuit portion. In the circuit of FIG. 8, the two filter capacitos $C_2$ and $C_2'$ are connected in series circuit relationship across the higher voltage rated power supply terminals 15 and 16 to the right of the zero point switching SCR 21. The two filter inductors $L_2$ and $L_2'$ are interconnected in series circuit relationship with the juncture of the two filter inductors $L_2$ and $L_2'$ being connected to the juncture of the two filter capacitors $C_2$ and $C_2'$ directly. With this circuit arrangement, the gating circuit is designed to gate-on both choppers SCRs 17 and 17' simultaneously so that the chopper-inverters operate synchronously to develop high frequency induction heating currents flowing in the separate $L_1$ and $L_1'$ commutating inductors. In this arrangement, the two $L_1$ and $L_1'$ inductors are used for inductively heating a metal base cookware load and would be arranged in a two layer, pancake type coild configuration such as shown in FIG. 8A of the drawings. Inductors $L_1$ and $L_1'$ are thus tightly coupled together, and with $C_1$ and $C_1'$, form a doubly tuned resonant circuit having a low frequency mode which is the commutating frequency. The simultaneous firing of SCRs 17 and 17' causes the commutating currents to be in phase, corresponding to this lower mode. With tight coupling, the upper mode of the doubly tuned circuit is very much higher than the natural resonant frequency of $L_1$ and $C_1$ and is not excited by simultaneous firing. The chopping rate is made less than the commutating rate as has been pointed out earlier in connection with FIG. 7, for example.

FIG. 9 of the drawings illustrates a modified verson of the circuit shown in FIG. 8 adapted to include the smoothing inductors $L_3$ and $L_3'$ and smoothing capacitors $C_3$ and $C_3'$ connected across the commutating capacitors $C_1$ and $C_1'$, respectively. Additionally, the filter inductors $L_2$ and $L_2'$ have been transposed from the internal leg of the combined chopper inverters and are situated in the outer power supply terminal busses 15 and 16. The juncture of the filter capacitors $C_2$ and $C_2'$ is connected directly to the common, internal bus connection between the front to back connected SCR's 17 and 17', feedback dodes 18 and 18' and the common midtap point connection of commutating capacitors $C_1$ and $C_1'$ and smoothing inductors $L_3$ and $L_3'$. In this circuit arrangement, output power would be derived from the smoothing inductors $L_3$ and $L_3'$ which again would be fabricated in the manner shown in FIG. 8A of the drawings, and both chopper SCRs 17 and 17' would again be gated-on simultaneously so that the two circuits operate synchronously to separately excite the two smoothing inductors $L_3$, $L_3'$ to develop the desired electromagnetic induction heating field.

Figure 10:
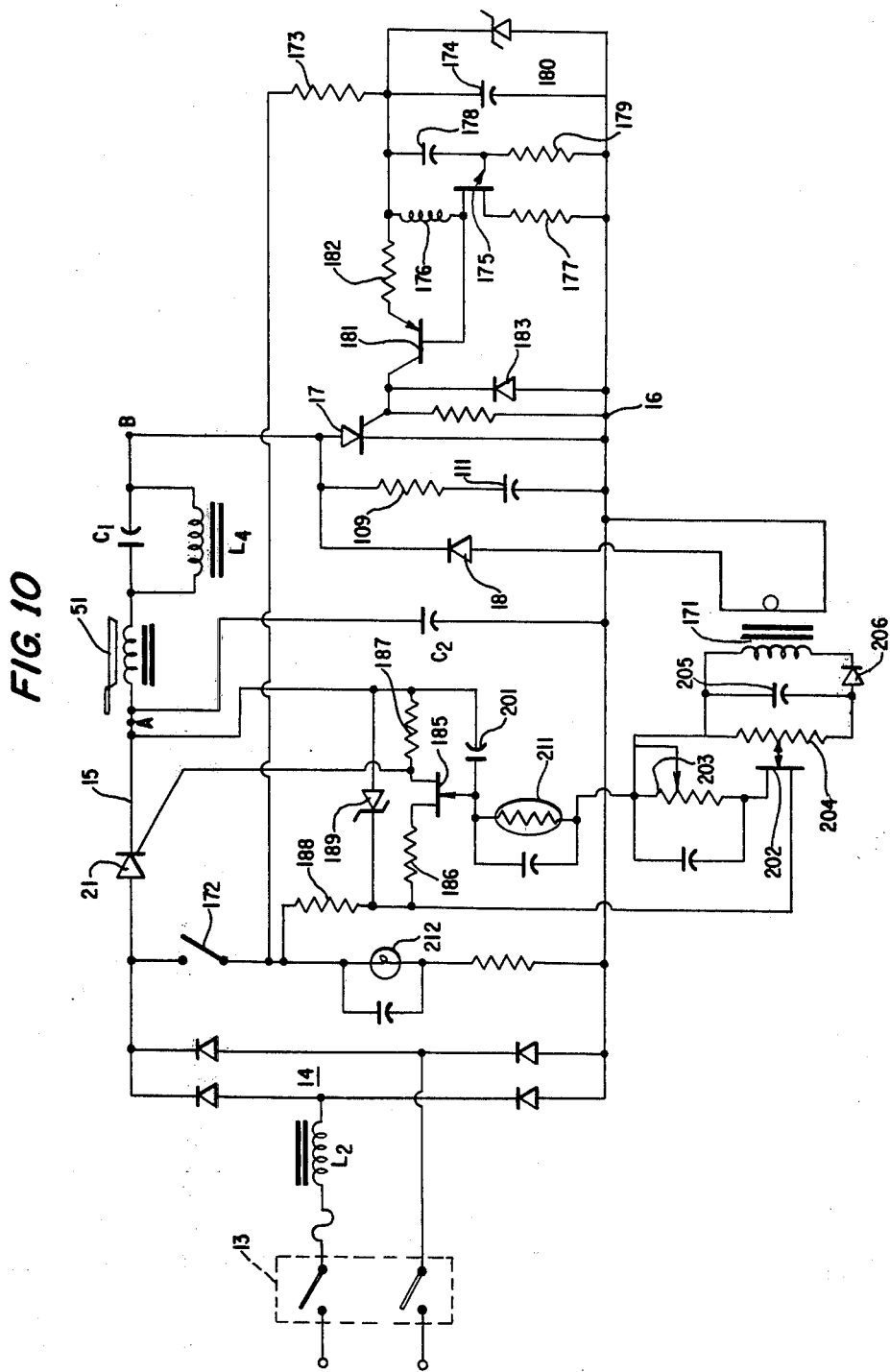
FIG. 10 is a detailed schematic circuit diagram of an alternative form of chopper inverter power supply and control according to the invention.

FIG. 10 is a schematic circuit diagram of still another form of induction heating apparatus constructed in accordance with the invention. In the circuit arrangement of FIG. 10, it will be seen that the commutating inductor $L_1$ (which also supplies induction heating field to the metal based pan 51) is connected in series circuit relationship with the commutating capacitor $C_1$ and chopper SCR 17 across a filter capacitor $C_2$. A small ferrite core smoothing coil $L_4$ is connected across commutating capacitor $C_1$ and a feedback diode 18 is connected across chopper SCR 17 in series circuit relationship with the single turn primary winding of a small ferrite core coupling transformer 171. A dv/dt snubbing circuit comprised by series connected resistor 109 and capacitor 111 is connected across the chopper SCR 18. Filtered, fullwave rectified, high voltage, unidirectional excitation potential is supplied to the chopper-inverter thus comprised from a fullwave rectifier 14 through a phase control switching SCR 21. A filter inductor $L_2$ is connected in the AC supply line to the fullwave rectifier 14 to assure effective charging of the filter capacitor $C_2$ at a rate which holds the peak charging current and the change in charging current with time (di/dt) at the terminals of the chopper SCR 17 within the ratings of the SCR. The filter reactor $L_2$ is placed on the AC line side of fullwave rectifier 14 in order to employ a smaller reactor and avoid core saturation problems due to the DC component of the current present at the output side of full wave rectifier 14. The chopper inverter when enabled by the phase control switching SCR 21 operates in a similar manner to the chopper inverter circuits described previously in connection with FIGS. 1-7. However, there are certain differences in the manner of controlling power output from the chopper-inverter of FIG. 10 in that a constant frequency gating signal source is employed to gate-on the chopper-inverter thereby causing it to run at a constant frequency while phase controlling the value of the DC excitation potential supplied to the chopper inverter across $C_2$ thereby control power output of the circuit and hence the heating produced by induction heating coil $L_1$.

To place the circuit of FIG. 10 in operation, an on-off switch 172 is closed following closure of the circuit breaker 13 to excite the fullwave rectifier 14. Closure of switch 172 results in supplying energization potential through a voltage dropping resistor 173 and zener diode 180 across a filter capacitor 174 that is used to supply a constant frequency gating signal generator. This gating signal generator is comprised by a complementary unijunction transistor (CUJT) 175 having its $B_1$ base electrode connected in series circuit relationship with a charging inductance 176 and its $B_2$ base electrode connected to a resistor 177 with the series circuit thus comprised being connected across the capacitor 174. A second capacitor 178 and resistor 179 are connected in series circuit relationship across the capacitor 174 and have the gate of the CUJT connected to their juncture. The gating circuit is completed by a PNP transistor 181 having its emitter connected through a limiting resistor 182 to the end of the charging inductor 176 opposite the $B_1$ base connection of CUJT 175 and having its base connected to the $B_1$ base of CUJT 175. The collector of transistor 181 is connected at the juncture of the control gate of the chopper SCR 17 and resistor 190. A clamping diode 183 is connected between the gate of SCR 17 and the negative power supply terminal 16 to which the cathode of SCR 17 is directly connected for clamping reverse voltage spikes to the negative supply terminal 16.

In operation, the gating circuit generates a fast-rising negative gating pulse across the inductance 176 which is directly coupled to the PNP transistor 181 to produce a high current gate signal. As a result, a flat-top, positive gating pulse is derived across a relatively low resistance resistor of the order of 20 ohms connected in the emitter-collector of PNP transistor 181. This gating circuit will produce positive pulses at a voltage level of from two to twenty volts for supply voltages of approximately the same value appearing across the filter capacitor 174. The pulses are produced at a nearly constant output frequency anywhere in the range of 12-30 kilocycles per second as determined primarily by the time constant of capacitor 178 and resistor 179 and have extremely sharp rise times so as to assure rapid turn-on of the chopper SCR 17. These pulses of constant frequency are applied continuously to SCR 17 whether or not the inverter power circuit has been enabled by turn-on of the phase control switching SCR 21.

In order to control turn-on of the phase control switching SCR 21, a unijunction transistor (UJT) timing circuit is provided employing a UJT 185. UJT 185 has its base electrodes connected through respective current limiting resistors 186 and 187 and a series connected limiting resistor 188 across the SCR at or near the zero point. A zener diode 189 limits the value of the voltage applied across UJT 185 and the series connected resistors 186 and 187. The juncture of the series connected resistor 187 and the base of UJT 185 is directly connected to the control gate of the phase control switching SCR 21 to cause it to turn-on upon the UJT 185 being rendered conductive.

To controllably render UJT 185 conductive a charging capacitor 201 is connected in series circuit relationship with a FET 202 constant current source across the zener diode 189. The FET 202 constant current source is comprised by a FET 202 and series connected variable resistor 203 for controlling the rate of charging of charging capacitor 201 and hence the time of firing of the UJT 185. The drain of the constant current FET 202 is connected to the tap point of a variable resistor 204 which has a voltage applied across it from a smoothing capacitor 205 and rectifier 206 excited from the secondary winding of transformer 171. Assuming normal loading on the circuit, then the feedback current flowing through feedback diode 18 wil be transformed from the primary to secondary winding of current transformer 171, rectified by diode 206 and appear across potentiometer resistor 204 as a substantially DC voltage that sets the level of the constant current through the FET 202. The setting of the variable resistor 203 will set or adjust the $t_2$ quiescent charging period of capacitor 201, and hence the timing of the breakdown of UJT 185. Upon UJT 185 breaking down and conducting, a positive polarity gating-on pulse will be supplied directly to the control gate of the phase control switching SCR 21 to render it conductive. This may occur at any point between 0° and 180° of the phase of the full wave rectified supply voltage thereby phase controlling the excitation voltage level supplied to the chopper-inverter circuit in a well known manner.

In a normal chopper-inverter with diode feedback, the reverse current fed back through diode 18 will be nearly equal to the forward current of the chopper SCR 17 when the inverter is unloaded. In fact, the magnitude of the feedback diode current varies in an inverse way with the power taken from the power-inverter. Since in the circuit of FIG. 10 the peak current flowing through the feedback diode is in fact sampled, rectified, and filtered to provide a DC control voltage, this voltage can be fed back to affect the phase of the firing of the phase control switching SCR 21 to thereby reduce the output power being produced by the chopper-inverter circuit. As a result the circuit operates to maintain the diode current at a substantially constant value over the entire range of no-load to full load operating conditions for the circuit. Consequently a feedback diode with lower maximum current, di/dt and dv/dt ratings may be employed with the circuit arrangement of FIG. 10. Furthermore, the very high voltage which otherwise would develop across the chopper-inverter commutating capacitor $C_1$ at no load are kept low, and losses incurred under no-load conditions are minimized. Further, the dv/dt and di/dt rating of the chopper SCR 17 are made less stringent. Alternatively, comparable features and operating advantages are obtained if the forward current in the main chopper SCR 17 is sampled and feedback in a similar manner to phase control switching SCR 21.

In addition to the above featues, the circuit of FIG. 10 includes a further safety feature which is important under conditions where the power control knob is turned to a position corresponding to maximum power output (i.e. resistor 203 set at a minimum resistor setting) and the commutating coil $L_1$ is unloaded (no pan is on the commutating coil). In addition there are times when a housewife may initially turn the appliance on with the power control knob (and hence resistor 203)

rotated to a full power setting under no-load conditions (i.e. with no pan on the inductor $L_1$). At the instant of turn-on under the above stated conditions, because of delays inherent in the circuit there will be no feedback voltage to the phase control FET 202, and momentarily the unloaded chopper-inverter will present a very low impedance across filter capacitor $C_2$. Under these conditions, a very high line current would flow and result in misfiring of SCR 17 and/or causing circuit breaker 13 to trip-out.

In order to avoid possible misfiring in the above stated manner, the circuit of FIG. 10 includes a photo conductor 211 and filamentary lamp 212 arrangement to assure gradual start-up from a low to a high power output even though the power control setting of resistor 203 is at its full-on position. The photo conductor 211 is placed in series with the power control resistor 203 and FET 202. When the on-off switch 172 is turned on, the resistance of the photo conductor is at first very high and only a small level of current will trickle through to charge capacitor 201. However, with no-load the feedback diode current is relatively large and a feedback voltage soon develops at the FET 202 gate. As the brillance of the light from lamp 212 increases, the resistance of the photo conductor 211 decreases tending to develop more charging voltage for the charging capacitor 201. However, the feedback signal to the FET 202 also grows proportionally and restricts the input to charging capacitor 201. When the lamp reaches full brillance as determined by the RC time constant of the circuit of which it is part, the resistance of the photo conductor becomes very low and the device no longer participates in controlling the behavior of the UJT phase control firing circuit and hence in controlling the chopper-inverter. Additionally, if the AC line voltage drops to a very low value, the lamp 212 will go out and reduce power input to the chopper inverter proportionally more rapidly than would occur if only the input voltage itself were lowered.

The manner in which the circuit of FIG. 10 operates to automatically reduce output power upon detecting a no-load condition as described above can best be appreciated in connection with FIG. 7B of the drawings. Referring to FIG. 7B, it will be seen that under normal load conditions, the forward current flowing through the chopper SCR 17 indicated by the solid line curve during the interval $t_{1S}$ and the reverse current flowing in the feedback diode 18 during the interval $t_{1D}$, are substantially equal. However, upon a no-load condition being imposed upon the circuit at substantially full power setting as described above, the reverse feedback current through the feedback diode 18 will increase during the $t_{1D}$ intervals in the manner shown by the dotted line curves. FET 202 feedback control senses this increase in feedback diode current and adjusts the charging current to charging capacitor 201 so as to delay the phase of the firing of SCR 21 a sufficient time to return the reverse diode current to a value substantially equal to that flowing in the forward direction through the chopper SCR 17.

While the circuit of FIG. 10 does not include a temperature control, it is believed obvious that a temperature sensor may be included in the circuit and attached near the inductive heating coil or to the metal base cookware or other object being heated to maintain a constant temperature or to turn-off the circuit when a specified temperature is reached. Such an addition could employ a thermistor bridge or other similar tempertaure sensing arrangements such as those of FIGS. 4 and 5 to develop an error voltage to control the charging current passing through the FET 202 for proportional control purposes. An over temperature control could also be provided by triggering a small SCR at a preset level of voltage corresponding to the maximum allowable temperature to stop the firing circuit of the phase control switching SCR 21, for example.

From a comparison of the circuit of FIG. 10 to the circuit shown in FIG. 4, it will be appreciated, that in the FIG. 4 circuit, output power derived from the circuit was controlled over a wide range by varying the frequency of operation or the value of the commutating capacitance (or both) of the chopper-inverter (ie varying the chopping rate of the chopper inverter and/or varying the value of the commutating capacitance for increasing or decreasing the rate of power production at any given chopping rate). In the circuit of FIG. 10, the chopping rate is maintained constant, and output power derived from the circuit is varied by phase controlling the point of turn-on for firing of the series connected phase control switching SCR 21. By varying the phase angle (sometimes referred to as the angle of delay) at which the SCR 21 is rendered conductive over the range from 0° to 180°, output power produced by the constant frequency chopper inverter can be varied. Here again for a wider range of power variation, capacitor switching of the value of the commutating capacitance could be employed or vary the rate of the power production at any given phase angle of delay or firing of the SCR 21. Also, the frequency of the gating circit could be varied to achieve power control in conjunction with phase control of power.

The circuit of FIG. 10 has also been operated employing the alternative connection of the power components $L_1$, $C_1$, $C_2$, $L_4$ as shown in FIG. 10A which greatly reduces the rf chopper current which must flow through the electrolytic capacitor $C_2$. This alternative circuit is connected between buss 16 and points A and B with no other changes required in the control circuitry. Operation and concepts described under FIG. 10 remain the same.

Figure 11:
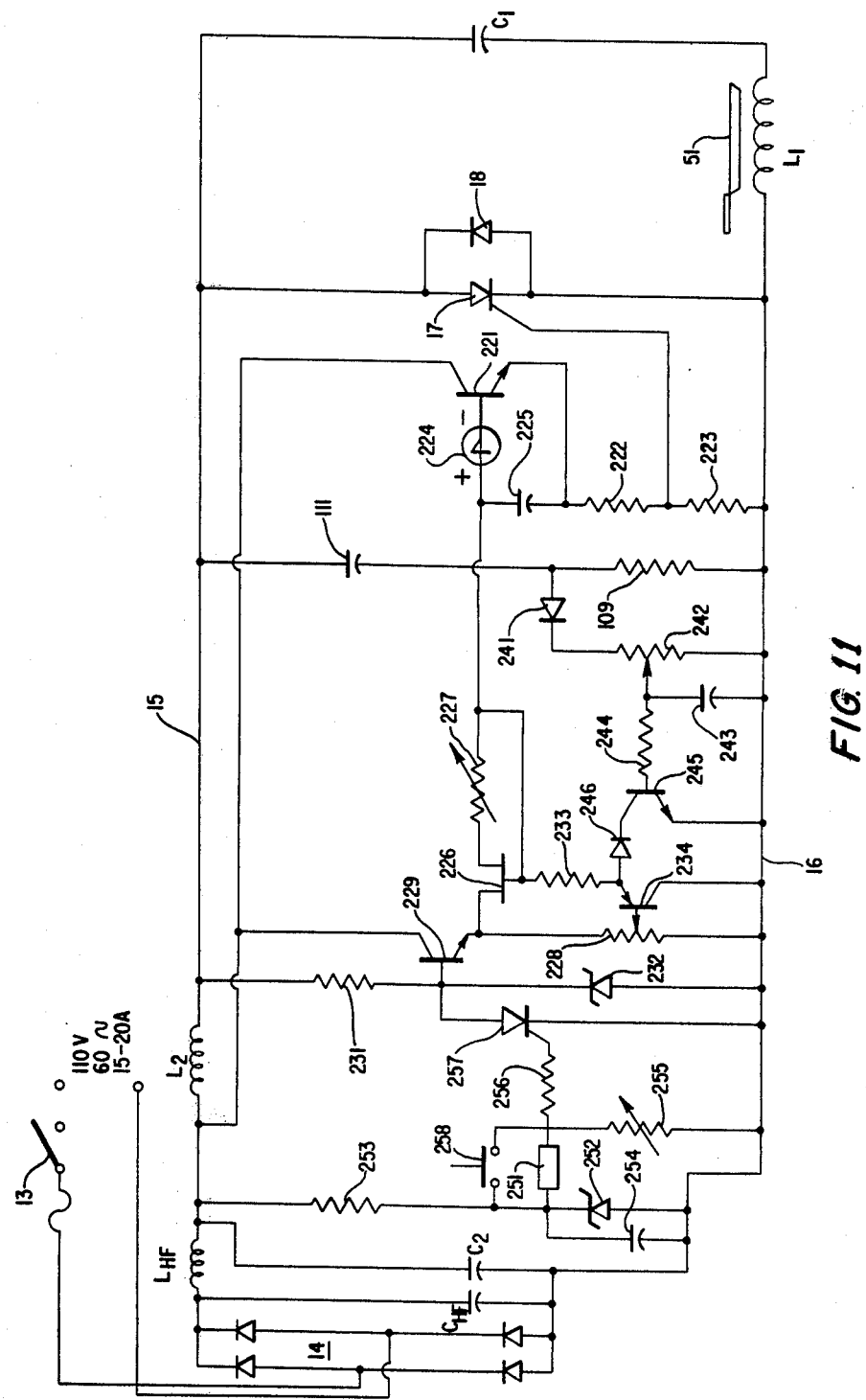
FIG. 11 is a detailed schematic circuit diagram of still another form of chopper inverter power supply constructed in accordance with the invention and illustrates a novel dv/dt control for reducing power output from the circuit upon a pan being removed with the circuit otherwise adjusted to produce full output power and heating.

FIG. 11 of the drawings illustrates still a different form of induction heating apparatus constructed in accordance with the invention using the series commutated chopper-inverter circuit comprised by commutating inductor $L_1$ and series connected commutating capacitor $C_1$, chopper SCR 17 and feedback diode 18 excited through inductor $L_2$ from a fullwave rectifier supply 14 shunted by filter capacitor $C_2$. In the circuit of FIG. 11, no series connected switching SCR is used for either phase controlling the voltage supplied to the chopper inverter as in the circuit FIG. 10, or for zero point switching as in the circuit of FIG. 4. To prevent AC system disturbance a small high frequency filter inductor $L_{HF}$ and a high frequency filter capacitor $C_{HF}$ connected as shown intermediate the output of the full wave rectifier 14 and the filter capacitor $C_2$.

Gating-on pulses are supplied to the control gate of the chopper SCR 17 from a high voltage, constant current, gating NPN transistor 221 that derives its power from directly across the power supply terminals 15 and 16 through load resistors 222 and 223. The control gate of the chopper SCR 17 is connected to the juncture of the load resistor 222 and 223. If desired, in order to provide DC isolation between the gating circuit and the power SCR 17, the primary winding of a pulse transformer can be connected in shunt with resistor 223 with the secondary winding of the gate transformer being connected from the control gate of chopper SCR 17 to terminal 16. Gating transistor 221 is turned-on by a silicon unilateral switch (SUS) 224 that provides a fast rising, snap-on pulse of constant magnitude between the base and emitter terminals of transistor 221 upon the charge on a charging capacitor 225 reaching the threshold level of SUS 224. Transistor 221 acts as a power amplifier to produce a pulse of much larger current in load resistors 222 and 223 than is generated by the discharge of capacitor 225 through SUS 224. Charging capacitor 225 in turn is charged from a constant current source comprised by an FET 226 and adjustable feedback resistor 227 connected to supply a substantially constant, linear charging current to charging capacitor 225.

FET 226 derives its power from across a resistor 228 connected in the emitter-collector circuit of an NPN transistor 229 with the series connected resistor 228 and transistor 229 being connected across the power supply terminals 15A and 16. The base of transistor 229 is connected to the juncture of a second series connected resistor 231 and zener diode 232 connected between terminal 16 and the anode of SCR 17. The gate of FET 226 in addition to the feedback connection from across feedback resistor 227 is connected through a limiting resistor 233 to the emitter of a PNP transistor 234 having its collector connected to power supply terminal 16 and its base connected to a variable tap point on the DC supply resistor 228. By varying the tap point of the DC supply resistor 228, the charging current supplied through FET 226 to charging capacitor 225 can be varied to thereby vary the frequency of the output gating pulses produced by SUS 224 and NPN power switching transistor 221. This in turn varies the rate of firing of the chopping SCR 17 to thereby vary the output power of the chopper inverter in the manner previously discussed in connection with FIG. 7 of the drawings.

As mentioned earlier, there are many instances when a housewife might remove the pan 51 from the induction heating coil L₁ while leaving the power setting of variable resistor 228 at its full power on position. Under such conditions, the feedback current through the feedback diode 18 will be increased substantially in the manner indicated by the dotted outline waveform shown in FIG. 7B of the drawings. This increased feedback current through diode 18 upon turn-off of diode 18 will result in a substantially increased value of the rate of reapplied forward voltage $V_{C1}$ across the SCR 17 (high dv/dt) which will appear across the parallel connected snubber network comprised by series connected resistor 109 and capacitor 111. To detect this increased dv/dt voltage, a rectifier 241 and load resistor 242 are connected across the snubber resistor 109, and the resultant rectified voltage is differentiated in a differentiating network comprised by a capacitor 243 and resistor 244 with the differentiated output being applied to the base of the NPN transistor 245. NPN transistor 245 has its emitter electrode connected directly to the negative terminal 16 and its collector connected through a blocking diode 246 and the limiting resistor 233 to the gate of FET 226. As a consequence, upon a large dv/dt voltage arising from a large value of $V_{C1}$ being developed across snubber resistor 109, it is rectified, differentiated and applied to NPN transistor 245 to in effect shunt the gate of FET 226 to the voltage of the negative power supply terminal 16 thereby reducing by an amount proportional to the dv/dt voltage the current passing through FET 226 so as to decrease the charging rate of the capacitor 225. As a consequence of the cutback in charging rate of capacitor 225, the frequency of the firing pulses produced by SUS 224 and NPN power transistor 221 is cutback until the value of dv/dt and $V_{C1}$ has been reduced to a prescribed and safe level determined by the setting of variable resistor 242. Thus, the circuit automatically sensed the removal of the pan 51 under a full power-on condition and automatically cuts back the rate of production of output power from the chopper inverter circuit upon sensing such a condition. As a result the input power to the inverter at no load is reduced singificantly below the no load standby losses in the absence of dv/dt control of the chopper rate. The value of commutating current $I_1$ and of $V_F$ and $V_{C1}$ are likewise reduced.

The dv/dt voltage which is applied to the base of transistor 245 is not only proportional to the rate of rise of voltage to level $V_{C1}$ across diode 18 when it turns off but is also proportional to the magnitude of $V_{C1}$. As a result the feedback of the dv/dt voltage to change the chopping frequency also acts to regulate the power produced against changes in supply voltage E. From the earlier discussion relative to FIG. 7 it will be recalled that for a given loading $V_{C1}$ holds a fixed relationship with respect to $V_F$ and $V_F$ is directly proportional to line voltage E. Thus for a given loading, $V_{C1}$ will vary with supply voltage. The circuit will act to change the chopping frequency in the same manner as if the load were being changed to keep $V_{C1}$ constant and hence both $V_F$ and the power produced in the load constant. This feature is of considerable value in mantaining constant the heat produced in a cookware pan of given size against wide variations in supply voltage.

In addition to the above control, the circuit of FIG. 11 also provides on-off control of the temperature of the metal base pan 51 by means of a thermistor or other similar temperature responsive device having a negative temperature coefficient, which is disposed adjacent the pan 51 for sensing its temperature. In FIG. 11, the temperature sensing thermistor is shown at 251 for convenience in illustration although it is to be understood that physically it would be positioned adjacent to or touching the pan 51 for sensing its temperature. Thermistor 251 has one of its terminals connected to the juncture of a series connected zener diode 252 and voltage dropping resistor 253 connected in series circuit relationship across the power supply terminals 15 and 16. A smoothing capacitor 254 is connected across the zener diode 252 for further stabilizing the low voltage excitation potential developed for thermistor 251. The remaining terminal of thermistor 251 is connected in series with a voltage dropping resistor 255 to negative supply terminal 16, and the juncture of thermistor 251 with resistor 255 is connected through a limiting resistor 256 to the control gate of a small, inhibit switching SCR 257. Inhibit SCR 257 is connected across the low voltage zener diode 232 that supplies the base of transistor 229 whose emitter voltage to terminal 16 supplies constant current FET 226 and timing capacitor C225. It will be appreciated that upon the inhibit SCR 257 being turned-on and conducting, it will short out zener diode 232 and prevent the development and application of the excitation potential for FET 226 constant current source and charging capacitor 225 thereby preventing further development of gating pulses for supply to the control gate of the chopper SCR 17. The level of DC voltage across SCR 257 cannot exceed the voltage on zener diode 232, and when the inverter is off the voltage supplying the zener diode falls by a factor of about four to one. By using a high resistance for resistor 231, the current flowing through SCR 257 is lowered to a level near its holding current and it will open upon lowering the voltage applied to its gate. Thus SCR 257 operates in a low current mode as a very high gain amplifier such that it can be turned off even in the presence of a DC potential from its anode to its cathode when the sensed temperature falls below the levelset by R 255. A relay powered by the voltage across R 255 could also be employed in place of SCR 257. An additional on-off switch shown at 258 is provided for turning on the inhibit SCR 257 at the will of an operator of the circuit. Ordinarily, however, on-off switch 258 will be retained in the off position shown in FIG. 11.

In operation under conditions where the inductively heated pan 51 is cool and requires that heating power be supplied from the chopper-inverter, thermistor 251 will be correspondingly cool. Because of its negative temperature coefficient of resistance, thermistor 251 will exhibit a relatively large resistance value so that the juncture of the thermistor 251 with resistor 255 is at a substantially lower value than the turn-on potential of inhibit SCR 257. However, upon the pan 51 being evelated in temperature to the temperature values established by the thermistor 251, the potential at the gate of the inhibit transistor 257 will be raised sufficiently to turn-on inhibit SCR 257 and inhibit the production of further gating-on pulses for supply to chopper SCR 17 in the above described manner. By switching in different value thermistors 251, or varying the value of resistor 255, the temperature level at which the inhibiting action of SCR 257 is introduced can be varied to thereby control the temperature of the pan 51.

Figure 12:
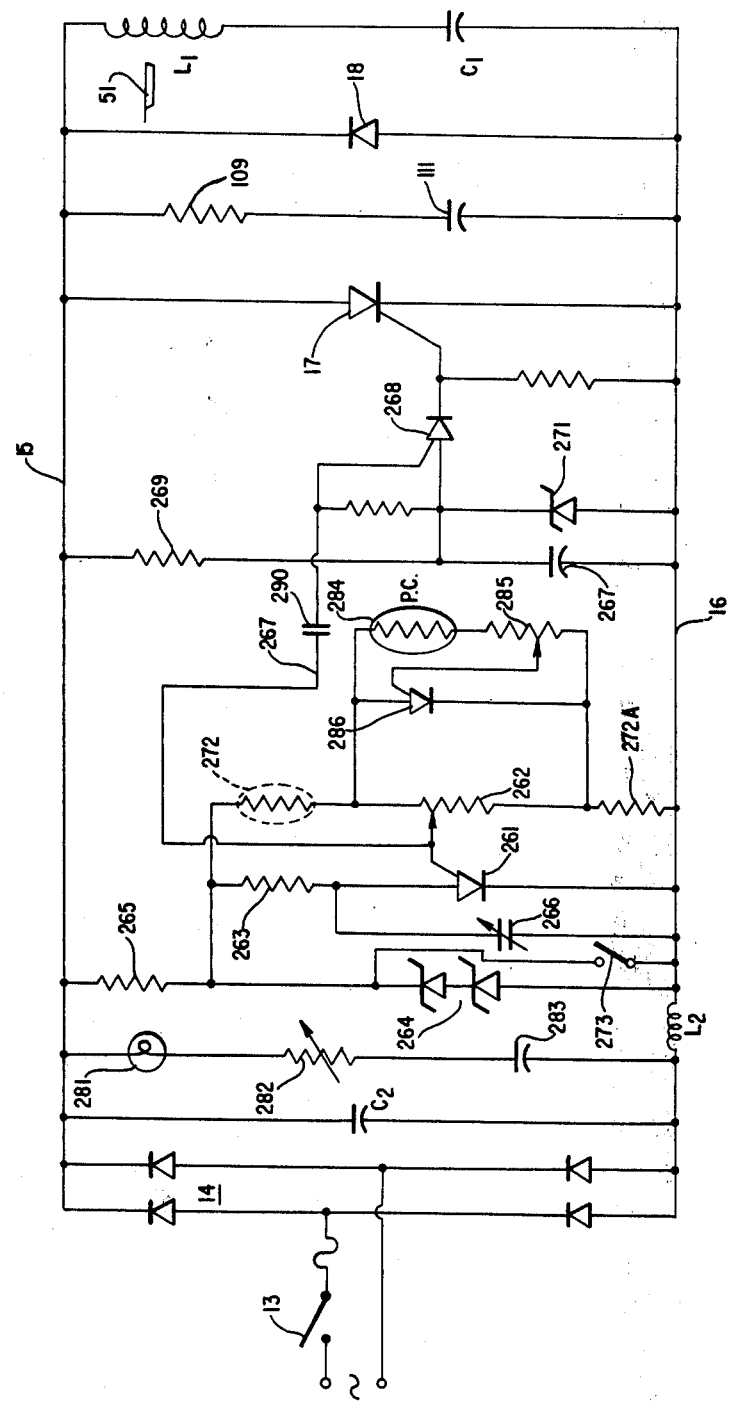
FIG. 12 is a detailed schematic circuit diagram of still another form of the chopper inverter power supply circuit and pan-off control for reducing output power automatically upon a pan being removed from the circuit without first having to cut back the output power setting.

FIG. 12 is a detailed schematic circuit diagram of still another form of improved induction heating apparatus constructed in accordance with the invention. In the FIG. 12 apparatus, an improved chopper-inverter power supply circuit is again employed and is comprised by the series connected commutating capacitor $C_1$ and commutating-induction heating coil $L_1$ connected across a chopper SCR 17 and feedback diode 18. A dv/dt snubber circuit comprised by series connected resistor 109 and capacitor 111 is connected in parallel circuit relationship across the chopper SCR 17 for limiting the rate of reapplied forward voltage (dv/dt) across SCR 17. The chopper inverter is supplied from a full wave rectifier 14 over power supply terminals 15 and 16 through filter inductor coil $L_2$ and filter capacitor $C_2$. The primary distinction of the FIG. 12 circuit over those previously described is with respect to the design of the gating-on circuit and the nature of the pan-off control that is exercised under conditions when the metal base pan 51 is removed from the induction heating coil with the circuit adjusted to provide full output power.

A trigger oscillator for producing variable frequency trigger pulses of relatively low voltage and insufficient energy to drive the chopper SCR 17 directly, are produced by a trigger oscillator comprising a first programmable unijunction transistor (PUT) 261. The PUT 261 like the silicon unilateral switch (SUS) used in previously described embodiments is an integrated circuit, low voltage switching device manufactured and sold commercially by a number of semiconductor manufacturers such as the General Electric Company. The PUT 261 is a low voltage switching device having a sharp breakover voltage or threshold level set by the value of the voltage supplied to its gate electrode from a variable resistor voltage divider 262 measured with respect to its anode and cathode voltages. The anode and cathode of PUT 261 are connected in series circuit relationship with a current limiting resistor 263 across a pair of low voltage, direct current stabilizing zener diodes 264 that in turn are connected in series circuit relationship with a voltage dropping resistor 265 across the high voltage, from terminal 15 to terminal 16A on the inverter side of inductor $L_2$. The voltage established across zener diodes 264 is supplied through resistor 263 to a variable charging capacitor 266. As capacitor 266 charges, the anode-to-cathode voltage across the PUT 261 will reach a point where it equals the gate-to-cathode voltage of PUT 261 set by resistor voltage divider 262, whereupon PUT 261 breaks over and conducts. Conduction through PUT 261 discharges capacitor 266 and initiates a new charging cycle. The RC time constant of resistor 263 and capacitor 266 and the setting of voltage divider 262 establish the time delay $t_2$ between the end of the commutating period $t_1$ of $L_1$ and $C_1$ and the next turn-on of SCR 17. The capacitance and resistance of variable capacitors 266 and of resistor 263 are set so that the time delay which governs the chopping rate and the power output from the inverter circuit can be controlled over a desired range solely by an adjustment of voltage divider resistor 262.

Negative going square trigger pulses are produced at the gate of PUT 261 and are supplied over a conductor 267 through a coupling capacitor 290 to the turn-on gate of a second PUT 268 that serves as a driver amplifier for gating-on the high voltage SCR 17. The driver PUT 268 has its anode connected to the midtap point of a low voltage direct current energization circuit comprised by a resistor 269 and capacitor 267 connected in series circuit relationship across the power supply terminals 15 and 16A. A zener diode 271 is connected across the capacitor 267 for stablization purposes. The capacitance of capacitor 267 is about 100 times greater than that of capacitor 266 so that the circuit is capable of providing relatively large energy, gating-on pulses for direct application to the control gate of high voltage chopper SCR 17. Thus it will be appreciated that the PUT 261 provides a low-power trigger pulse to turn on driver PUT 268 at the end of a delay period which is relatively independent of supply voltage to PUT 261, so that the delay period remains constant down to very low levels of supply voltage such as prevail in the ripple valley of the supply voltage across capacitor $C_2$ under conditions of heavy loading of the inverter. As a result the inverter chopping rate changes very little throughout the period of a half cycle of the supply frequency. The pulses provided by PUT 261 have insufficient energy to turn-on the high voltage chopper SCR 17 directly. Accordingly, the trigger pulses from PUT 261 are amplified in the driver PUT 268 to provide gating-on pulses of relative constant amplitude and sufficient energy to drive the high voltage SCR 17 directly. The pulse amplitude of the gating-on pulses applied from the driver PUT 268 are limited and of constant amplitude due to the zener diode 271 clamp on capacitor 267.

In addition to providing variable frequency control of the average output power from the circuit of FIG. 12, temperature control can be provided by including a thermistor such as that shown at 272 in the gate circuit of PUT 261 for example. With such an arrangement the thermistor 272 would be located to sense the temperature of the pan or other object being heated by the induction heating coil $L_1$, and would directly set the threshold level of turn-on of PUT 261 so as to obtain linear proportional control of the heating function. As an alternative, on-off control can be obtained by providing a temperature sensitive switch 273 connected across zener diodes 264. The on-off switch could comprise the contact of a reed relay powered by the infra red temperature sensing circuit such as that described with relation to FIG. 5 of the drawings.

In addition to the above noted features, an override control of the chopping frequency as set by resistor 262 is also provided to reduce the chopping frequency and therefore the standby power when the pan is removed. This pan-off override control operates to cut back the frequency and hence average output power level of the circuit independently of the power setting of controls 266 or 262. This pan-off override control of average standby power is obtained through the medium of a filamentary lamp 281 connected in series circuit relationship with a variable resistor 282 and capacitor 283 so as to be powered by the AC ripple component of the supply voltage across the high voltage power supply terminals 15 and 16. The filamentary lamp 281 is optically coupled to a photo conductor 284 such as a photo resistor, photo cell, photo diode or the like connected in series circuit relationship with adjustable resistor 285 across the variable temperature set point resistor 262. The tap point on the variable resistor 285 is connected to the control gate of a third PUT 286 that is connected in parallel circuit relationship across the variable temperature set resistor 262.

When photo conductor 284 is lighted by lamp 281 the photoconductor 284 exhibits a low resistance so that PUT 286 is maintained off. However where there is no light from lamp 281 the resistance of the photo conductor 284 rises to a high value and the anode-to-gate voltage of PUT 286 becomes sufficiently negative to allow it to turn on and thereby shorting and inactivating variable resistor 262. This results in increasing the delay time between trigger pulses produced by the PUT oscillator 261 to its maximum value as set by resistors 272 and 272A. However for so long as light is directed from lamp 281 to the photo conductor 284, the third PUT 286 is maintained off, and the chopping frequency of the inverter and heating of a given pan are under the control of capacitor 266 and/or variable resistor 262.

It can be demonstrated that with the circuit shown in FIG. 12, under conditions where the circuit is set at a full output power setting (ie the repetition rate of the trigger pulses is highest in accordance with the principles described with relation to FIG. 7 of the drawings) and the metal-base cookware 51 or other object being heated suddenly is removed, that the establishment of the no-load condition in conjunction with full power setting results in the removal of a substantial ripple component of the high unidirectional voltage supplied across the terminals 15 and 16. Since the filamentary lamp 281 is connected in series with the capacitor 283, it will not be sensitive to the normal DC voltage appearing across terminals 15 and 16, but will be illuminated only by the time-varying current of the ripple component such as that described above. Accordingly, the absence of the ripple results in turning off filamentary lamp 281. Upon the filamentary lamp 281 being turned-off, (due to the absence of the ripple) it in turn will cause photo conductor 284 to turn on the third PUT 286, and cut back the frequency and hence the average output power developed by the chopper inverter circuit to its minimum setting.

FIG. 13 of the drawings illustrates an embodiment of the invention which is somewhat similar to the circuit arrangement shown in FIG. 6 of the drawings but differs from the FIG. 6 circuit in that it does not employ a series connected, zero point switching triac 207 or other similar series connected bidirectional conducting thyristor device such as two parallel connected, reverse polarity SCRs. Instead, on/off power control is obtained by turning on or off the trigger pulses on the gate of SCR 17. However, similar to the circuit of FIG. 6, the FIG. 13 circuit may utilize fast recovery diodes in the diode rectifier bridge 14 and the rectifier bridge 14 serves not only as a full wave power line rectifier but also serves to recirculate the feedback current from the chopper-inverter commutating components $L_1C_1$ following turnoff of the SCR 17. The feedback diode 18 has been shown in dotted outline form since the circuit of FIG. 13 readily can be modified to place the $L_2$ filter coil as well as the filter capacitor $C_2$ on the output or DC side of the fullwave rectifier 14 in the manner shown in dotted outline and the circuit would then operate substantially in the manner described previously in connection with FIG. 4, etc but would require the use of a separate feedback diode 18. It is preferred from one standpoint, however, to operate the circuit with the $L_2$ filter coil and $C_2$ filter capacitor connected on the AC side of the rectifier bridge 14 in the manner shown in solid line since with this connection the line current is essentially sinusoidal and free from sharp increases near the beginning of each half cycle which are characteristic of the circuit when $C_2$ and $L_2$ are connected on the DC side of rectifier 14. With such an arrangement, the feedback diode 18 is omitted and feedback of the commutating current takes place through the power rectifier diodes 14. Otherwise, the chopper inverter subcircuit of FIG. 13 is similar to those previously described in that it employs the series connected $L_1C_1$ commutating components and in addition may have the $L_3C_3$ smoothing components connected across the $C_1$ commutating capacitor as shown in dotted outline. Here again, the level of power can be selected by switching in a desired value of the $C_1$ commutating capacitor with an arrangement such as that shown in FIG. 4. However, for convenience in FIG. 13 capacitor $C_1$ has been illustrated as a variable capacitor to provide such a power switching function. The snubbing circuit comprised by the series connected capacitor 111 and resistor 109 also is provided and is connected across the chopper SCR 17 for minimizing dv/dt effects on the SCR.

Chopper SCR 17 is turned-on by gating pulses supplied to its control gate by a gating transistor 311 having its emitter connected through a load resistor 312 to the power supply terminal 16. Gating transistor 311 is an NPN transistor and has its collector connected to the juncture of a series connected resistor 313 and diode 330 and zener diode 314 with a capacitor 315 being connected across zener diode 314 and a bleeder resistor 316 connected across the capacitor 315 and zener diode 314. The resistor 313, zener diode 314 and capacitor 315 develop a direct current voltage from the time varying voltage 15-16 appearing across SCR 17. This DC voltage is applied across the collector-to-emitter terminals of transistor 311 in series with load resistor 312.

The base of gating transistor 311 is connected to the output from a SUS delayed pulse generator circuit comprised by SUS 95, timing capacitor, 94, and variable resistor 34 which is similar in construction and operation to the SUS trigger circuit described in relation to FIGS. 4 and 11. The SUS trigger device 95 is supplied by a time-varying potential across zener diode 92 derived from the voltage across SCR 17 through series connected resistor 93. The small energy trigger pulses generated by the SUS trigger circuit 95 are amplified in gating transistor 311 which provides both voltage gain as well as considerable power gain to develop large gating pulses across load resistor 312 for application to the control gate of chopper SCR 17. These pulses have typically a peak voltage amplitude of 20 volts and a peak current amplitude of one to two amperes, these amplitudes being independent of the cyclical variation in the voltage of the AC power line.

An inhibit and delay circuit similar to that shown in FIG. 4 is connected across terminals 15 and 16 which carry a high-frequency chopped fullwave potential having an average DC component and a peak magnitude which follows the contour of the amplitude of the fullwave rectified supply voltage. A signal level power controlling SCR 72 is connected in parallel with zener diode 92 and therefore shares with the diode the current flowing through supply resistor 93. When SCR 72 conducts, there is negligible voltage across zener diode 92 and no voltage can build up on capacitor 94 and across SUS 95 so that trigger pulses will not be developed by the SUS circuit and the inverter will not operate. Resistors 74, 85, 76 and capacitor 82 just as in FIG. 4, comprise a circuit which delays the turn off of SCR 72 by transistor 73 which, when the latter is turned-on draws reverse current from the gate of SCR 72 and turns SCR 72 off. When SCR 72 is turned off, the voltage across zener diose 92 rises abruptly and the SUS 95 timing and pulse generator circuit produces a trigger pulse at SCR 17 and the inverter begins to operate.

Turning on NPN transistors 85 or/and 81 discharges capacitor 82 through discharge resistor 80, turns off transistor 73 and allows current through resistor 71 to fire SCR 72 to turn it on and thereby remove voltage from zener diode 92 and stop the inverter. Resistors 83 and 84 form a potential divider and cause transistor 85 to be always on and the inverter off unless the gate of transistor 81 is shorted to terminal 16 by a switch such as the non-shorting switch 25a of FIG. 4 used in conjunction with progressively shorting switch for changing the capacitance of capacitor $C_1$ and the level of power production by the inverter as discussed earlier with respect to FIG. 4. Transistor 85 is turned on by the application of a small DC voltage between its base and terminal 16, such as might be furnished from a threshold switch in the temperature sensor and amplifier 24 as prescribed with relation to FIG. 4. Thus, in essence the inhibit and delay subcircuit can be connected directly across the chopper SCR to prevent turn-on of SCR 17 (not even momentarily) when the switch 13 may be closed and the unit is first connected to the power line. The delay time must elapse before the inverter will operate and the delay comes into action when the capacitance $C_1$ is switched to a new value as well as when external commands act to turn the inverter on after the circuit is energized but the inverter is not running.

When $C_2$ is on the AC side of rectifier 14 the SCR 72 will turn off near the zero points of the rectified output of rectifier 14. These then are the points near which the inverter will begin to operate, and consequently the circuit provides a near zero voltage start up feature. In turning off, SCR 72 will be turned on most easily at a point of supply voltage away from the zero point and the inverter will cease operating abruptly following the last gate trigger pulse which is generated by SUS 95. Abrupt turn off causes no commutation problem although abrupt turn-on can easily do so.

Turn-on and turn-off of the circuit of FIG. 13 may be achieved in two basic ways. Most simply on/off control is afforded by circuit breaker 13 in series with the circuit and the power line. When breaker 13 is closed, the inhibit and delay subcircuit 72, etc, SUS timing subcircuit 95, etc and the power amplifier 311 and DC supply subcircuit 314 are actuated automatically in a preferential order to achieve inverter starting and proper SCR commutating under all conditions of loading. Secondly, breaker 13 may be treated merely as a protective device for removing line voltage under overload conditions so as to require infrequent resetting; and instead, a low current switch would be employed to start and stop the inverter. Such a switch might be part of a bimetallic temperature control, be a photo relay, a reed relay, or simply a small single-pole switch connected to provide remote switching or conveniently operated and installed manual switching at a nearby control panel, for example. Two possible ways of connecting a small switch are shown in FIG. 13 and identified as switches 13a and 13B. Switch 13a may be connected across the junction of the collectors of transistors 81 and 85 to terminal 16. In this connection switch 13a acts to discharge capacitor 82 to turn off the inverter and must therfore be open in order for the inverter to turn-on. Switch 13B acts similarly but in the opposite sense to control the inverter. This switch is connected from terminal 16 to the gate of transistor 81 and can be in parallel with the $C_1$ non-shorting switch connection. In this connection the contacts of switch 13B must close to have the inverter turn-on. In any event, breaker 13 must be closed in order for either switch 13a or 13B to have control of the on/off function.

If variable resistor 34 is employed to control the level of power production by control of the delay period $t_2$, it may prove desirable to gang switch 13B to variable resistor 34 such that the delay $t_2$ is longest and the power level lowest when the switch is turned onto start the inverter. In this way the on/off switch becomes part of a single control acting to produce the least power near the off position. Of course, an inversely acting switch such as switch 13a can be similarly ganged to variable resistor 34.

Upon placing the circuit of FIG. 13 in operation by the closure of breaker 13 and, if they are present, opening switch 13a and/or closing switch 13B, the inhibit and delay circuit will prevent the generation of trigger pulses for a short delay period of typically one-half second. This predetermined delay period allows the capacitors $C_1$, $C_3$ and 315 to charge before the chopper SCR 17 is fired. Following the predetermined delay period, timing capacitor 94 charges, causing SUS 95 to break down at approximately 8 volts and turn-on gating transistor 311 momentarily through coupling capacitor 96. Thereafter, gating transistor 311 does not stay on beyond the period required to charge capacitor 96 to the voltage of zener diodes 92. This feature is important since it does not allow the gating transistor 311 to continue to conduct in the event of a premature trigger pulse from SUS 95 under conditions where there is insufficient energy in capacitor 315 to assure turn-on of SCR 17. The direct current supply for gating transistor 311 taken from the chopped fullwave rectifier potential appearing across terminals 15 and 16 by resistor 313 and zener diode 314 and capacitor 315 assures that all of the gating pulses have nearly equal energy, even including those which are generated close to the zero point of the full wave rectified excitation potential.

The time constant of timing capacitor 94 and charging resistor 34 determines the value of $t_2$ in accordance with the description set forth above with relation to FIG. 7. Since the gating transistor 311 provides considerable gain, the charge stored on the timing capacitor 94 need not be large and only a small capacitor having a value of capacitance of the order of 0.005 micro farads is necessary. It should also be noted that no pulse transformer is required in the circuit of FIG. 13 nor does it require a series connected, zero point switch or triac of large power rating which would add considerable cost to the power circuit. Since the circuit may be one in which the full wave rectifier 14 acts simultaneously as the feedback diode and the full wave rectifier, additional savings in complexity and cost of power components is realized. Further, no separate DC power supply is required since the required DC potential is derived from the voltage appearing across terminals 15 and 16 for exciting the gating transistor 311. This DC excitation potential source also may supply the temperature sensor amplifier power supply circuit 318 as shown. The temperature sensor amplifier 24 may be constructed and operate in the manner described above with relation to FIG. 5 of the drawings so as to provide temperature control via the closing and opening of a shorting switch is shunt either with switch 13a or switch 13B to prevent development of trigger pulses by the SUS trigger circuit 95. Such an arrangement is shown in dotted outline in FIG. 13, switch 162 is shown in shunt with switch 13a and is actuated by a coil 161 which is powered by the temperature sensor amplifier 24. In other respects, the circuit of FIG. 13 will function in a manner similar to that described with relation to previous embodiments of the invention, and need not be described in further detail.

The circuit shown in FIG. 13 with $C_2$ on the power line side of rectifier 14 as shown in solid line form provides a nearly sinusoidal waveshape to the AC line current drawn from the alternating current power source. The circuit works equally well if the fullwave rectifier 14 does not also serve as a feedback diode, and a separate fast-recovery feedback diode 18 is added and the filter inductor $L_2$ is connected on the output or DC side of the fullwave rectifier 14 as shown in dotted outline form. Here the rectifier 14 need not be of the of the fast recovery type. With such a modification, the filter capacitor $C_2$ could be left on the AC side of fullwave rectifier 14 to avoid capacitor charging effects on the line current drawn from the AC source. In this last mentioned arrangement the $L_2$ filter coil may be connected on the output side of full wave rectifier 14 in series with either the positive buss 15 or with the negative power supply buss 16. When the $C_2$ filter capacitor as well as the inductor $L_2$ are placed on the DC output side of the fullwave rectifier 14 the $C_2$ filter capacitor can be an electrolytic capacitor having a relatively large capacitance per unit cost and size to obtain reduction of the chopper frequency current appearing on the AC side of bridge of 14. In such an arrangement, bridge rectifier 14 need not be of the fast-recovery type and power feedback rectifier 18 is required. There is the disadvantage in that the line current drawn from the AC source is not sinusoidal but has a relatively steep rise resulting from the abrupt charging of the $C_2$ filter capacitor at the beginning of each half cycle of the line frequency. However, there is a compensating advantage in that there is a voltage established on filter capacitor $C_2$ which carries over across the zero points of the full wave rectified potential appearing at the output of 14 which assures that the voltage across zener diode 92 never falls below the clamping voltage of the zener and the time delay $t_2$ provide by the SUS trigger circuit remains constant and the chopping frequency remains constant. This feature is of particular importance in operating the inverter in mode I of FIG. 7G employing smoothing components $L_3$ and $C_3$. In addition the carry over voltage permits continuous operation of the inverter and tends to reduce the ratio of peak to average power generated.

Figure 13A:
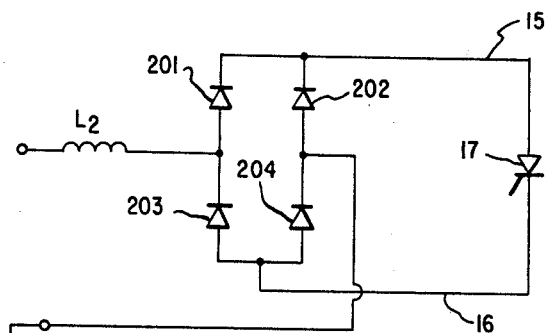
FIG. 13–13C illustrate a low cost version of improved chopper-inverter power supply and temperature control according to the invention together with voltage waveforms that depict the operation thereof.
Figure 13B:
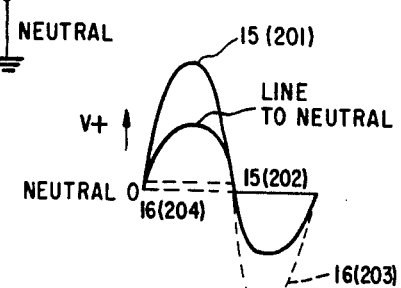

With FIG. 13 arranged so that rectifier 14 serves simultaneously as the feedback diode and as the power line rectifier, the potential of the cathode of the chopper SCR 17 and thus buss 16 rides at a high negative chopper frequency potential with respect to the neutral terminal of the power line during alternate half cycles of the line frequency as illustrated in FIG. 13A. FIG. 13B depicts how the voltages on buss 15 and on buss 16 vary in time referred to the neutral terminal of the power line. As a result the temperature sensor 24 will operate at the same high potential with respect to the line neutral and a manually operated knob on the temperature set control or on the power level control corresponding to resistor 34, for example, must be insulated for the full potential of the forward voltage applied to SCR 17, a value typically of 400 volts or more. Voltage isolation is easily obtained for switches 13a and 13B are treated as the contacts of mechanical relays such as the contact—coil pair 162-161. In the case of the temperature sensor it is perhaps easiest to provide an auxiliary power supply for exciting the temperature sensor 24 and powering the relay coil 161.

Figure 13C:
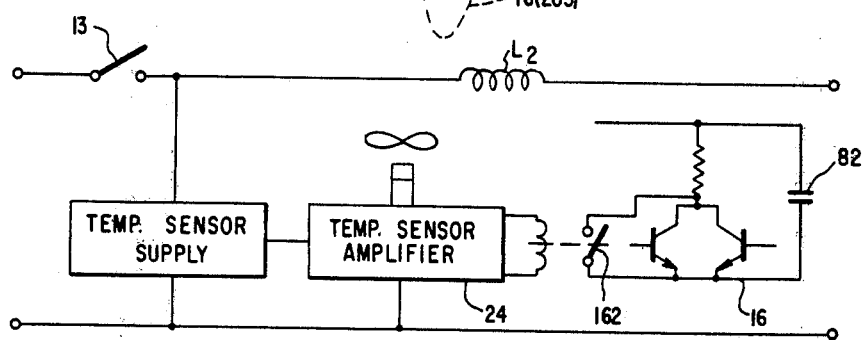

FIG. 13c of the drawings illustrates a modification to the circuit of FIG. 13 wherein an auxiliary single ended power supply 318 is used to energize the temperature sensor amplifier 24 in order to place the ground terminal of temperature sensor 24 at the potential of the line neutral and avoid the need for high voltage insulation as noted above. Instead of relay 161-162 it is possible to employ a photoconductor light module to provide the necessary voltage isolation. The module could be connected as to switch 13a to discharge the capacitor 82 to turn off the inverter when the light is on or connected between the emitter and base of transistor 81 to turn on the inverter when the light is on. In any event the lamp of the photoconductor module should be actuated so as to be either full on or full off to assure complete turn on of SCR 72 across zener diode 92. Photo control of inverter power is evidently possible by interrupting the light beam passing to the photoconductor and by such control used separately or in conjunction with the temperature sensor to provide an over ride function to the temperature sensor, for example.

If the rectifier 14 serves only as the power line rectifier, the inductor $L_2$ is located on the DC side of full wave rectifier 14. If inductor $L_2$ is placed in series between the rectifier 14 and buss 15, the continuity of buss 16 back to the rectifier is preserved and bus 16 will operate at a potential free of the chopper voltage and with a peak value which never exceeds the peak voltage of the power line supply. In this event the temperature sensor may be supplied from voltage obtained from the single ended DC supply across capacitor 315, and the signal output of the threshold switch of temperature sensor 24 can be applied directly to the base of transistor 85. Line voltage isolation from the temperature control of sensor assembly 24 is then easily and safely obtained with the use of an insulating shaft or knob. In this connection the potential of variable power control resistor 34 likewise rides at little more than the peak line voltage on alternate half cycles and may similarly be isolated from the operator. The only matter of concern which arises when $L_2$ is located in series with the positive output of rectifier 14 is that the anode of SCR 18 and the cathode of feed back diode 18 operate at a high positive chopper frequency potential relative to the heat sink on which they are mounted which makes less efficient the removal of dissipated heat and can introduce capacitively coupled RFI as has been explained previously. In summary, the circuit shown in FIG. 13 provides a means for generating high frequency power at relatively low cost for the induction heating of metal base cookware and provides reliable control of inverter power by turning on and off the gate signal to SCR 17 at or near a zero point rather than turning on and off a series SCR such as SCR 21 or triac 207 of FIGS. 4 and 6, respectively. The single chopper SCR 17 may be replaced by several SCR devices of lower current rating connected in parallel as is known to those skilled in the art. However, with a single SCR in the circuit it is currently possible to supply power in the 18 to 25 kilocycle range at levels up to 1500 watts with a line voltage of 115 volts rms. The temperature of a pan heated by the induction field produced by the circuit may easily be controlled rapidly and accurately within a few percent from a temperature as low as 150° F. upward using the infra red temperature sensor of FIG. 4A. The circuit of FIG. 13 required a minimum of components to achieve the desired operation and hence makes available a relatively low cost induction heating equipment of high reliability and long life.

Figure 14:
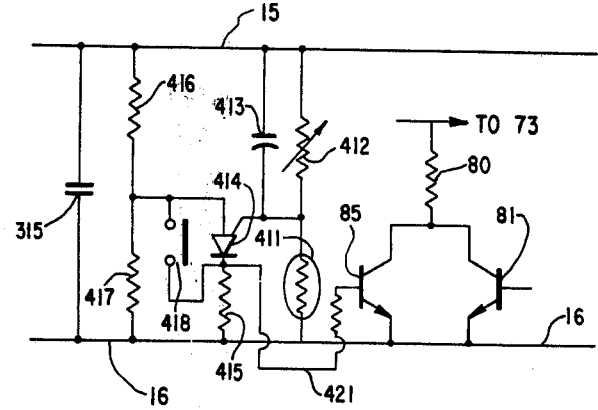
FIG. 14 is a circuit diagram of an over-temperature sensor and control useable with the power supply circuits of FIGS. 1—13.

FIG. 14 is a schematic circuit diagram of an overtemperature sensing arrangement that can be used generally with any of the circuits described above, but which has been tailored particularly for use with the circuit of FIG. 13 of the drawings. In FIG. 14, a thermistor 411 having a negative temperature coefficient of resistance is designed for physical placement adjacent some control point where it is desired to assure that the temperature does not exceed some predetermined value. For example, it may be desired that the pyroceramic surface on which the metal base cookware is supported over the inductive heating coil not exceed some preset temperature value. To accomplish this the thermistor 411 could be physically secured to the bottom surface of the pyroceramic member for continuously sensing the temperature of the member and cutting off the chopper-inverter in the event the sensed temperature exceeds a preset value.

Thermistor 411 is connected in series circuit relationship with an adjustable resistor 412 across the power supply terminals 15 and 16. A filter capacitor 315 is connected between the power supply terminals 15 and 16. A charging capacitor 413 is connected between the power supply terminal 15 and the juncture of thermistor 411 with adjustable resistor 412, and the same juncture is connected to the control gate of a programmable unijunction transistor device (PUT) 414. PUT 414 has its cathode connected in series with a load resistor 415 and its anode connected to the juncture of a pair of voltage dividing resistors 416 and 417 connected in series across the power supply terminals 15 and 16. A reset push-button switch 418 is connected across the anode-cathode terminals of PUT 414 for turning the device off and allowing the circuit to reset at some point after PUT 414 has been rendered conductive.

The load resistor 415 connected in the cathode of PUT 414 is connected through a conductor 421 and limiting resistor 422 to the base of the inhibit transistor 85 that comprises a part of a power circuit such as shown in FIG. 13 or FIG. 4. By reason of this connection, upon PUT 414 being turned-on, a positive polarity enabling potential will be applied to the base of inhibiting transistor 85 causing it to turn-on. This in turn results in inhibiting conduction of delay-inhibit transistor 73 which in turn results in allowing the inhibit SCR 72 to be rendered conductive and inhibit further operation of chopper-inverter in the previously described manner.

In operation, the circuit of FIG. 14 is adjusted to a desired temperature value by using an appropriate value of cool resistance for thermistor 411 and setting of the adjustable resistor 412. As the temperature of the point being sensed by thermistor 411 increases, its resistance decreases due to its negative temperature coefficient of resistance characteristic thereby drawing down the potential of the gate of PUT 414 to a value which causes it to break over and conduct. Upon PUT 414 being rendered conductive, a positive polarity enabling potential will be developed across load resistor 415 that causes the chopper-inverter to be turned off in the above briefly described fashion. It at some subsequent point, it is desired to test the circuit to determine whether or not the temperature of the point being sensed by thermistor 411 has decreased to a sufficient value, the reset button 418 can be depressed to short circuit the anode-cathode terminals of PUT 414. This will cause 414 to discontinue conduction and reassume its blocking condition provided that there is no longer a firing potential being applied to its gate. Upon 418 being released forward voltage is again applied across the PUT from voltage dividers 416 and 417. In the event that the temperature has dropped sufficiently below the preset value determined by adjustable resistor 412, 414 will retain its current blocking condition and the thermistor 411 will no longer exercise any control over the operation of the chopper-inverter until the next excessive temperature excursion. However, if the temperature of the sensed point has not dropped sufficiently, 414 will be again rendered conductive and inhibit further operation of the chopper-inverter until such time that the temperature does drop and the operator again actuates reset push bottun 418. While the circuit of FIG. 14 has been described for use primarily in conjunction with the circuit of FIG. 13, it is believed obvious that it can be applied for ancillary control purposes in connection with any of the circuits described previously by appropriate modification of the circuits to include this ancilary control function.

Figure 15:
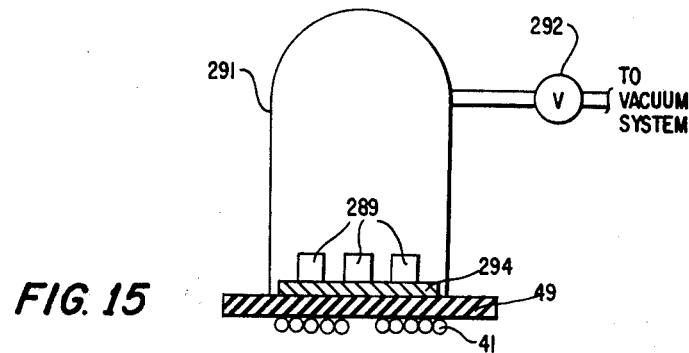
FIGS. 15 and 16–16B illustrate different induction heating applications with which the improved induction heating apparatus, power supply circuit and control made available by the invention, can be used in addition to heating metal-based cookware.
Figure 16:
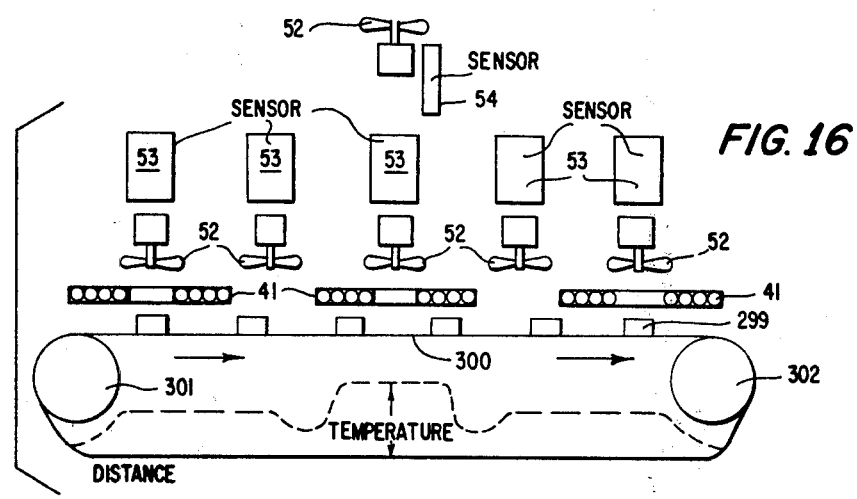
Figure 16A:
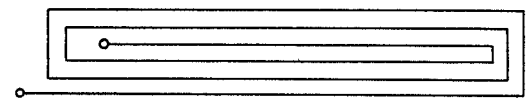
Figure 16B:
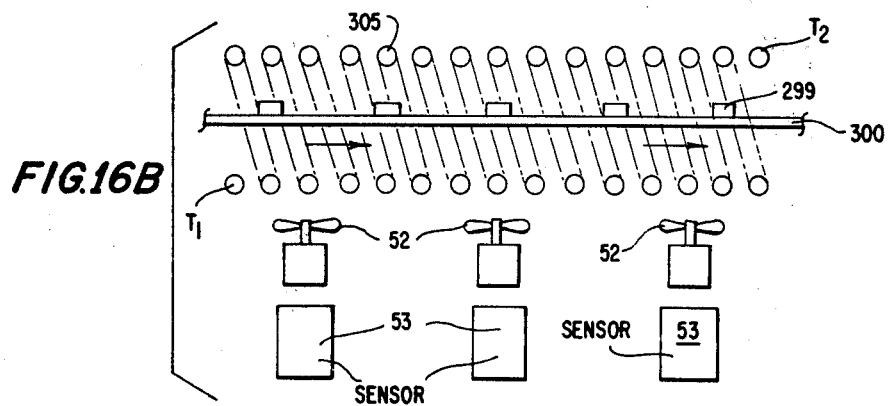

FIGS. 15 and 16–16B of the drawings illustrate different application for the new and improved induction heating apparatus constructed in accordance with the invention other than in connection with heating metal base cookware on a range-top home appliance. In FIG. 15, a number of objects 289 to be heated in a special atmosphere are seated on a metal base supporting member 294 within a bell jar 291 that is connected through suitable conduits and cut off valve 292 to a vacuum system or source of inert atmosphere such as argon gas, etc to which the objects 289 are to be exposed during heating. With this arrangement, the bell jar and enclosed objects 289 are disposed over the metal base 294 which is susceptible to be inductively by the induction coil 41 of the induction heating apparatus. A heat transparent, electrically and thermally insulating pyroceramic member 49 is disposed between the induction heating coil 41 and supports the metal base 294 on which the objects 289 to be heated are seated and also serves as a base plate to which the bell jar is seated. The temperature sensor 54 then senses the temperature of the inductively heated base metal 294 to maintain the desired temperature for the particular atmosphere in which the objects 289 are being heated. Any of the control circuits shown in FIG. 1–14 may be used for exciting induction heating coil 41. The metal base may be replaced by a secondary induction coil for avoiding a voltage within the bell jar without the need for feed through connections. This voltage may be used in a number of ways to heat, getter-pump, and operate other apparatus within the controlled atmosphere of the jar. The arrangement permits rapid and direct heating of parts such as base 294 or indirect heating of parts such as 289. The pyroceramic plate 49 serves as the bell jar baseplate, and IR transparent window for sensing and controlling temperature of heated parts, and as a window to allow the transfer of the electromagnetic field from the induction coil outside the bell jar and under the base plate to the work inside. The arrangement is of value in batch heating of parts where cleaniness, speed and fast, accurate temperature control are required.

FIG. 16 is a schematic illustration of a mechanized paint drying operation or some other similar temperature curing process wherein objects 299 to be heated are supported on a conveyor belt 300 traveling between a pay-out spool 301 and a take-up spool 302. A plurality of pancake-shaped induction heating coils 41 similar to those described with relation to FIG. 3 of the drawings, are arrayed along the length of the conveyor belt 300 for maintaining a desired temperature profile such as that sketched below the conveyor belt 300 and through which the objects 299 to be heated and dried, travel. The serially arrayed inductive heating coils 41 each may have its own chopper 52 and sensor 53 for directly viewing and sensing the temperature of the objects 299 to assure that the temperature profile is maintained with respect to the temperature of the objects themselves. In this arrangement, it is assumed that the objects 299 being heated and dried are metal base objects susceptible to being inductively heated in accordance with the principles previously discussed. Otherwise the objects 299 would have to be supported on metal base supports such as 294 used in FIG. 15. FIG. 16A of the drawings shows an alternative heating coil design for use with the system of FIG. 16 wherein a single, elongated inductive heating coil is substituted for the multiple coils and extends over an entire area wherein it is desired that a substantially constant temperature profile be maintained.

FIG. 16B of the drawings illustrates still another embodiment of an induction heating furnace wherein the conveyor belt 300 supporting the objects 299 to be heated travels through a central opening in an elongated, helically coiled induction heating coil 305. A plurality of temperature sensors 53 and associated infrared heat ray chopping devices 52 are arrayed to sense the temperature of the objects at different points along the length of travel thereof by looking through the turns of the elongated helically-coiled induction heating coil 305. For this arrangement, it is assumed that the turns of the elongated induction heating coil 305 are spaced-apart where they would otherwise intercept the infra red energy incident upon the heat sensors 53 from the objects 299 being heated. With the arrangement on FIG. 16 as shown, the conveyor belt 300 should be fabricated from a heat transparent and electrically insulating material. If not thermally transparent the belt can be made to have openings below the objects 299 which are to be heated. Otherwise the heat sensors 53 could be arrayed over the top of the conveyor belt in the manner shown in FIG. 16 to view the objects 299 directly.

With any of the arrangements shown in FIGS. 15–16B the chopper inverter power supply gating control circuit and temperature sensing arrangements described previously with relation to FIGS. 1–12 could be employed. Other uses for the induction heating apparatus in addition to those noted above, would be in connection with specialty food thawing for vending machines and restaurants to provide accurate temperature control with minimum waste heat generation. The apparatus could be used in laboratories or industrial installations for maintaining materials such as chemicals, slurries, solders, etc, at constant temperatures and could be used in fine brazing operations. The apparatus is particularly suited for batch processing of such slurries under controlled environment conditions. Thawing of pipe lines containing explosive fluids such as gas pipe lines also would be an ideal application for the improved induction heating apparatus herein described. Liquids in an insulating pot or cup which is not heated by the induction field may be heated by placing a piece of metal such as stainless steel inside the container, which, when heated by the field, will transfer its heat to the liquid therein.

Accordingly, it will be appreciated that the invention provides new and improved induction heating apparatus for use with metal-based cookware and other similar objects to be heated, which is compact, relatively low in cost and simple in design and provides safe, clean and highly efficient heating. The induction heating apparatus is capable of directly sensing and controlling the temperature of the cookware or other object being heated to a fine degree so that unwanted waste heat is not generated in the first place and as a consequence thermal pollution of the environment in which the heating takes place is prevented or at least minimized. An improved chopper-inverter power supply circuit is made available for use primarily with induction heating equipment which is reliable and safe in operation over a wide range in loading extending from full load to no load conditions. The invention further provides a family of novel gating control circuits for use with the improved chopper-inverter power supplies which are capable of providing reliable gating-on pulses of sufficient energy to assure complete turn-on and control over the operation of the chopper inverter under widely varying load and supply voltage conditions. In addition improved induction heating coil designs and temperature sensing and control arrangements are described for use with induction heating apparatus having the characteristics noted above. Additionally, different means for physically arranging the several parts of the systems disclosed are available. For example all of the parts in the system can be arranged in an auxiliary housing arrangement, or alternatively the chopper-inverter and associated gating circuitry can be placed in a chassis at some relatively remote location and twisted leads brought out to supply an exposed inductive heating coil and temperature sensor mounted for easy access and use. These and other arrangements will be obvious to those skilled in the art in the light of the above teachings.

Having described several embodiments of a new and improved induction heating apparatus for metal-based cookware and other objects and having improved power supply and gating control circuits using infra red temperature sensing and improved heating coil arrangements and constructed in accordance with the invention, it is believed obvious that other modifications and variations of the invention are possible in the light of the above teachings. It is therefor to be understood that changes may be made in the particular embodiments of the invention described with are within the full intended scope of the invention as defined by the appended claims.

What is claimed is:

1. An improved power supply circuit and dv/dt control including including in combination, power supply terminal means connected across and supplying a thyristor semiconductor switching device connected in a power supply circuit, a snubbing circuit comprising a series connected resistor and capacitor connected in parallel circuit relationship across the thyristor semiconductor switching device for limiting the rate of rise of reapplied forward voltage across the thyristor semiconductor switching device, circuit means connected to said snubbing circuit for deriving an output dv/dt control signal representative of the rate of rise of reapplied forward voltage across the thyristor semiconductor switching device and means for applying said dv/dt control signal back to control operation of the thyristor semiconductor switching device in a direction to assure safe operation of the power supply circuit within the constraints dictated by the dv/dt characteristics of the thyristor.

2. A reliable solid state cooking appliance for inductively heating a cooking utensil comprising an induction heating coil mounted adjacent a substantially unbroken non-metallic utensil support and producing an alternating magnetic field, a static power conversion circuit including a power circuit controlled by solid state power device means for generating an ultrasonic frequency wave that drives said induction heating coil, and a control circuit operating at signal level and connected to selected points on said power circuit, said control circuit comprising a turn-on circuit for selecting the intervals of conduction of said solid state power device means, and further comprising protection circuit means for detecting predetermined abnormal power circuit conditions and modifying the operation of said control circuit to obtain reliable and automatic operation of said static power conversion circuit.

3. A cooking appliance according to claim 2 wherein said control circuit further includes a utensil presence detection circuit that senses the absence of a cooking utensil coupled with said induction heating coil and modifies the operation of said control circuit.

4. A reliable solid state cooking appliance for inductively heating a cooking utensil comprising an induction heating coil mounted adjacent a substantially unbroken non-metallic utensil support and producing an alternating magnetic field, a static power conversion circuit including a power circuit controlled by solid state power device means for generating an ultrasonic frequency wave that drives said induction heating coil, and a control circuit operating at signal level and including a turn-on circuit for selecting the intervals of conduction of said solid state power device means, and further including utensil presence detection circuit means for sensing a parameter at a selected point on said power circuit during a predetermined time interval and modifying the operation of said control circuit in response to a sensed parameter indicative of the absence of a cooking utensil coupled with said induction heating coil.

* * * * *